(12) United States Patent
Sislak et al.

(10) Patent No.: US 8,538,673 B2
(45) Date of Patent: Sep. 17, 2013

(54) SYSTEM AND METHOD FOR PLANNING/REPLANNING COLLISION FREE FLIGHT PLANS IN REAL OR ACCELERATED TIME

(75) Inventors: David Sislak, Prague (CZ); Michal Pechoucek, Prague (CZ); Premysl Volf, Hradec Kralove (CZ); Vladimir Marik, Prague (CZ); Paul Losiewicz, Farnham Common (GB)

(73) Assignee: Czech Technical University in Prague, Prague (CZ)

( * ) Notice: Subject to any disclaimer, the term of this patent is extended or adjusted under 35 U.S.C. 154(b) by 881 days.

(21) Appl. No.: 12/347,380

(22) Filed: Dec. 31, 2008

(65) Prior Publication Data
US 2010/0114633 A1 May 6, 2010

Related U.S. Application Data

(60) Provisional application No. 61/110,163, filed on Oct. 31, 2008.

(51) Int. Cl.
*G01C 21/00* (2006.01)
(52) U.S. Cl.
USPC ............................. 701/301; 701/411; 701/414
(58) Field of Classification Search
USPC ............. 701/23–26, 205, 210, 300, 301, 411, 701/414
See application file for complete search history.

(56) References Cited

U.S. PATENT DOCUMENTS

| | | | |
|---|---|---|---|
| 3,714,651 A * | 1/1973 | Lyon | 342/29 |
| 6,133,867 A * | 10/2000 | Eberwine et al. | 342/29 |
| 6,201,482 B1 * | 3/2001 | Schiefele et al. | 340/961 |
| 6,564,149 B2 * | 5/2003 | Lai | 701/301 |
| 6,859,931 B1 | 2/2005 | Cheyer et al. | |
| RE39,053 E * | 4/2006 | Rees | 342/29 |
| 7,516,014 B2 * | 4/2009 | Hammarlund et al. | 701/301 |
| 7,706,979 B1 * | 4/2010 | Herwitz | 701/301 |
| 7,737,878 B2 * | 6/2010 | van Tooren et al. | 342/29 |
| 7,894,948 B2 * | 2/2011 | Stroud | 701/3 |
| 2005/0230563 A1* | 10/2005 | Corcoran | 244/175 |
| 2006/0287827 A1* | 12/2006 | Tran | 701/301 |
| 2010/0121575 A1* | 5/2010 | Aldridge et al. | 701/301 |
| 2010/0292871 A1* | 11/2010 | Schultz et al. | 701/3 |
| 2011/0118981 A1* | 5/2011 | Chamlou | 701/301 |

OTHER PUBLICATIONS

Sislak et al., U.S. Appl. No. 60/110,163 entitled Collision Avoidance Among Unmanned Aerial Vehicles, filed Oct. 31, 2008.
Sislak et al., Agentfly:Towards Multi-Agent Technology in Free Flight Air Traffic Control, Whitestein Series in Software Agent Technologies and Autonomic Computing, 77-100, 2007, Birkhauser Verlag Basel/Switzerland.

(Continued)

*Primary Examiner* — Joseph C Rodriguez
(74) *Attorney, Agent, or Firm* — Burns & Levinson LLP; Orlando Lopez

(57) ABSTRACT

A system and method for planning/replanning collision free flight plans in real-time (or accelerated-time) including planning individual flight plans for each flying asset, executing (or simulating) the planned individual flight plans, detecting violations of safety zones of each of the flying assets by negotiation and by other assets monitoring (radar sensing), and repairing the individual flight plans by real-time replanning.

28 Claims, 39 Drawing Sheets

(56) References Cited

OTHER PUBLICATIONS

Rehak et al., An Abstract Architecture for Computational Reflection in Multi-Agent Systems, Gerstner Laboratory, Czech Technical University in Prague, Czech Republic, {rehakm1,tozicka,pechouc,zelezny,rollo}@labe.felk.cvut.cz, Proceedings of the 2005 IEEE/WIC/ACM International Conference on Intelligent Agent Technology (IAT'05) 0-7695-2416-8/05.

Volf et al., Convergence of Peer-to-Peer Collision Avoidance among Unmanned Aerial Vehicles, Gerstner Laboratory, Department of Cybernetics, Czech Technical University in Prague Technicka 2, Prague 6, 166 27 Czech Republic, 2007 IEEE/WIC/ACM International Conference on Intelligent Agent Technology.

Jiri Samek, Multi-party Collision Avoidance among Unmanned Aerial Vehicles, Gerstner Laboratory, Department of Cybernetics, Czech Technical University in Prague, Technicka 2, Prague 6, 166 27 Czech Republic, 2007 IEEE/WIC/ACM International Conference on Intelligent Agent Technology.

Sislak, Agent-Based Multi-Layer Collision Avoidance to Unmanned Aerial Vehicles, Agent Technology Group, Gerstner Laboratory, Department of Cybernetics, Czech Technical University in Prague, Technicka 2, Prague 6, 166 27, Czech Republic, 1-4244-0945-4/07, 2007 IEEE.

Sislak et al., Negotiation-Based Approach to Unmanned Aerial Vehicles, IEEE Workshop on Distributed Intelligent Systems: Collective Intelligence and Its Applications (DIS'06) 0-7695-2589-X/06 2006.

Sislak et al., Agentfly: A Multi-Agent Airspace Test-bed (Demo Paper),Proc. of 7th Int. Conf. on Autonomous Agents and Multiagent Systems (AAMAS 2008), Padgham, Parkes, Müller and Parsons (eds.), May 12-16, 2008, International Foundation for Autonomous Agents and Multiagent Systems (www.ifaamas.org).

\* cited by examiner

SYSTEM AND METHOD FOR PLANNING/REPLANNING COLLISION FREE FLIGHT PLANS IN REAL OR ACCELERATED TIME

CROSS REFERENCE TO RELATED APPLICATIONS

This application claims priority under 35 U.S.C. §119 from U.S. Provisional Patent Application No. 61/110,163 entitled COLLISION AVOIDANCE AMONG UNMANNED AERIAL VEHICLES, filed on Oct. 31, 2008.

STATEMENT OF FEDERALLY SPONSORED RESEARCH OR DEVELOPMENT

This invention was made with United States Government support from the AFRL under project numbers FA8655-04-1-3044-P00001 and FA8655-06-1-3073. The United States Government could have certain rights in the invention.

BACKGROUND

Cooperative collision avoidance, the deconfliction process between two or more interacting and cooperating aerial assets, is based on using different collision metrics and negotiation protocols. A centralized solution can be replaced by various distributed approaches facilitating deployment of e.g., principled negotiation or monotonic concession protocol (MCP) for collision avoidance in between of two assets or extensions towards groups of multiple UAAs. Such approaches can be altered to optimize social welfare instead of individual goals in the group of UAAs. There are also various approaches based on the game theory. Optimization of non-cooperative collision avoidance algorithms (deconfliction process of an individual flying asset facing a non-cooperative, possibly hostile object) allows optimal solving of the collision with a non-cooperative flying object (obstacle). What is needed is a system that extends the reach of these algorithms to a situation with several flying objects, located near to each other. Further, what is needed is a system that can allow the algorithms described above to be used simultaneously with other cooperative algorithms. What is still further needed is the collection of agent-based collision avoidance methods and a flexible multi-layer deconfliction architecture allowing integration and real-time or accelerated-time reconfiguration of the various collision avoidance approaches. Finally, what is needed is a system and method for planning/replanning collision free flight plans in real-time (or accelerated-time) including planning individual flight plans for each flying asset, executing (or simulating) the planned individual flight plans, detecting violations of safety zones of each of the flying assets by negotiation and by other assets monitoring (radar sensing), and repairing the individual flight plans by real-time replanning.

SUMMARY

The needs set forth above as well as further and other needs and advantages are addressed by the illustrative embodiment described herein below.

The system of the present embodiment, computer code system stored on a computer readable medium, for planning/replanning collision free flight plans in real-time, can include, but is not limited to including, input data from flying asset databases. a plurality of computer code flying asset client processors, and a computer code server processor. The computer code server and client processors can include, but are not limited to including, a computer code planner processor planning individual flight plans for each of the flying asset client processors based on the input data, a computer code executor processor executing planned individual flight plans, a computer code detector processor detecting, from flight data received from the computer code flying asset client processors, violating individual flight plans that violate safety zones of flying assets associated with the computer code flying asset client processors, and a computer code repairer processor repairing the individual flight plans by real-time replanning.

The method of the present embodiment for planning/replanning collision free flight plans in real-time can include, but is not limited to including, the steps of (a) planning individual flight plans for each flying asset client based on input data, (b) executing planned individual flight plans, (c) detecting violating individual flight plans that violate safety zones of each flying assets, and (d) repairing individual flight plans by real-time replanning.

For a better understanding of the present embodiment, together with other and further objects thereof, reference is made to the accompanying drawings and detailed description.

DETAILED DESCRIPTION

The present embodiment is now described more fully hereinafter with reference to the accompanying drawings. The following configuration description is presented for illustrative purposes only. Any computer configuration satisfying the speed and interface requirements herein described may be suitable for implementing the system and method of the present embodiment.

Figure 1:
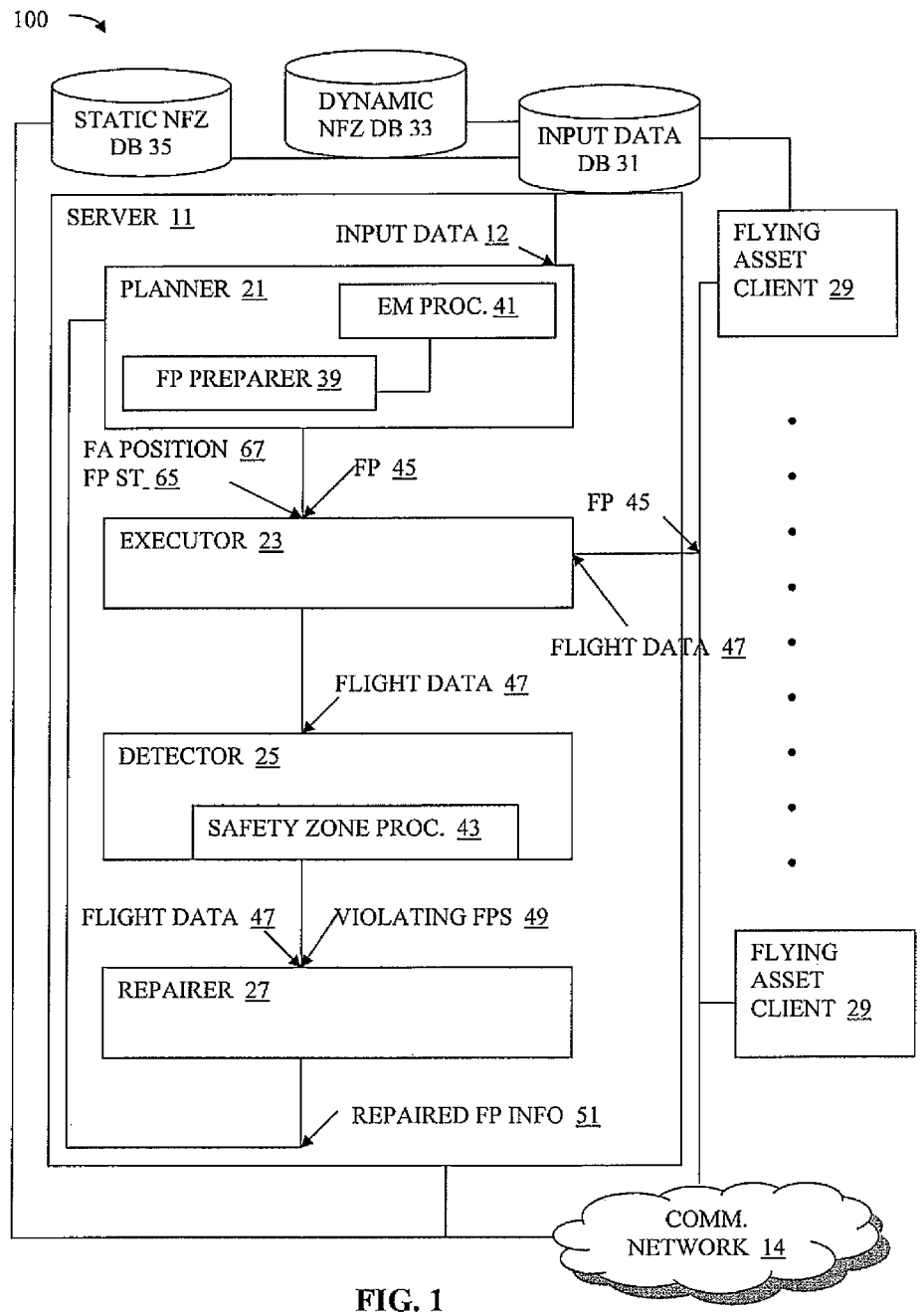
FIG. 1 is a schematic block diagram of the system of one embodiment of the present embodiment.

Referring now primarily to FIG. 1, system 100 for planning/replanning collision free flight plans in real-time, a first embodiment in which planning/replanning is centrally conducted, can include, but is not limited to, input data 12 from flying asset databases, computer code flying asset client processors 29, and at least one computer code server processor 11. The computer code server processor 11 can include, but is not limited to including a computer code planner processor 21 planning individual flight plans 45 for each flying asset client processor 29 based on input data 12, computer code executor processor 23 executing planned individual flight plans 45, computer code detector processor 25 detecting, from flight data 47 received from computer code flying asset client processors 29, violating individual flight plans 49 that violate safety zones 105 (FIG. 8) of flying assets 113 (FIG. 6) associated with computer code flying asset client processors 29, and computer code repairer processor 27 repairing individual flight plans 49 by real-time replanning.

Figure 1A:
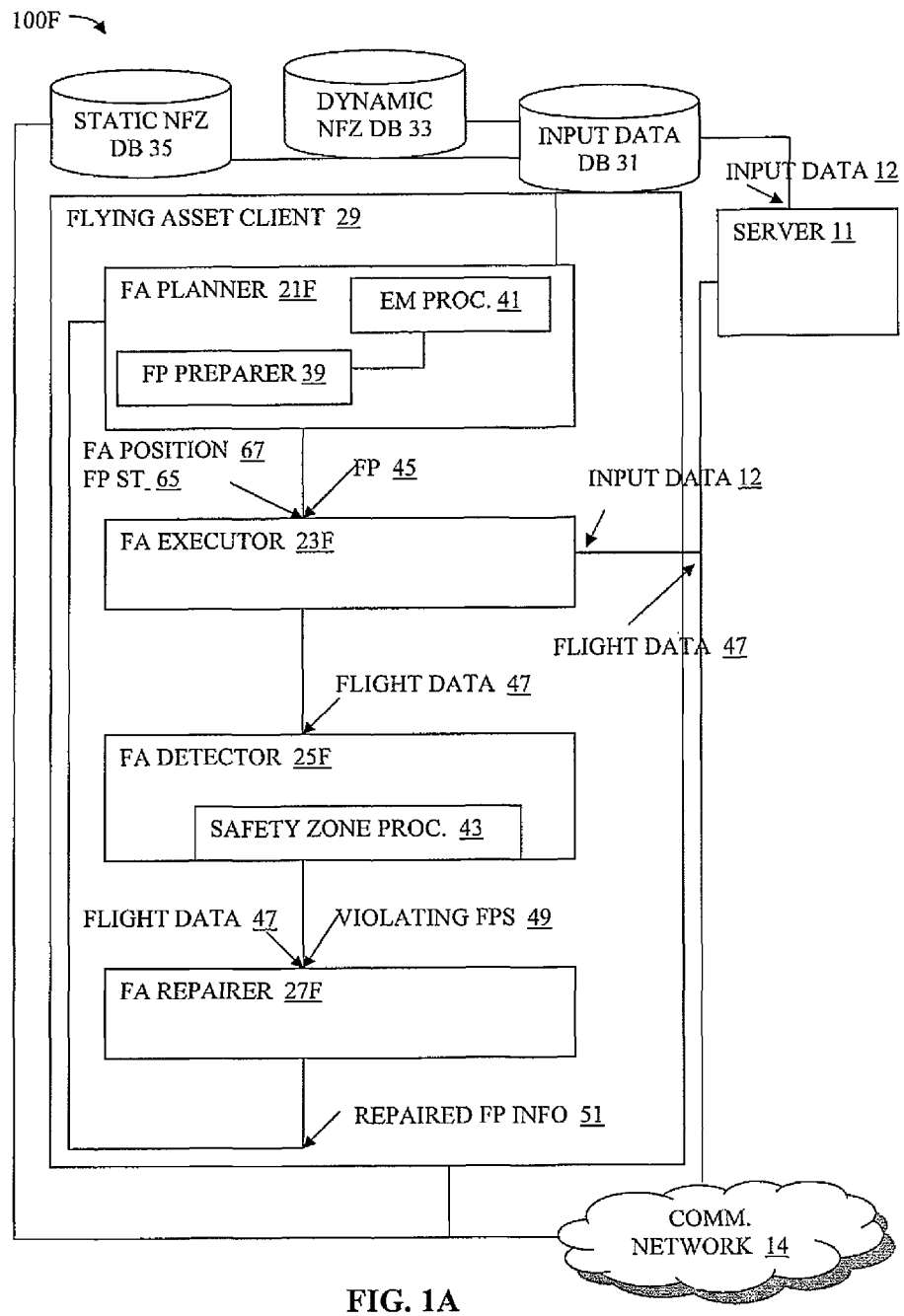
FIG. 1A is a schematic block diagram of the system of another embodiment of the present embodiment.

Referring now primarily to FIG. 1A, system 100F for planning/replanning collision free flight plans in real-time, a second embodiment in which planning/replanning is conducted in each flying asset 113 (FIG. 6), can include, but is not limited to including, input data 12 from flying asset databases, computer code flying asset client processors 29, and at least one computer code server processor 11. The computer code flying asset client processors 29 can each include, but are not limited to including, a flying asset computer code planner processor 21F planning individual flight plans 45 for each flying asset client processor 29 based on input data 12, flying asset computer code executor processor 23F executing planned individual flight plans 45, flying asset computer code detector processor 25F detecting, from flight data 47 received from computer code flying asset client processors 29, violating individual flight plans 49 that violate safety zones 105 (FIG. 8) of flying assets 113 (FIG. 6) associated with computer code flying asset client processors 29, and flying asset computer code repairer processor 27F repairing individual flight plans 49 by real-time replanning.

Figure 2:
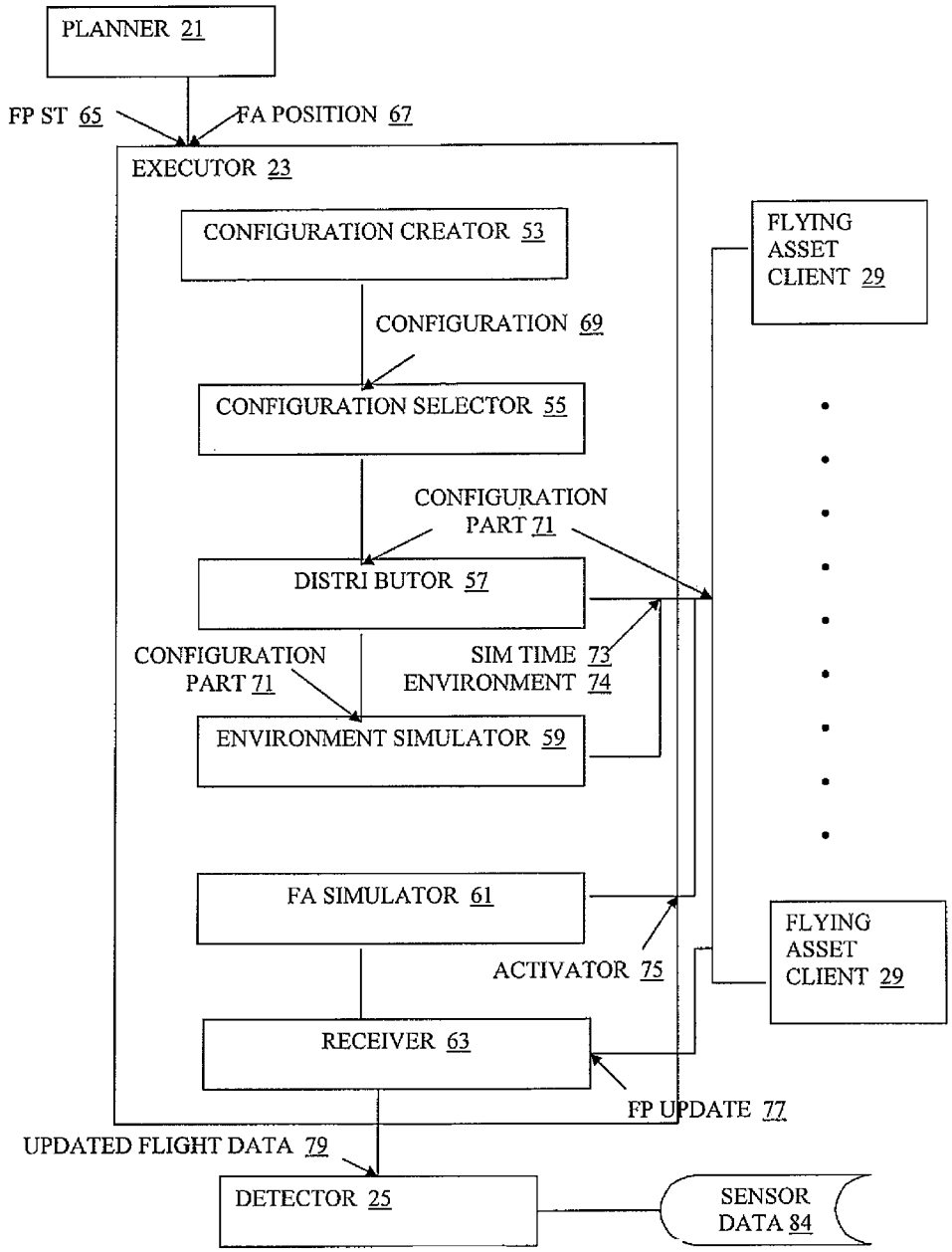
FIG. 2 is a schematic block diagram of the components of the executor processor of the present embodiment.

Referring now primarily to FIG. 2, computer code executor processor 23 (and flying asset computer code executor processor 23F) can include, but is not limited to including, computer code configuration creator processor 53 establishing a flying asset configuration 69 and initiating computer code flying asset client processors 29 and simulation server 11 based on flying asset configuration 69, computer code configuration selector processor 55 determining a pre-selected configuration part 71 of flying asset configuration 69 for distribution to computer code flying asset client processors 29, computer code distributor processor 57 distributing pre-selected configuration part 71 to computer code flying asset client processors 29, computer code environment simulator processor 59 simulating an environment 74 based on a simulation time 73, computer code flying asset simulator processor 61 simulating flying assets 113 (FIG. 6) by activating computer code flying asset client processors 29 within environment 74, and computer code receiver processor 63 receiving updates from computer code flying asset client processors 29 when planned individual flight plans 45 change, and computing updated flight data 79 based on flying asset positions 67 and flight data 47.

Figure 3:
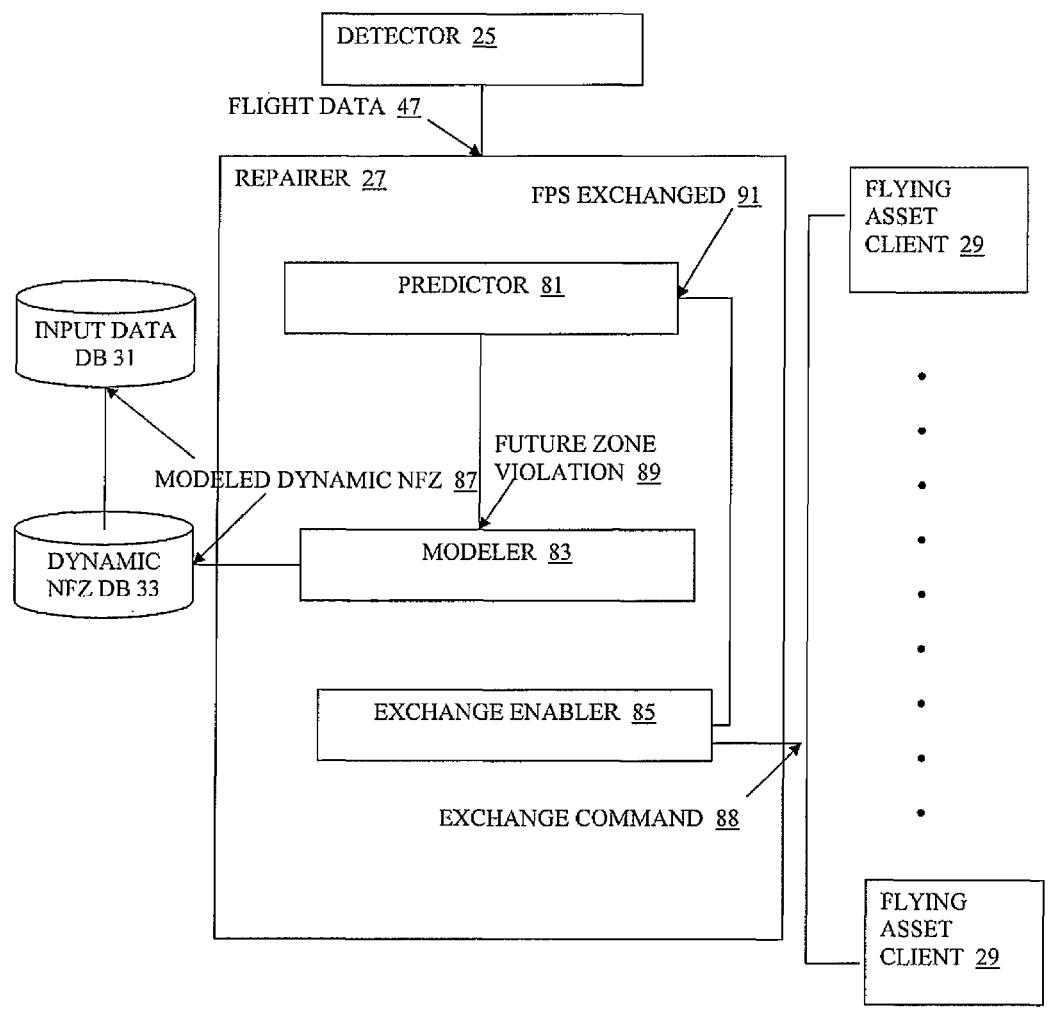
FIG. 3 is a schematic block diagram of the components of the repairer processor of the present embodiment.

Referring now primarily to FIG. 3, in one embodiment, computer code repairer processor 27 (and flying asset computer code repairer processor 27F) can include, but is not limited to including, computer code receiver predictor 81 predicting a future zone violation point 89 for one of flying assets 113 (FIG. 6) based on flight data 47, and computer code modeler processor 83 modeling future zone violation point 89 as modeled dynamic no-flight zone 87 and storing modeled dynamic no-flight zone 87 with input data 12. In another embodiment, computer code repairer processor 27 (and flying asset computer code repairer processor 27F) can include, but is not limited to including, computer code exchange enabler processor 85 enabling computer code flying asset client processors 29 to exchange pre-selected configuration parts 71 of individual flight plans 45, computer code receiver predictor 81 predicting, in each of computer code flying asset client processors 29 using exchanged pre-selected configuration parts 71, possible future zone violations 89 of safety zones 105 of each flying asset 113 (FIG. 6), flight plan adjuster 93 adjusting, by computer code flying asset client processors 29, planned individual flight plans 45 based on pre-selected evasion maneuvers 103 and future zone violation 89, collective negotiator 95 collectively negotiating, by computer code flying asset client processors 29, collision avoidance maneuvers to create negotiated individual flight plans 101 by maximizing a sum of utility values computed from adjusted individual flight plans 99, and a computer code receiver processor 63 receiving, from computer code flying asset client processors 29, negotiated individual flight plans 101. In this embodiment, computer code planner processor 21 can provide to computer code flying asset client processors 29 pre-selected evasion maneuvers 103 computed by computer code planner processor 21.

Figure 4:
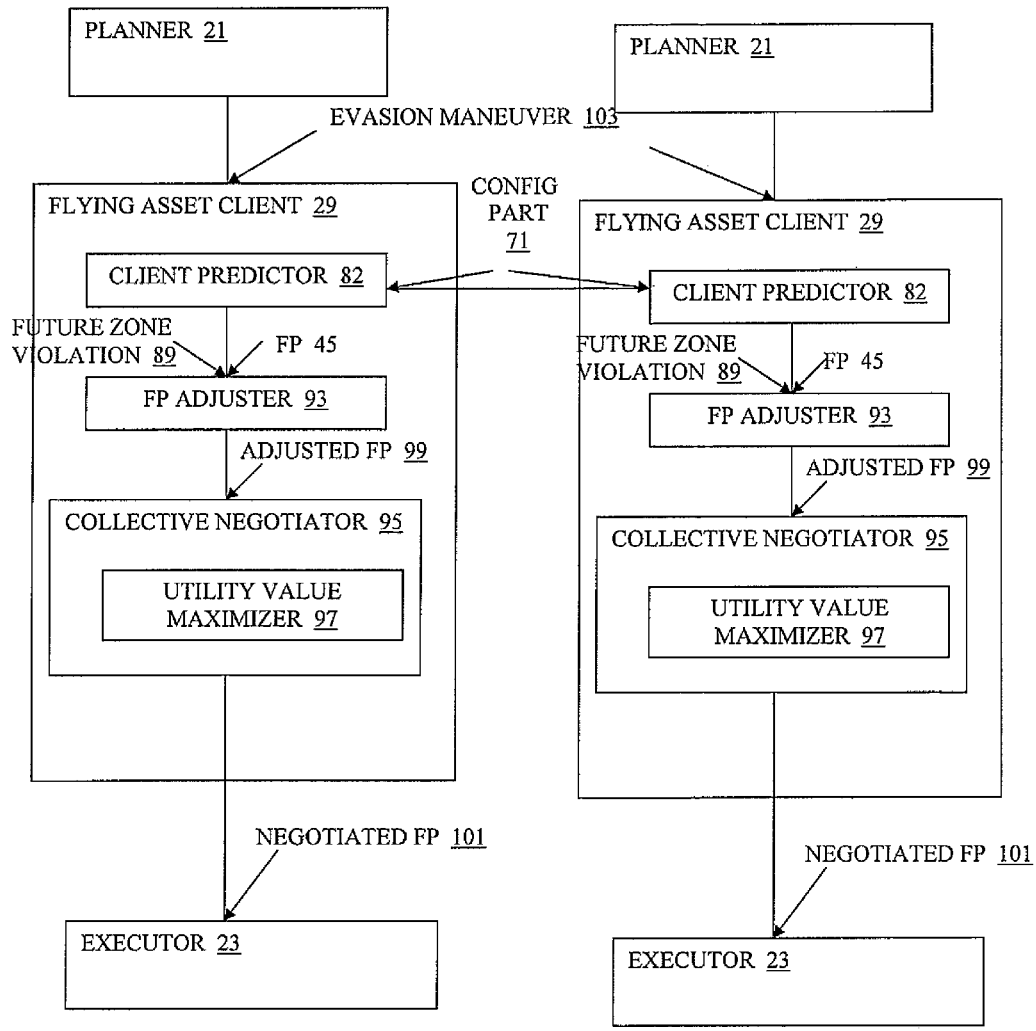
FIG. 4 is a schematic block diagram of the components of the flying asset client processor of the present embodiment.

Referring now primarily to FIG. 4, computer code flying asset client processor 29 can include, but is not limited to including, computer code client predictor processor 82 predicting, in each computer code flying asset client processor 29 using exchanged pre-selected configuration parts 71, possible future zone violations 89 of safety zones 105 of each of flying assets 113, computer code flight plan adjuster processor 93 adjusting, by computer code flying asset client processor 29, planned individual flight plans 45 based on pre-selected evasion maneuvers 103 and future zone violation 89, and computer code collective negotiator processor 95 collectively negotiating, by computer code flying asset client processor 29, collision avoidance maneuvers by maximizing a sum of utility values computed from adjusted individual flight plans 99.

Figure 5:
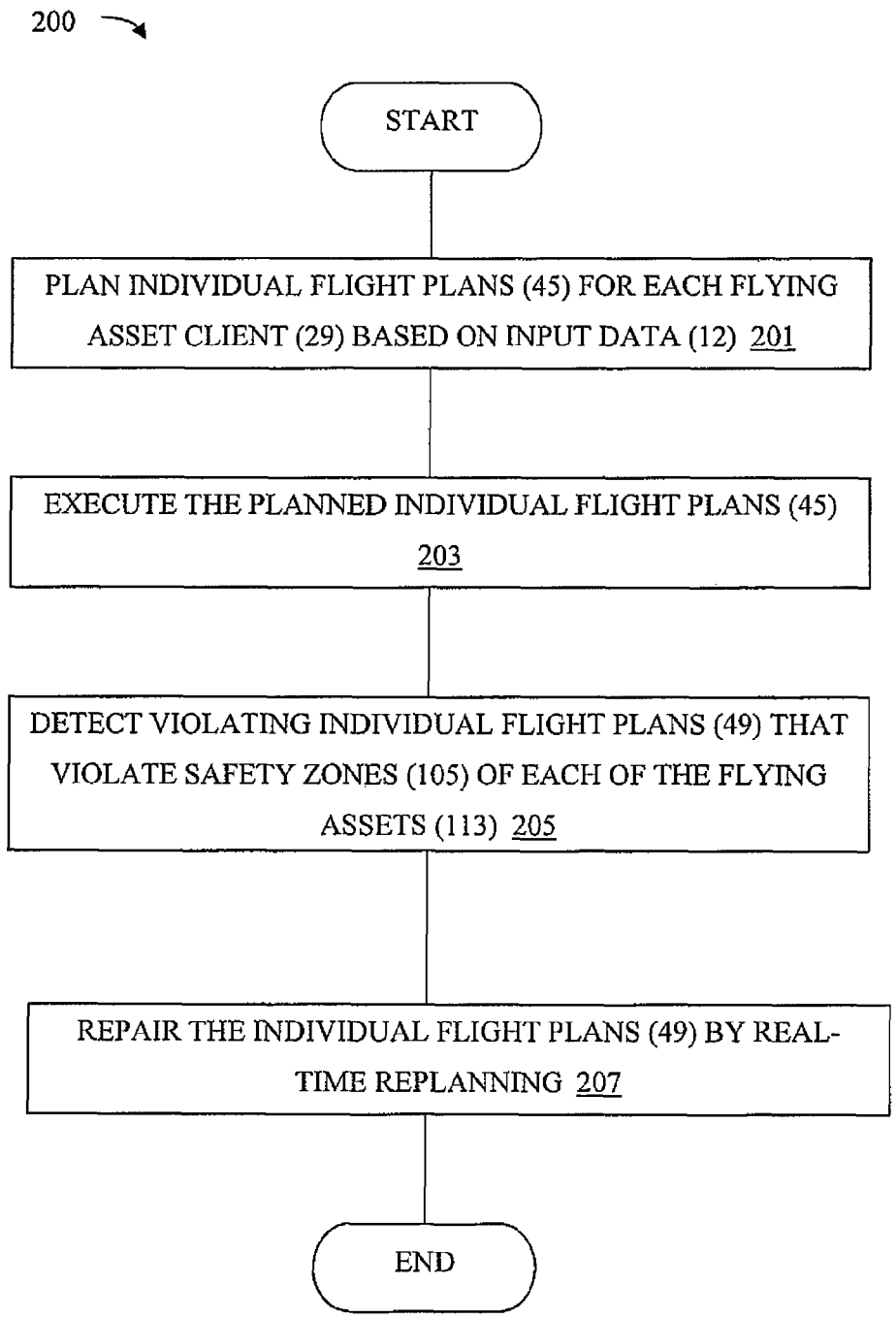
FIG. 5 is a flowchart of the method of the present embodiment.

Referring now primarily to FIGS. 1 and 5, method 200 (FIG. 5) for planning/replanning collision free flight plans in real-time can include, but is not limited to including the steps of: (a) planning 201 (FIG. 5) individual flight plans 45 (FIG. 1) for each flying asset client 29 (FIG. 1) based on input data 12 (FIG. 1), (b) executing 203 (FIG. 5) planned individual flight plans 45 (FIG. 1), (c) detecting 205 (FIG. 5) violating individual flight plans 49 (FIG. 1) that violate safety zones 105 (FIG. 8) of flying assets 113 (FIG. 6), and (d) repairing 207 (FIG. 5) individual flight plans 49 (FIG. 1) by real-time replanning. Method 200 (FIG. 5) can also include the steps of receiving input data 12 (FIG. 1), preparing the individual flight plans 45 (FIG. 1) based on input data 12 (FIG. 1), and detecting, according to changes in input data 12, if real-time replanning must be performed. Input data 12 (FIG. 1) can include, but is not limited to including, world dimensions, definition of the world surface, no-flight zones, and mission way-points. Real-time replanning can include, but is not limited to including, the step of replanning flight plan (45) (FIG. 1) when input data 12 (FIG. 1) changes. Executing planned individual flight plans 45 (FIG. 1) can include, but is not limited to including, the step of simulating planned individual flight plans 45 (FIG. 1).

Continuing to refer primarily to FIGS. 1 and 5, simulating planned individual flight plans 45 (FIG. 1) can include, but is not limited to including, the steps of establishing a flying asset configuration 69 (FIG. 1), initiating a plurality of flying asset clients 29 (FIG. 1) and a simulation server 11 (FIG. 1) based on flying asset configuration 69 (FIG. 1), determining a pre-selected configuration part 71 (FIG. 1) of flying asset configuration 69 (FIG. 1) for distribution to flying asset clients 29 (FIG. 1), distributing a pre-selected configuration part 71 (FIG. 1) to flying asset clients 29 (FIG. 1), simulating an environment 74 (FIG. 1) based on a simulation time 73 (FIG. 1), simulating flying assets 113 (FIG. 6) by activating flying asset clients 29 (FIG. 1) within environment 74 (FIG. 1), receiving, in simulation server 11 (FIG. 1), updates from flying asset clients 29 (FIG. 1) when planned individual flight plans 45 (FIG. 1) change during said step of simulating flying assets 113 (FIG. 6), and computing, in simulation server 11 (FIG. 1), based on flying asset positions 67 (FIG. 1) and flight data 47 (FIG. 1), updated flight data 79 (FIG. 1). In one embodiment, the step of repairing can include, but is not limited to including, the steps of predicting a future zone violation point 89 (FIG. 1) for one of flying assets 113 (FIG. 6) based on flight data 47 (FIG. 1), modeling future zone violation point 89 (FIG. 1) as a modeled dynamic no-flight zone 87 (FIG. 1), storing modeled zone 87 (FIG. 1) with input data 12 (FIG. 1), and repeating steps (a)-(d) (FIG. 5). In another embodiment, the step of repairing can include, but is not limited to including, the steps of enabling flying asset clients 29 (FIG. 1) to exchange pre-selected configuration parts 71 (FIG. 1) of individual flight plans 45 (FIG. 1), predicting, in each flying asset client 29 (FIG. 1) using exchanged pre-selected configuration parts 71 (FIG. 1), possible future zone violations 89 (FIG. 1) of safety zones 105 (FIG. 18) of each flying asset 113 (FIG. 6), providing to flying asset clients 29 (FIG. 1) pre-selected evasion maneuvers 103 (FIG. 1) computed by said step of planning 201 (FIG. 5), adjusting, by flying asset clients 29 (FIG. 1), planned individual flight plans 45 (FIG. 1) based on pre-selected evasion maneuvers 103 (FIG. 1) and future zone violation 89 (FIG. 1), collectively negotiating, by flying asset clients 29 (FIG. 1), collision avoidance maneuvers by maximizing a sum of utility values computed from adjusted individual flight plans 99 (FIG. 1), receiving, from flying asset clients 29 (FIG. 1), negotiated individual flight plans 101 (FIG. 1) based on said step of collectively negotiating, and repeating steps (b)-(d) (FIG. 5). In one embodiment, the step of detecting can include, but is not limited to including, the step of processing updated flight data 79 (FIG. 1) to determine violating flight plans 49 (FIG. 1). In one embodiment, the step of detecting can include, but is not limited to including, the step of receiving updated flight data 79 (FIG. 1) from sensor data 84 (FIG. 1). Note that a similar set of steps can be performed with reference to FIG. 1A.

Continuing to still further refer primarily to FIGS. 1 and 5, the step of establishing can include, but is not limited to including, the step of selecting flying asset configuration 69 (FIG. 1) parameters from a group consisting of system settings, flying asset positions 67, and flying assets starting times 65 (FIG. 1). Method 200 (FIG. 5) can further include the steps of selecting configuration part 71 (FIG. 1) from a group consisting of mission way-points, definition of the world, and no-fly zones, and selecting flight data 47 (FIG. 1) from a group consisting of sensor data 84 (FIG. 1), violations of the safety zones, and physical collisions.

In the present embodiment, a free-flight domain (FFD) is described. In FFD, autonomous flying assets, can operate in a shared three-dimensional airspace $Air \subset R^3$ that is limited by the ground surface and airspace boundaries, where $R^3$ is the three-dimensional continuous space where each dimension is a real number. The airspace $Air_i$ that can be occupied by an individual flying asset $A_i$ is made smaller by no-flight zones $Z_i = \{Z_1, Z_2 \ldots\}$, where $A_i$ cannot fly (thus $Air_i = Air - \Sigma_{Z_k \in Z_i} Z_k$). Airspace is represented in the present embodiment as a block subsection of $R^3$ defining boundaries and a set of the no-flight zones. The ground surface can be defined as a special case of a no-flight zone. No-flight zones can be divided into three groups: world zones which represent ground terrain and other static obstacles in the simulated world, static zones which encapsulate world areas where flying assets cannot operate, i.e. strategic places (e.g. nuclear power plants), non-standard weather conditions or dangerous enemy territories, and dynamic zones which can be changed, for example, very often and can be defined by a non-cooperative collision avoidance algorithm. The basic building blocks for defining no-flight zones can include, but are not limited to including, an octant tree, a height map, and composition modifier. An octant tree is an area described by a tree that is divided into eight identical cuboidal subcells. Any cell that is fully occupied by that zone is marked as a full cell. Cells that are not intersected by a zone are marked as empty cells. Cells can be marked as both full and empty when they contain subcells—inner octant trees. The maximum height of the tree structure can be limited. A height map is an internal matrix structure that defines how much space is occupied by positions identified by cell indices. The matrix can be initially filled from height map images where the intensity of a pixel can define the height (brighter can be higher and darker can be lower). The implementation can allow specification of a neighbor's aggregation factor to reduce the matrix size. A composition modifier can define no-flight regions by performing arithmetic operations on, for example, geometric objects such as, for example, blocks, ellipsoids, and cylinders, to build other, perhaps more complicated, zone shapes. Using these building blocks can enable faster testing.

Several of the basic building blocks can be used to form a no-flight zone shape that can have the structure of a hierarchical tree where each leaf node in the tree can be one of the basic blocks, and internal nodes in the tree can be grouping and/or transformation operations. The root node of the tree can integrate the basic boundaries of whole airspace as a block subsection of $R^3$. Thus the area defined by any basic block can be rotated, scaled and translated as defined in the node transformation:

$$\bar{x}' = R \cdot \bar{x} - t \quad (1)$$

where R is a rotation matrix, t is a translation vector, $\bar{x}$ is a point in the node system of coordinates, and $\bar{x}'$ is a point in the system of coordinates below this node.

The hierarchical structure defining airspace $Air_i$ for the flying asset $A_i$ can provide interfaces to perform the intersection testing for a point, a line, and a corridor with pre-selected dimensions. For a line or a corridor, the hierarchical structure can return the first intersection point on a path.

Figure 6:
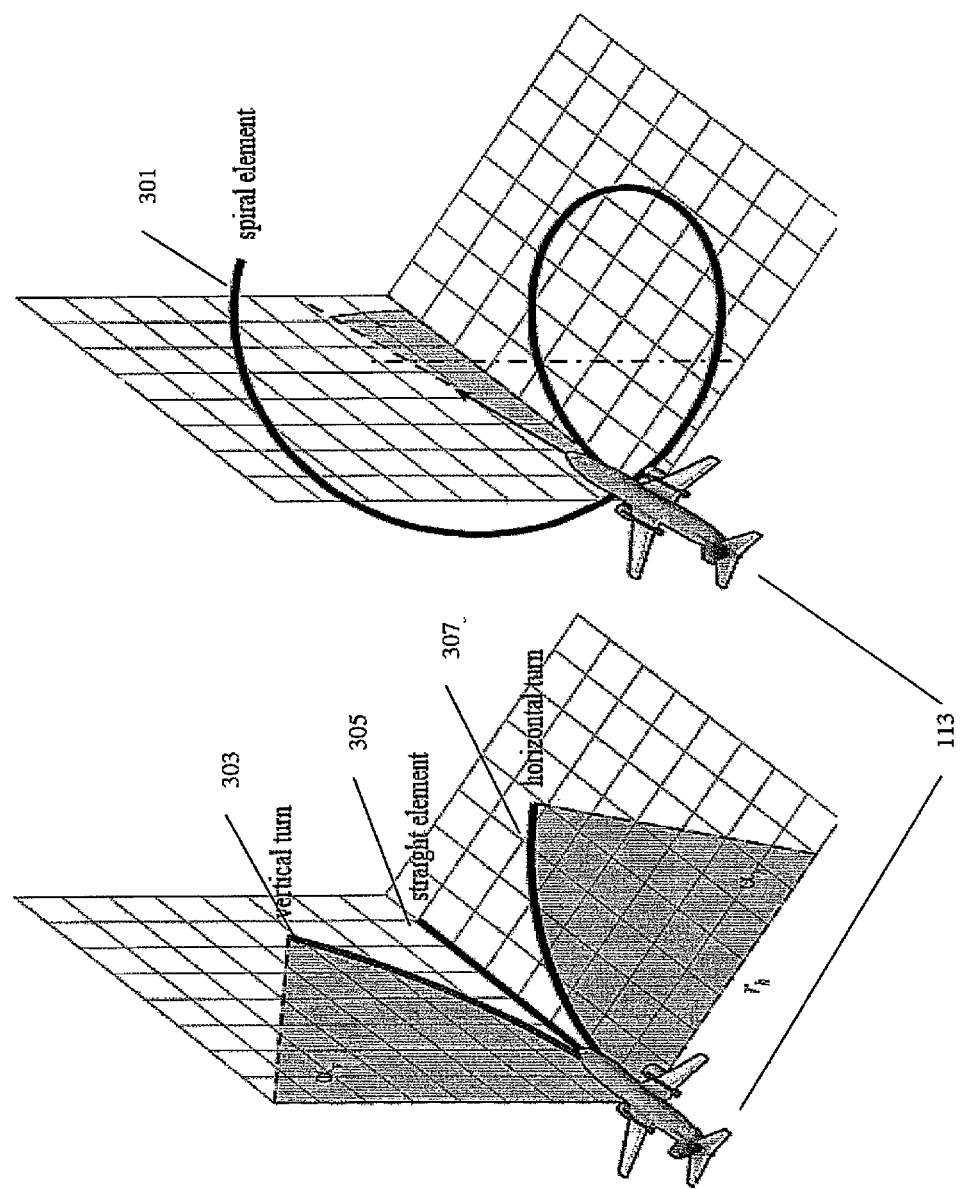
FIG. 6 is a graphical description of a coordinate system illustrating flight plan elements.
Figure 7:
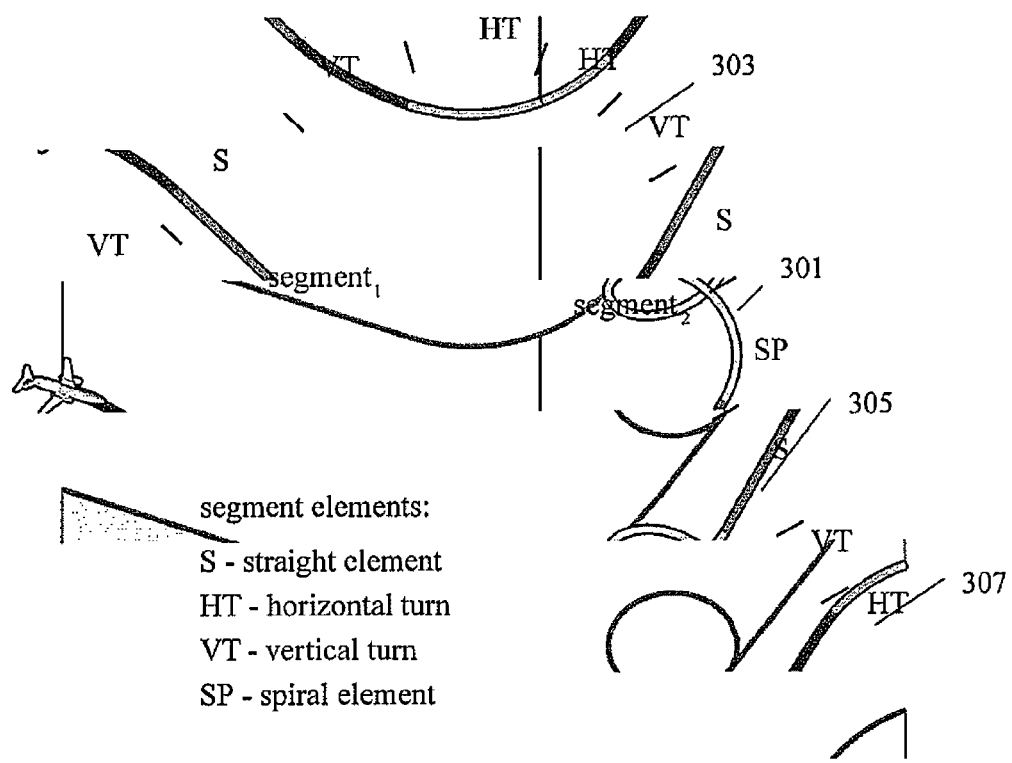
FIG. 7 is a graphical description of an exemplary flight plan.

Referring now to FIGS. 6 and 7, the behavior of the flying asset 113 $A_i \in A$ can be given by a specific flight plan $fp_i = (sp, e_1, e_2 \ldots e_n)$ defined as a start situation and an ordered sequence of flight elements. The state of the flying asset at time t can include position, direction vector, normal vector, and velocity, and can be defined as $\sigma(t) = <\bar{x}, \bar{d}, \bar{n}, v>$ where t is counted from the start of the $fp_i$. The start situation can include an initial state of the flying asset and a start time $sp = <\sigma(0), t_0>$. Each of the flight elements $e_i$ can be one of straight element 305, horizontal turn 307, or vertical turn elements 303, or spiral elements 301. Straight elements $e_{straight} = <l,a>$ are specified by their length and acceleration. In this case, the flying asset flies with the constant acceleration (the acceleration can be zero) for the specified time in the direction given by its initial state in element $\sigma_{e_i}(0)$. The final velocity (at the end of the element) is determined by the initial velocity, duration and acceleration. Horizontal or vertical turn elements $e_{turn} = <r,d>$ are specified by the turn radius (sign defines turn direction) and angle. They can be represented by circular arcs. Horizontal turns 307 are performed in the plane of flight. Vertical turns 305 are performed in the plane described by the initial flying asset direction and normal vector. Vertical turns 305 are used to represent parts of the flight path, where the flying asset changes its motion from a horizontal flight to ascend and descend trajectories. Spiral elements 301 $e_{spiral} = <r, d, c>$ are similar to horizontal turn elements, but also include climbing rates. A spiral element 301 is represented by a part of a spiral with an axis parallel to the z axis of the world coordinate system. The parameters of the spiral element 301 are the radius (the sign defines turning direction), duration, and climbing rate (sign defines if ascending or descending). The climb rate specifies how the altitude is changed on one turn. In one embodiment, the velocity can be changed only on the straight elements and on all others it can remain constant. Optionally, a warp element is defined which doesn't contain any trajectory definition, just a state $\sigma$. It can be internally used for the reduction of cumulative errors given by the differential description of the flight trajectory.

The elements can be constrained by the flying asset type that can specifies minimal and maximal flying velocity, minimal and maximal acceleration, minimal turn radius and max climbing/descending rate. Each element $e_{k+1}$ specifies a flight path part relative to the end of the previous element $e_k$ or from sp for the first element $e_0$, where sp is the starting position applicable for the first element $e_0$. Thus the path given by $fp_i$ is continuous and smooth. First derivation in all coordinates and time is continuous as well.

$FP = \{fp_i\}_{A_i \in A}$ is a set of flight plans of the flying assets in the airspace. The behavior of a flying asset can be specified by a mission. All points on the path of $fp_i$ must be in $Air_i$ and must be constrained by the flying asset mission $M_i = <wp_1, wp_2 \ldots wp_n>$, a sequence of way-points $wp_k = <\bar{x}, t_1, t_2>$. The way-point in $Air_i$ specifies the time interval by specifying $t_1$ and $t_2$ when the flying asset is allowed/requested to fly through. A function $p(fp_i, t)$ returns the position of the individual flying asset $A_i$ at the given time t. The way-point $wp_k$ is completed by the $A_i$'s flight plan $fp_i$ if $\exists t$ so that $p(fp_i, t) = \bar{x}^{wp_k}$ and $t_1^{wp_k} \leq t \leq t_2^{wp_k}$. In the other words, the path defined by $fp_i$ must go through each way-point at least once in the specified order of $M_i$. A segment represents a part of a flight plan between two successive way-points. The planning problem in FFD from the perspective of an individual flying asset $A_i$ with respect to the mission $M_i$ is the process of finding such a flight plan $fp_i$ so that $\forall wp_k \in M_i$ are completed. Each flying asset can alter its own current $fp_i$ anytime, but only the future part can be changed. The processes of (re)planning and collision avoidance are carried out in the same time as the process of mission accomplishment. Thus, the flying asset is allowed to change its flight plan in some future time t to be able to apply new changed $fp'_i$.

Figure 8:
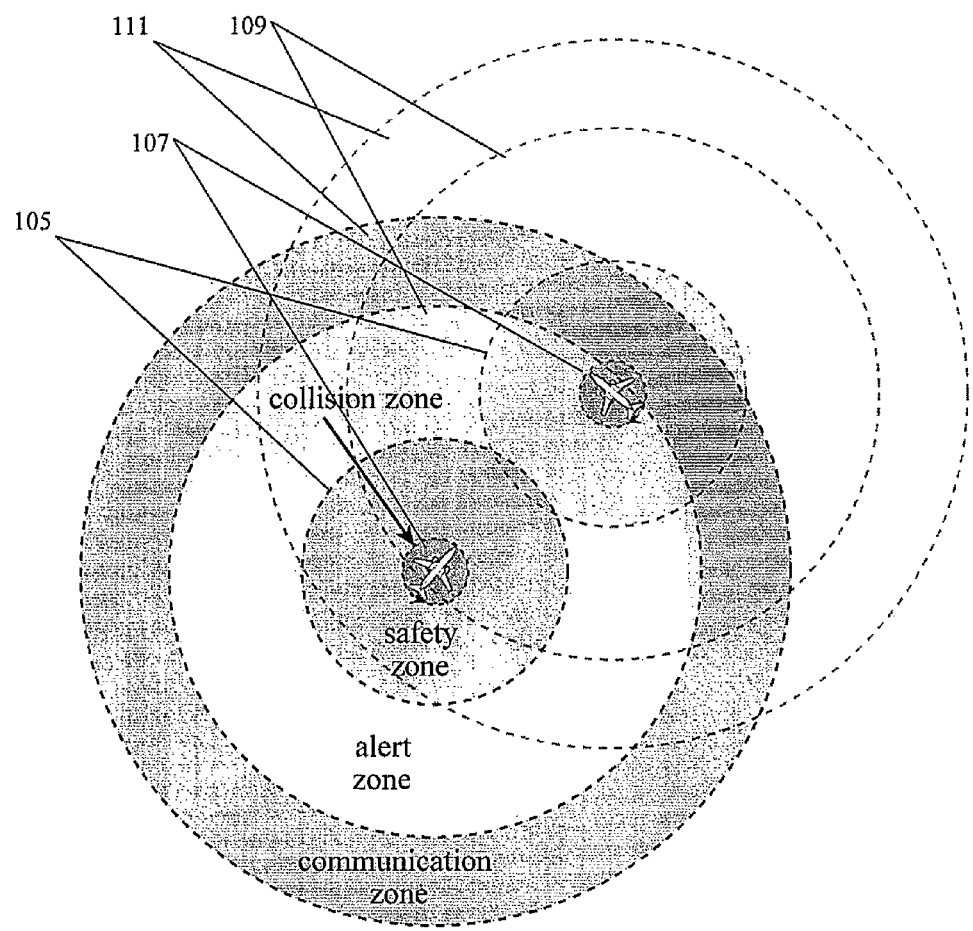
FIG. 8 is a graphical description of communication, alert, safety, and collisions zones around a flying asset.

Referring now to FIG. 8, each flying asset is surrounded by a number of concentric spherical zones. The same zone definition for all flying assets of a certain type can be used. Thus, there can exist flying assets with different zones at the same time. The zones are the communication zone 111, the alert zone 109, the safety zone 105, and the collision zone 107. The communication zone 111, the outermost zone, can represent the communication range of a data transmitter on the flying asset. The alert zone 109 can define the operation range of the radar sensing available to the agents controlling the flying asset. If another flying asset is located within the zone, agents can be periodically notified about its relative position. The radar data can be used for the non-cooperative collision avoidance and can also be used for checking known information. The safety zone 105 can be used for the separation planning of flying assets during collision avoidance. The collision zone 107, the innermost zone, can define a critical contact area. When two flying assets get too close together and their mutual distance is smaller than the sum of their collision radii, physical contact between them can occur. The safety zone 105 can be defined around each flying asset—a spherical space with a given radius $rsz_i$ for each $A_i$. The safety zone 105 can define airspace surrounding a flying asset where no other flying asset is allowed to appear, so that effects of turbulence caused by other flying asset and inaccuracy of flight plan execution (there are allowed small deviations from the flight path) can be avoided. Two flight plans $fp_i$ and $fp_j$ have a collision in time t represented by the following relationship:

$$col(fp_i, fp_j, t) = \begin{cases} 1_{if |p(fp_i,t),p(fp_j,t)| \leq max(rsz_i,rsz_j)} \\ 0_{otherwise} \end{cases} \quad (2)$$

Two flying assets $A_i$ and $A_j$ (with their flight plans $fp_i$ and $fp_j$ respectively) are colliding (denoted as $A_i \otimes A_j$) if and only if $\exists t: col(fp_i, fp_j, t)=1$, where $A_i \otimes A_j \equiv A_j \otimes A_i$. The set A is dynamic as there can be new flying assets created or removed (e.g. after landing) during the process of mission execution. In the FFD it is guaranteed that newly created flying asset $A_i$ has no collision on its flight plan $fp_i$ with any other existing $fp_j$ in next δ from its start. The δ value is specified for each flying asset and guarantees that there is enough air space to avoid a future collision which can happen just after flying asset creation. After δ the newly created flying asset can collide with other flying assets. Multiple collisions can influence each other. If $C_{all} \subset A \times A$ is a set of all colliding flying assets, a multi-collision set of collisions $C \subset C_{all}$ includes all related collisions. In C there is at least one pair of colliding flying assets $A_i \otimes A_j$ and in the same time there is no such collision $A_k \otimes A_l \in C$ so that neither $A_i$ nor $A_j$ does not have a collision with either $A_k$ or $A_l$ and there is no other collision in C that is linked with both $A_i \otimes A_j$ and $A_k \otimes A_l$ by a finite number of collisions. If C is viewed as an undirected graph, and each collision from the set C has one vertex in a graph, an edge between any two vertices exists if and only if there is at least one $A_i$ involved in both collisions represented by vertices. C is a multi-collision set if and only if its graph representation is connected (for every pair of distinct vertices in the graph there exists a path linking them both). The concept of a multi-collision set can also include the collision of two flying assets only. $A_C \subseteq A$ is the set of all flying assets which are associated with at least one collision in C. For a given multi-collision set C an encounter $en_k$ is tuple $<t,\{fp_i\}_{A_i \in A_C}>$ such that $t \geq now$ is a time point in the future from which the flight plans of the colliding flying assets can be changed. The collision avoidance problem (CAP) in FFD is defined as the process of finding such FR for which $C_{all}=\emptyset$. CAP can be solved by solving local collision avoidance problems (LCAP) applied on top of FP. The local collision avoidance problem (LCAP) (replanning) with respect to an encounter $en_k=<t,\{fp_i\}_{A_i \in A_C}>$ and FP is the process of finding such a solution $\{fp'_i\}_{A_i \in A' \subset A}$ founded in time t'<t so that the encounter $en_k$ is eliminated. The current time and time t from encounter gives the maximal interval in which the LCAP algorithm can search for the solution. The selection of the right time t in encounter is the part of the algorithm and can take into account its own properties. Two CAP algorithms applied to the same situation can be compared using their final flight plan utility values after accomplishment of all flying assets' missions. The utility function value $u_i(fp_i)$ used for comparison includes the flying asset's intention to propose a solution to the conflicts, for example, but not limited to, be as short as possible, use minimum of fuel, and fulfill time constraints of the way-points. The $u_i(fp_i) \in <0,1>$ is evaluated as a weighted sum of its components. Each flying asset can have different components, but each flying asset must use the same components in both compared CAP algorithms. For example, in one embodiment, if the social welfare criterion is to be met, one CAP algorithm is better if $\Sigma_{A_i \in A} u_i(fp_i)$ is higher where $fp_i$ represents the final flight plan of flying asset after applying CAP algorithm.

The flying asset can host one or more agents and provide them communication infrastructure via its on-board communication transceivers with limited range of communication $c_i$. So, the agents at $A_i$ can negotiate with agents at $A_j$ in time t only if $|p(fp_i,t), p(fp_j,t)| \leq min(c_i, c_j)$. The agents on flying asset $A_i$ have full information about its flight status and can call functions for altering $fd_i$. Using this transceiver, flying asset agents are aware of existence of other flying asset if the flying asset can communicate with them. There is no central element in the domain so the agent knows only information which can be obtained from its hosting flying asset or by negotiation with other agents. Even though the range $c_i$ is relatively large not all flying assets can communicate together. The domain also allows flying assets which are not capable to communicate with others due to several reasons: broken transceiver, or they don't want to communicate.

The simulation of the flight of flying assets can be performed by a flying asset simulation agent, which can reside on a server. This agent can maintain the information about the state of all flying assets present in the system, along with their flight plans. The flight of flying assets can be simulated by the evaluation of their flight plans over time using the flight model described previously. The simulation agent can simulate the flight of many flying assets at once. The flight paths of individual flying assets are not fixed after their first planning. They can be changed in the future (for example, if two flight plans were set on a collision course, the flying assets can change their flight plans to avoid the collision as described previously). The simulation agent can use global simulation time, which is the time of a global clock, called simulation clock, running on the simulation agent. This time can serve as a reference frame for all time information stored in the flight plans. When a new flying asset is created, a free "flying asset slot" is allocated in the flying asset simulator for its flight plan and state information. After the simulator receives a new flight plan for the flying asset, it starts executing the plan. Every flight plan has defined its own initial global simulation time $t_0$ (which is equal to the time when the simulator had received this plan) and all time information contained in the flight plan is considered relative to the initial global simulation time $t_0$. The flying asset simulator executes the flight plans in discrete time steps within the discrete simulation loop. The interval between two time steps/frames (i.e. updates of the state information of the flying assets present in the system) can be provided by a system configuration file. The simulator can maintain up-to-date information about the states of flying assets currently present in the system. The state information stored in the data structures of the simulator can contain the actual state of the flying assets at the moment of the last update. If the global simulation time of the last update is t and the state of each flying asset σ(t) describes its position, direction, normal, and velocity. For each flying asset, the flying asset simulator also can know its current position in the corresponding flight plan which means the current segment, the current element and the relative time from the start of the element. When a next update occurs, the global simulation time is $t'=t+\Delta t$, where $\Delta t$ is the time step duration between two successive updates. The state information and the positions of the flying assets in their respective flight plans are updated by executing the portion of their flight plans corresponding to the time Δt. During the executions of flight plans, the positions of the flying assets in the flight plans are adjusted accordingly. When the update ends, the new position of each flying asset can refer to a new segment, element, and/or relative position in the element. The segments and elements which were finished during the update are removed from the flight plans. If during the execution of the flight plan, the end of plan is encountered, the flying asset is removed from the simulation system. The time value Δt may be, but doesn't need to be, equal to the real time passed between two updates (in that case, Δt is equal to the update interval), but Δt is not required to be constant during the simulation. By changing the Δt value, it is possible to change simulation speed, for example, the simulation can be sped up, slowed down, or even stopped.

Figure 9:
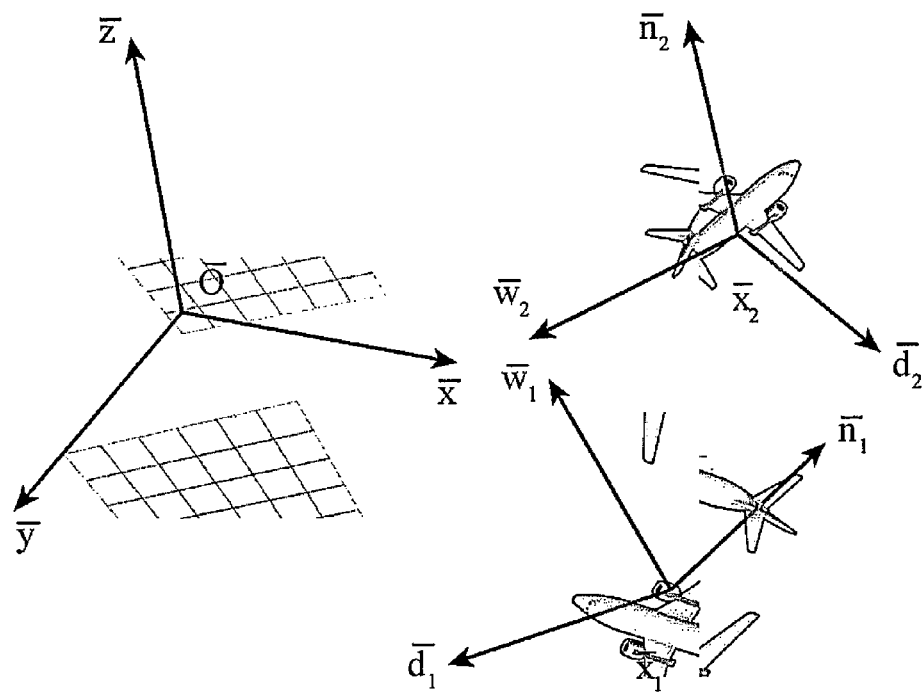
FIG. 9 is a graphical description illustrating world and local coordinate systems.

Referring now to FIG. 9, in the present embodiment, flying assets can be modeled as mass points which can move along pre-selected trajectories. The state σ of a flying asset at time t can be defined by the center of mass of the flying asset $\bar{x}$, a direction vector $\bar{d}$, a normal vector $\bar{n}$ and a velocity v. The direction vector $\bar{d}$ corresponds to the flight direction. The normal vector or up-vector $\bar{n}$ is perpendicular to the direction vector and always aims upwards. Vector $(\bar{d}\times\bar{n})/\|\bar{d}\times\bar{n}\|$ is a unit vector perpendicular to vectors $\bar{d}$ and $\bar{n}$, and denoted as $\bar{w}$. The quadruple $<\bar{x}, \bar{d}, \bar{w}, \bar{n}>$ defines the local coordinate system bound to the current state of the flying asset as opposed to the world coordinate system $(O, \bar{x}, \bar{y}, \bar{z})$. The plane defined by vectors $\bar{d}, \bar{w}$ and passing through $\bar{x}$ is referred to as plane of flight.

Figure 10:
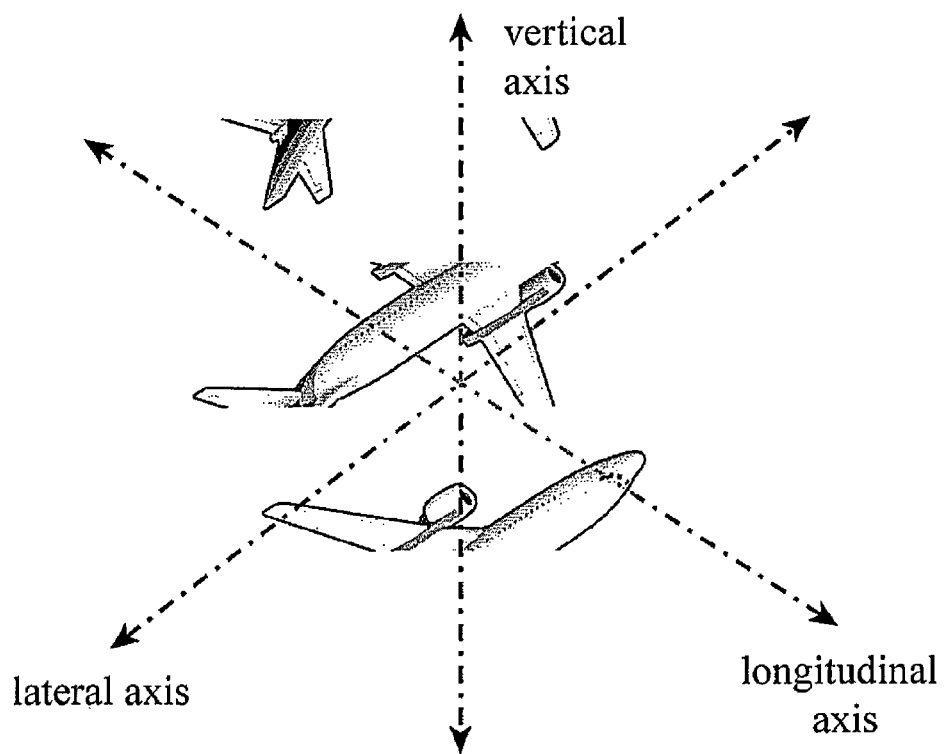
FIG. 10 is a graphical description of the axes of a flying asset.

Referring now to FIG. 10, the coordinate system referred to above is linked with the motion of the flying asset, and the directions of vectors $\bar{d}, \bar{w}, \bar{n}$ do not necessarily correspond to the directions of longitudinal, lateral and vertical axes of the flying asset. As opposed to simplified mass point model, the real flying asset has a specific geometry and shape of wings. For example, the lift and drag forces affect the flying asset movement thus the direction of flight of the flying asset is not identical to its main (longitudinal) axis, but there is nonzero angle α(frequently referred to as the angle of attack). Also, during turns, the flying asset is affected by the centrifugal force, which forces the flying asset to turn around its longitudinal axis.

Figure 11:
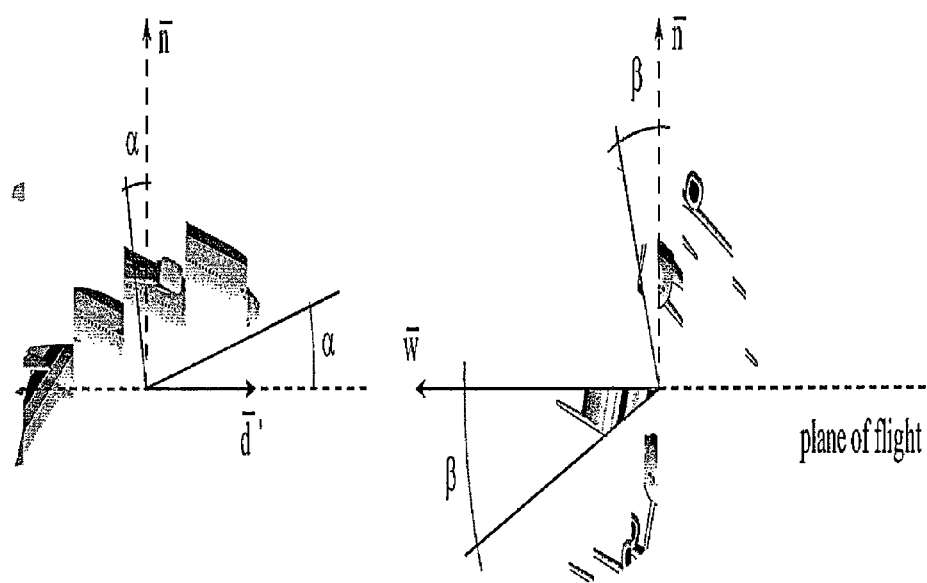
FIG. 11 is a graphical description of an angle of attack $\alpha$ and a bank angle $\beta$.

Referring now to FIG. 11, the angle between the plane of flight and the plane of the wings of the flying asset is called the bank angle β. The five main forces, which affect the movement of an flying asset during the flight, can be expressed by the following simplified formulas:

$$\text{gravity } G = mg, \qquad (3)$$

$$\text{lift } L = \frac{1}{2}C_L A \rho^2,$$

$$\text{drag } D = \frac{1}{2}C_D A \rho^2,$$

where $$C_D = C_{D_{min}} + \frac{C_L^2}{\pi \cdot ar - 0.75},$$

thrust $T$, and $$\text{centrifugal force } C = \frac{mv^2}{R}, \text{ present during turning}$$

The meaning of the parameters mentioned above is as follows: in is the flying asset weight, g is the acceleration of gravity, $C_L$ is the coefficient of lift, $C_D$ is coefficient of drag, A is the area of wings, ar is the aspect ratio of wings, ρ is the air density, v is the flying asset velocity and R is a radius of turning. These formulas are used to determine the magnitudes and directions of the forces affecting the flying asset. This information is then utilized for calculating the pitch and roll angles of the flying asset and for computing the thrust force. The pitch—the angle between the longitudinal axis of a flying asset and $\bar{dw}$ plane—and roll—the angle between the lateral axis of an flying asset and $\bar{dn}$ plane—angles are used for the simulation of the radars since the area of the flying asset profile visible from the ground depends on the banking of the flying asset. From the magnitude and direction of thrust can be estimated the fuel consumption. In the present embodiment, certain aspects of the flying asset geometry, such as flaps or landing gear, can be, but are not required to be included in the model, the flying asset weight is assumed can be, but is not required to be, constant during the entire flight, and the impact of wind on the velocity and direction of the flying asset movement can be, but is not required to be, included in the model. The flying asset can be, but is not required to be, assumed to always follow its planned trajectory and move at a defined velocity.

The planning of the flight path of a flying asset is performed by a planner—a component of the pilot agent. The result of the planning is the flight plan. The inputs to the planner are the mission specification for the flying asset (represented by the list of way-points which the flying asset has to visit) the velocity restrictions given by the fixed parts of the flight plan, and defined flying asset airspace. The defined airspace is restricted by no-flight zones, which the flying asset must not enter during its flight, and plan the path to avoid them. The planner performs replanning which can change a part of an existing flight plan while keeping the rest of the plan intact. The replanning can be performed after collision avoidance and to alter the flight plan to avoid the no-flight zones. The replanning can be performed by means of inserting special way-points into a particular segment or segments which can cause the splitting of the replanned segment into two or more new segments. These segments can be submitted to the planner, thus creating a replanned flight path. Solver way-points can be used during the collision avoidance for applying evasion maneuvers.

The planning of a flight path can proceed in two phases. In the first phase, path planning, the planner can generate an initial flight plan which passes through all input way-point. If there are any time constraints associated with the way-points, they can be ignored in this phase. The planned path is created to be as short as possible, but still respecting defined airspace, thus excluding any defined no-flight zone. In the second phase, time planning, certain parameters of the elements generated in previous step are adjusted such that the modified flight plan satisfies (if possible) the time constraints. In the first phase, the planner can generate a detailed flight plan in such way that the flight path will correctly pass through all the way-points. For each couple of successive way-points, a segment can be generated. The segment is empty, containing no elements. A segment represents the smallest part of the flight plan which can be planned independently on the other parts of the flight plan. Each segment has several parameters, serving as inputs for a planning algorithm, which can fill the initially empty segment with elements. These parameters can include, but are not limited to including, the start and end points of the segments with the tangents to the flight plan in these points. The tangents are calculated from the input set of way-points and chosen in such a way that the tangent in the end point of some segment and the tangent in the start point of the next segment will point in the same direction. This property is called geometric continuity or $G^1$. The planning algorithm can insure that the same condition holds for the elements of the segment, making the planned flight path $G^1$ continuous. During the process of computation of tangents for the waypoints, the distance from the nearest obstacle (e.g. ground or no-flight zone) from the point in the selected vector in positive as well as negative directions is determined. If there is not enough space to successfully insert elements associated with flying asset type constraints, the tangent in that way-point is adjusted to fulfill the restrictions and have minimal variation from the optimal tangent.

Exemplary planning algorithms are (1) a fast two-phase A* path finding algorithm and (2) a maneuver-based path-finding algorithm. The maneuver-based path-finding algorithm is defined by two points—start, destination—and by two vectors—initial direction, target direction. The maneuver-based algorithm can incorporate a single A* progressive path planning. As the problem is defined over a continuous airspace and flight plan elements, it is necessary to apply a suitable discrete sampling. The algorithm uses dynamic size of the discrete sampling step depending on the distance from the nearest obstacle from the current position. The size is smaller when it is close to the obstacle, and the size is larger when it is far from the nearest obstacle. The number of discrete sampling sizes is given by the planner configuration and is specified for a particular world. To be able to find small holes in large obstacles the testing distance for appropriate sampling step is given by that size and each new step size must be two times smaller than previous one. The algorithm uses path smoothing for removing influences of that dynamic discrete sampling.

Figure 12:
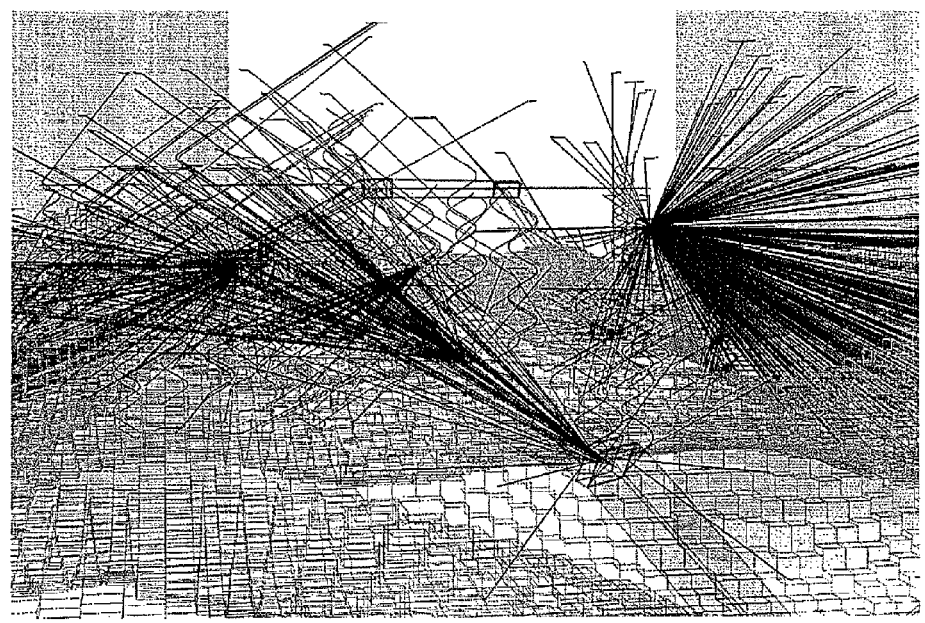
FIG. 12 is a graphical description of the expansion of a maneuver-based path-finding algorithm using dynamic discrete step length in the 3D world with defined no-flight zones.

Referring now to FIG. 12, there is expansion visualization for the 3D world with defined no-flight zones. For the example, the algorithm searches for the optimal trajectory over more than thirty thousands elements. The discrete sampling of a continuous airspace is done by dividing the plan to several connected search maneuvers. In other words, the search algorithm searches for the chain of that search maneuvers connecting the start point and destination point exactly (respecting given initial and target direction vector) with minimal criterion value. Each search maneuver is defined by its initial position in airspace and a normalized direction vector. The search maneuvers can have additional parameters. Each search maneuver is also defined by expressions for the calculation of the destination point of the search maneuver and a target direction vector. Each search maneuver also defines an expression for the calculation of the length of the search maneuver which is used for building criterion function for the path search. Simple search maneuvers correspond to types of elements of the flight plan and their parameters are described by constants. When using only simple constants, the existence of the solution is not guaranteed because of discrete sampling and the requirement to reach the exact destination point and target direction vector. Therefore it can be necessary to extend the set of simple search maneuvers with combined search maneuvers. They consist of one or more simple search maneuvers whose parameters can be determined exactly. For example, for a combined search maneuver of flight between two points, parameters of the inner search maneuvers can be calculated so that the destination point of the combined search maneuver matches exactly the requested destination point and so that the target direction vectors match. Expansion of the state space is then carried out by chaining the search maneuvers according to the A* algorithm, i.e. by the sum of path price g (given by the search criterion function) and estimated price (heuristics) h of the path to the destination point. The expansion discrete step is identified by the end point of previous search maneuver from the configuration (as described above). Only such search maneuvers are added that do not leave given airspace, i.e. they do not run through a ground surface or no-flight zone. This can be tested using line approximations for its defined flight plan elements.

Figure 13:
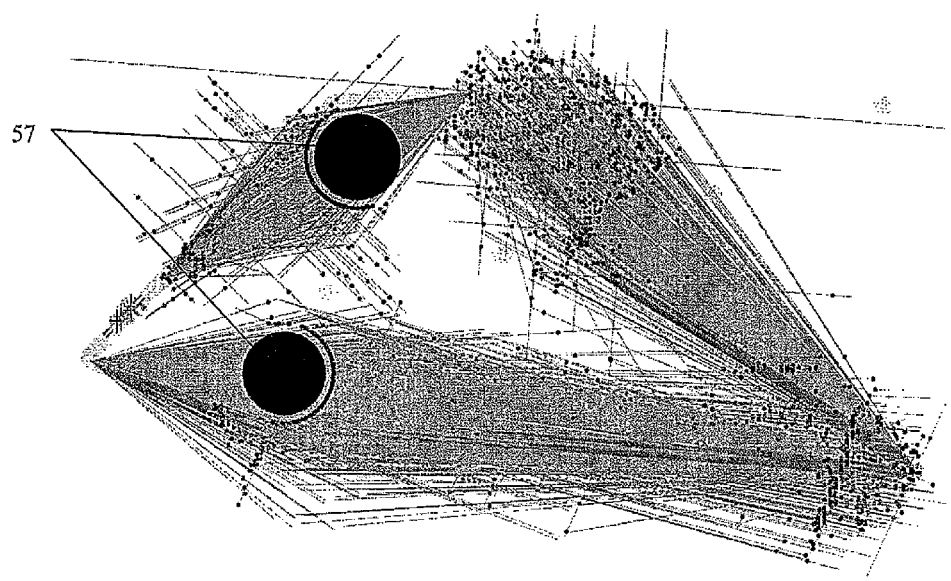
FIG. 13 is a graphical description of tested lines for intersection with obstacles.

Referring now to FIG. 13, testing lines from the top perspective which are tested for the example in FIG. 12 are shown. Intersection points 57 indicate the first line intersection with boundary of defined airspace. The intersections around cylindrical no-flight zones, for example, relate to the intersections with ground surface. Each newly expanded search maneuver is tested if the search algorithm has already visited that position. The test is done by comparing the end points and the direction of the end points. The test is done against all closed and not visited but kept in open nodes. To accelerate testing, a special hashing test can be used to support the dynamic discrete sample step. An epsilon-neighborhood to match equality and a similar epsilon neighborhood in the direction mismhash exist. If the match is found, the values g+h are compared and if the new expansion is an improvement, the old one is replaced and moved back to open set. The size of the epsilon test depends on a current dynamic discrete factor.

For each newly connected search maneuver, the possibility of replacing this search maneuver with a smoothing search maneuver is tested. The testing process tries to sequentially replace the path between the previous search maneuver and the search maneuver being connected. Previous search maneuvers are tested starting from the first search maneuver of the entire planning task to the search maneuver directly preceding the one being connected. The smoothing search maneuver is adopted when it does not intersect a no-flight zone and its length is not greater than the length of the existing path plus the length of the added search maneuver that is supposed to be replaced (smoothed). The smoothing search maneuver can be as short as possible between its end points, and can provide a shortened connection and/or a connection with fewer flight plan elements, which can lead to better g criteria. The price of path g is calculated as the length of maneuvers including the current one. The value of heuristics h is calculated as the length of the theoretical combined shortest smoothing search maneuver between two points, from the end point of the current maneuver to the global destination point. The use of the smoothing search maneuver as a heuristics predictor can provide a satisfiable heuristics function for the search problem, and can address the situation in which the current end point is too close to the destination but has a wrong direction which may prevent achieving the final point due to the constraints given by the flying asset model. The algorithm can terminate upon removing the search maneuver reaching the final destination (both in the position and direction without any tolerances) from the OPEN list or upon emptying the OPEN list. If the path is found, i.e. if the search maneuver most recently removed from the OPEN list reached the destination point, the actual path is generated using a backward trace, where simple flight maneuvers are converted to flight plan elements. The algorithm can choose the search maneuver with the lowest value g+h from the OPEN list.

Figure 14:
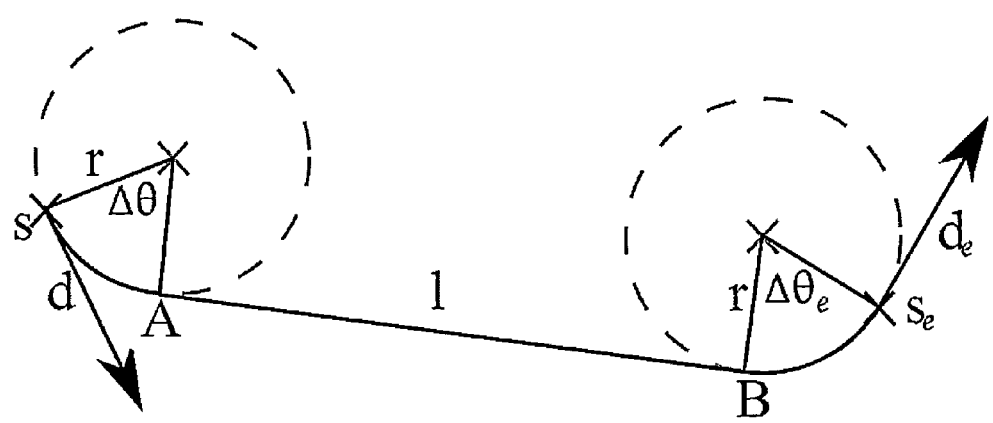
FIG. 14 is a graphical description of a combined search maneuver between two points on the same flight level.
Figure 15:
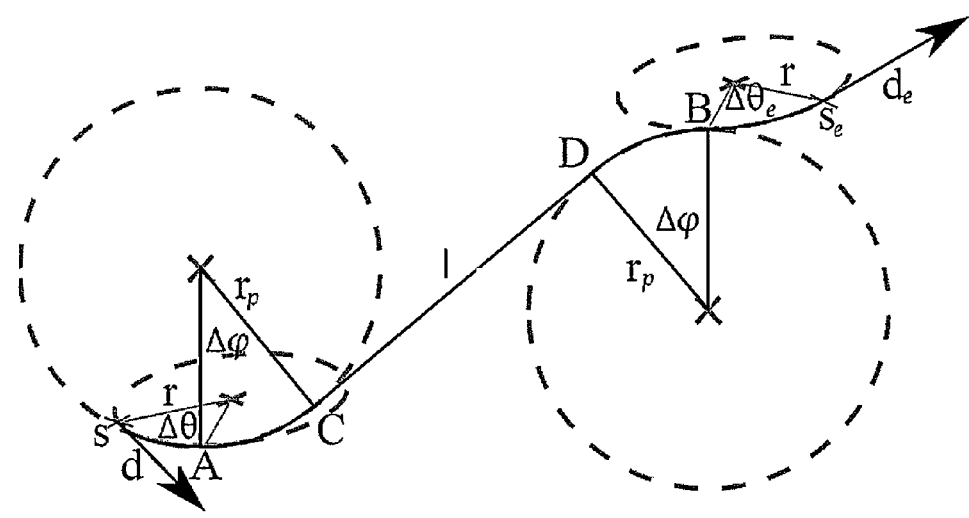
FIG. 15 is a graphical description of a combined search maneuver between two points on different flight levels.
Figure 16:
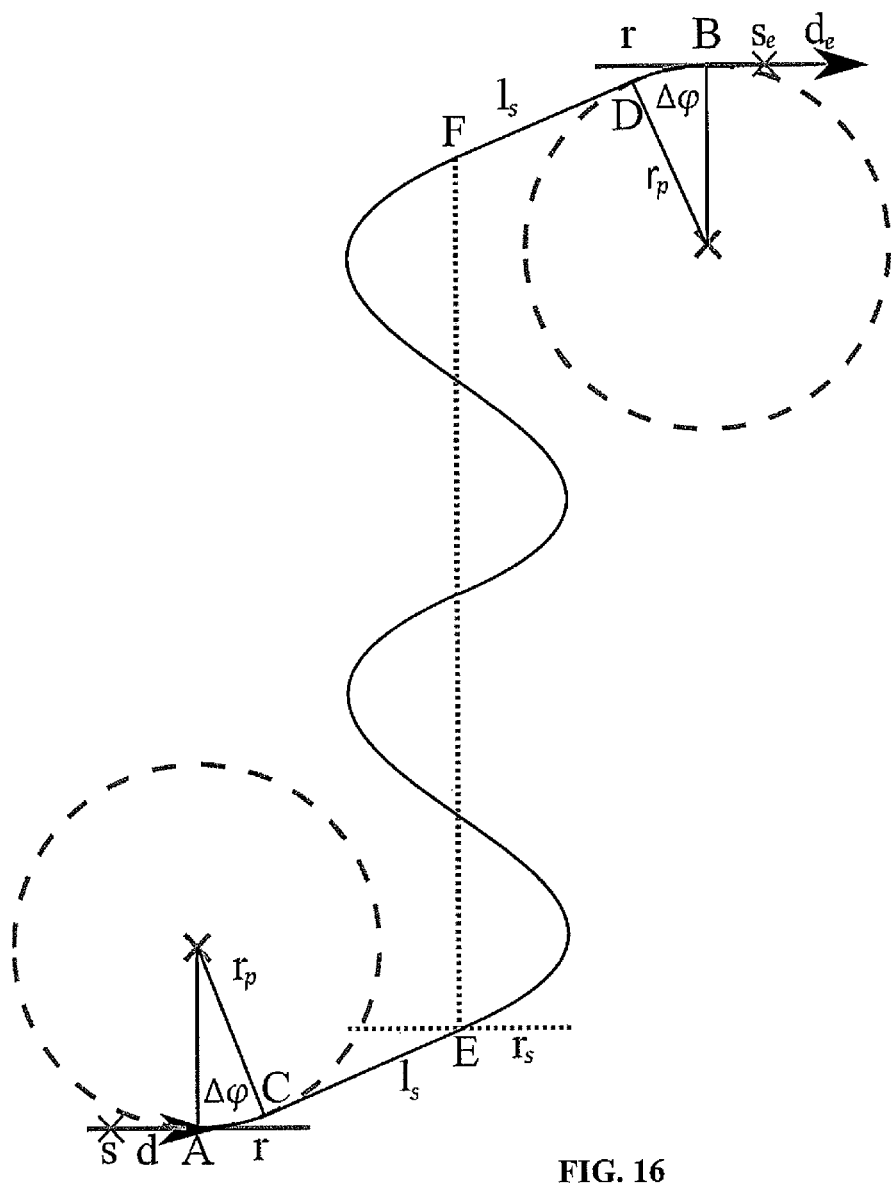
FIG. 16 is a graphical description of a combined search maneuvers between two points on different flight levels using a spiral.

Referring now to FIGS. 14-16, simple search maneuvers used within a maneuver-based path-finding algorithm can include, but are not limited to including, straight flight, horizontal turn, climbing/descending, and spiral. Straight flight is basic search maneuver following a straight line. Horizontal turn is a search maneuver following a section of a circle lying in a horizontal plane. Climbing/descending is search maneuver following section of a circle lying in a vertical plane. Spiral is a climbing/descending search maneuver following a spiral. The x and y coordinates of the start and end points of the spiral search maneuver are identical, the only coordinate that differs is z (the altitude). Combined search maneuvers can include, but are not limited to including, combined flight search maneuver towards the desired flight level (FIG. 14), combined flight search maneuver connecting two points (FIG. 15), and combined smoothing search maneuver (FIG. 16). The combined flight search maneuver connecting two points can include, but is not limited to including, the following maneuvers: (1) turn towards the destination point (horizontal turn search maneuver), (2) climb/descent towards the destination point (climbing/descending search maneuver), (3) straight flight towards the target flight level (straight search maneuver), (4) spiral flight to the desired flight level (spiral search maneuver), (5) straight maneuver to the target flight level (straight search maneuver), (6) altitude correction to the target flight level (climbing/descending search maneuver), (7) optional correction towards the destination point and target direction using spiral search maneuver (combined search maneuver connecting two points), and (8) turn towards the destination point (horizontal turn search maneuver). The combined smoothing search maneuver, which can serve as an element connecting two points with arbitrary direction vectors, can include, but is not limited to including, the maneuvers of (1) climb/descent towards the desired flight level (combined search maneuver towards the desired flight level), (2) flight between two points on different flight levels (combined search maneuver connecting two points), and (3) climb/descent towards the target direction (inverse combined search maneuver towards the desired flight level).

Figure 17:
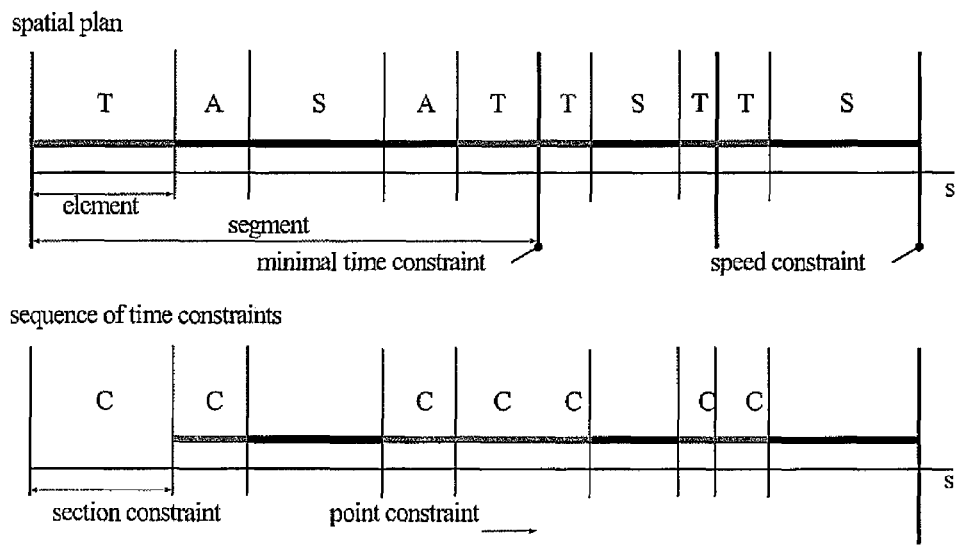
FIG. 17 is a graphical description of a time lines illustrating a sequence of time constraints and their respective source spatial plans in which T is for turning, A is for climbing or descending, S is for straight flight, and c is for constant speed.

Referring now to FIG. 17, the flight plan, which is the output of the first phase of planning (spatial planning), constitutes the initial sketch of the flight route of a flying asset, and may not take into account the time relations along it and the temporal data assigned to the way-points. In the second phase of planning, the previously planned segments can be adjusted so that the resulting flight plan can conform to the time constraints. As a result, the time of flight through each segment can correspond to the time constraints defined in the start and end way-point belonging to the segment. In one embodiment, a transformation that converts a spatial plan to a sequence of time constraints can be used, i.e. from $R^4$ to $R^2$, where three dimensions can become one that corresponds to lengths of elements (maneuvers). Time constraints can include, but are not limited to including, point constraints and section constraints, including, but not limited to, speed point constraint $\{v_c,s\}$, minimal time point constraint $\{t_{min},s\}$, maximal time point constraint $\{t_{max},s\}$, free point constraint $\{s\}$, constant speed section constraint $\{l,s\}$, and free section constraint $\{l,s\}$. Speed point constraint defines that the given point s in the plan must be flown through at the speed of $v_c$. Minimal time point constraint defines that the point s must be flown through at time $t_{min}$ at the earliest. Similarly, maximal time point constraint defines that the point s must be flown through at time $t_{max}$ at the latest. Free point constraint can include other types of constraints. Constant speed section constraint and free section constraint can be applied homogenously to a section of the plan starting with a point s and of length l. Constant speed section constraint can prohibit the speed from changing within a section of the plan, and can be used for flight plan elements other than straight ones which do not allow speed changes (turns and spirals). Free section constraint can be used for filling a space with no constraints (for straight elements). A sequence of time constraints generated this way can be used as the input for a time planning algorithm, making the task defined by the sequence. The time planning algorithm can be based on the chaining of particular elements. In the case of time planning the elements are time plan elements. Time elements can be chained one by one, with pre-calculated parameters, and thus, a single maneuver is not expanded to many potential successors. Elements of the time plan a single successor, with the exception of the last element which has no successor. Time elements have a start point $\bar{s}$ (in the fore-mentioned space $R^2$, where point $$\begin{pmatrix} t \\ s \end{pmatrix}$$

has one time dimension t and one space dimension s) and initial speed v. Time elements can have additional parameters and defined expressions for calculation of the destination point $\bar{s}_e$ and target speed $v_e$. The time planning algorithm can operate in sequences of time constraints. Each sequence can contain an arbitrary number of time section constraints and one point time constraint at the end. Point constraints inside the sequence may not be permitted if they would interrupt the sequence. The point constraint at the end can define the type of the sequence and thus also the planning method. The example sequence of FIG. 13 depicts two sequences. The first consists of five section constraints—two constant speeds, one free, and two constant speeds again—and a minimal time point constraint at the end. The sequence is referred to as a minimal time sequence. The other one also consists of five section constraints (one constant speed, one free, two constant speeds or which one is free) and is a speed sequence. Sequences can be planned in successive steps. The algorithm can connect the time elements so that the section constraints are fulfilled and so that the point constraint at the end of the sequence is fulfilled as closely as possible. Time elements can be connected continuously speed-wise and smoothly direction-wise. If time elements cover the entire sequence of time constraints, or if planning of all sequences is over, the time plan has been generated and can be transformed to a spatial plan, i.e. planned increments and decrements of speed are added to the spatial plan. Optionally, slow-down spirals can be inserted. At that point, the flight plan is completed and ready for use.

Figure 18:
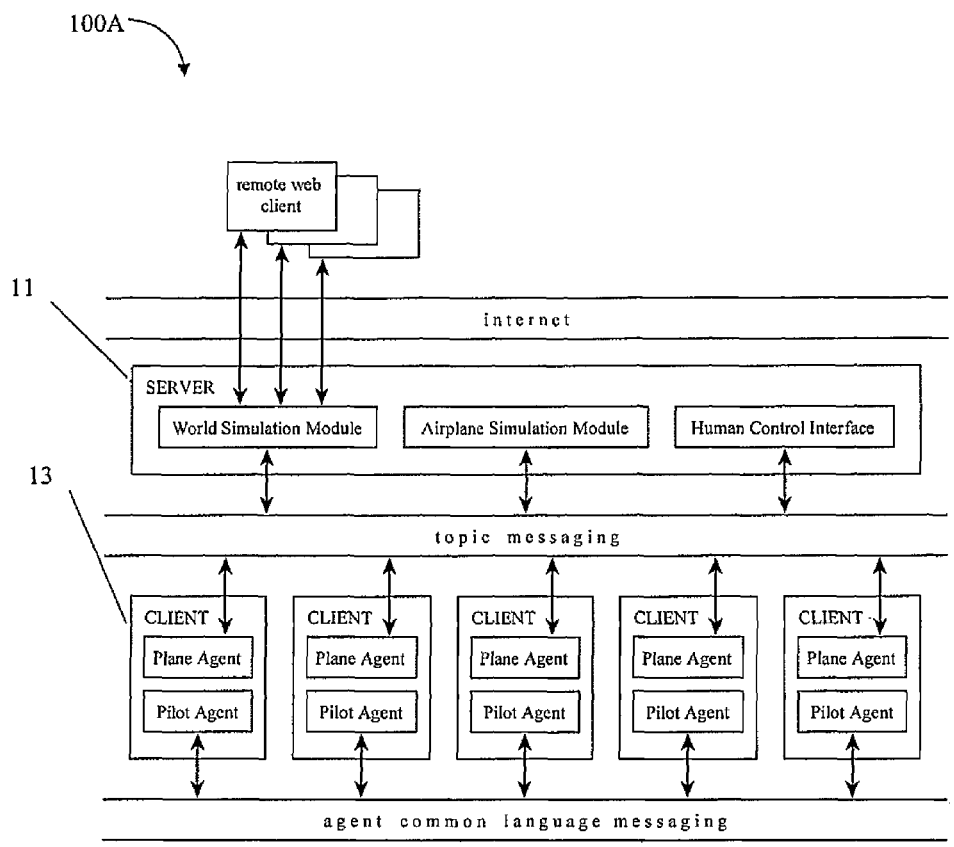
FIG. 18 is a schematic block diagram of a system structure overview for the present embodiment.

Referring now to FIG. 18, architecture 100A can include, but is not limited to including, a server component executing modules for environment simulation and one or more client components for executing flying assets. Server 11 can support a scalable and efficient simulation of simultaneously flying UAAs in a simulated environment. Client 13 can provide support for planning of 3D spatial plus temporal flight trajectories of individual UAAs as well as dynamic flight plan reparation. Architecture 100A can be distributed over more than one computer. On each computer, there can be a platform executing JVM. The distribution of UAA containers can be balanced automatically over the available computers. Server 11 functions can be distributed. Server 11 can be a single central element and can be used for the environment simulation. Server 11 can simulate positions of flying assets and other objects in the simulated world, flying asset hardware, weather conditions, communication ranges given by range of board data transmitters, etc.

Figure 19:
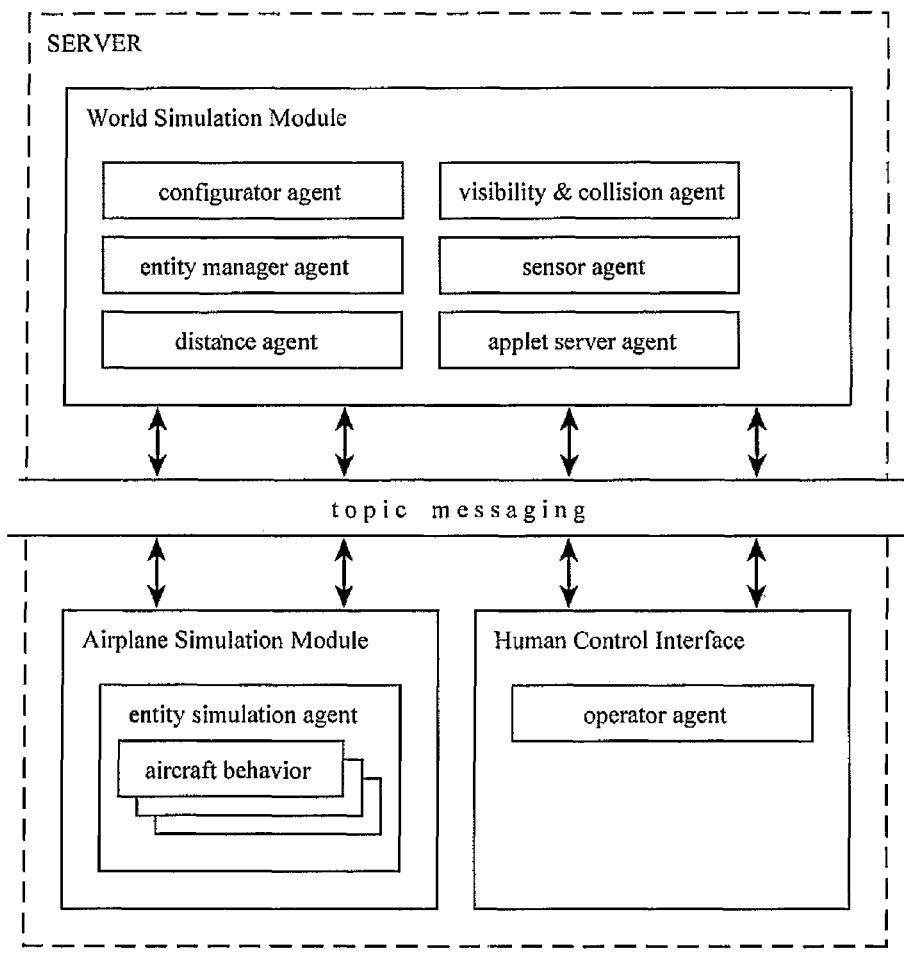
FIG. 19 is a schematic block diagram of server components of the present embodiment.

Referring now to FIG. 19, one of the simulation components can acquire and fuse of information about all flying assets having geographical and tactical data sources. The simulation component can be a scenario player which can create new flying asset with a rough plan mission in at a certain time. Server 11 can include, but is not limited to including, a world simulation module. The world simulation module can include, but is not limited to including, configuration agent, entity manager agent, distance agent, visibility and collision agent, sensor agent, and applet server agent. The applet server agent can include, but is not limited to including, flying asset simulation module and human control interface. The human control interface can include, but is not limited to including, an operator agent. The flying asset simulation module can include, but is not limited to including, an entity simulator agent. The world simulation module is responsible for creation and maintenance of a data model of the simulated world and manages the dynamic execution of simulation scenarios. This module is responsible for real-time changes of the simulated environment, such as weather conditions, no-flight zones etc. A scenario execution consists of runtime creation as well as termination of flying assets defined in the scenario configuration. The world simulation module can ensure physical consistency of the simulated world, including checks for collisions both among the flying assets and collisions of flying assets with the world's surface.

The configuration agent can enable a user to select a current configuration using, for example, a user interface. The configuration agent can load an initial selected configuration and distribute information to other agents, and can allow a user to change the configuration within an operational embodiment. If the embodiment is running on more than one computer, the configurations can be distributed from the computer where the configuration agent is. A user can modify the configuration and restart the simulation without copying changed files to other computers.

The entity manager agent can administer connected computers, start new or remove existing flying assets, and provide an initial flight mission to a flying asset. Depending on the current system configuration, scenario player modules can be loaded. Each scenario player module can start new or remove existing flying asset, and can provide its initial configuration. Types of scenario players can include, but are not limited to including, general, user startup, and experiment. The general scenario player can play a scenario exactly as specified in a scenario script file. There can exist more than one instance simultaneously playing different script files. The user startup scenario player can provide a graphical user interface that can allow a user to generate new flying assets in the simulated world manually. The experiment scenario player can be used for performing experiments, can automatically start more than one repetitive run, and can acquire requested measured values. The entity manager agent can balance the load among connected computers that are executing the present embodiment. A new flying asset container can be initiated, for example, on the computer where there are a minimum number of executing flying asset containers. Depending on the configuration the selected scenario can be started in off-line planning, normal, or validation simulation phase.

The distance agent can count Euclidian distances between every pair of existing flying assets using the positions generated by the flying asset simulator agent. It can provide Euclidian distance in the X-Y plane and other statistical values, such as minimal separation from each flying asset and overall minimal separation among all flying assets.

The visibility and collision agent can prepare visibility updates for controlling communication restrictions among all flying assets. It can detect whether there is a physical collision between flying assets. If a collision is detected, the flying asset behavior model can be notified about it. The flying assets that collided with other objects can be uncontrollable and they can descend to the ground. Falling flying assets can endanger any flying asset that flies under them. The sensor agent can represent radar sensors on flying asset control panels. Flying asset agents can register specific sensors within the sensor agent. The sensor agent can send radar information to the registered agents depending on the sensor characteristics and flying asset positions and orientations.

The applet server agent can execute an HTTP server and an applet data server, and can include external data layer providers. It can provide a communication interface between the present embodiment and a remote web client. For allowing access to the present embodiment from networks shielded from the Internet by proxy servers, the HTTP server can listen on, for example, standard TCP/IP port 80, and the applet data server can listen on, for example, port 443. The present embodiment can generate cache and proxy control headers for controlling cache content validity. The applet server agent can include, but is not limited to including, running data layer providers which can provide external and internal content to remote clients.

The flying asset simulation module can execute flight plans received from a corresponding client-side component, for example, a pilot agent, in the form of a sequence of commands. Both the execution of these commands and checking of their validity can be performed by the flying asset simulation module independently of the pilot agent. This approach can ensure correctness and consistency of the flying assets' behavior. Each flying asset can be enabled to respect physical restrictions of its own as well as of the environment. Each flight plan can be executed until, for example, its end is reached or until a new plan is received from the client. Due to separation of the server and the client, the physical simulation in the environment is carried out even if the client is unavailable, for example, if it is overloaded, or if it stops responding, etc. The failure of a flying asset does not result in the failure of the entire simulated system. If the client is missing altogether, the flying asset can behave as a non-reasoning, passive entity.

The entity simulator agent can compute true position of the flying asset in the simulated world. Each entity in the simulated world has assigned an entity behavior model module which is responsible for the entity physical location and behavior. For the flying asset model, in the present embodiment, a physical model for a flying asset that holds its current flight plan and state is created. When a pilot agent changes some part of the flight plan, the change is propagated via the flying asset agent to its behavior model running in the flying asset simulator agent by the difference flight plan update. The entity behavior model module can provide the flying asset position in current simulation time. The entity behavior model module can manage collision situations, e.g. free fall simulation.

The human control interface is responsible for real-time visualization, and can enable the user to dynamically control the simulation in terms of changing the state of the world, and to control the flying assets' high-level behavior, such as, for example, to change its mission waypoints, to add or modify no-flight zones, to change the internal structure of its collision avoidance architecture, or to change its planning priorities. In order to successfully propagate the user-defined changes related to an individual flying asset, the client-side module of the flying asset can provide an interface to accept and apply these changes.

The operator agent is an optional component that can provide real-time system state in, for example, a 3D/2D environment, to the user. Provided information layers can depend on the current configuration. Agents can be executing simultaneously and can provide information that is accessible to those with proper access level rights. The operator agent can route user commands to the system or can be directly connected to a flying asset. The operator agent can provide human-system interface to the user who can manage the flying asset's way-point plan (mission) or manage no-flight zones.

The flying asset simulation module can receive flight plan updates from flying assets.

Server agents can communicate with each other using, for example, topic messaging. The communication between server agents and platform hosted agents can also be managed by topic messaging.

Figure 20:
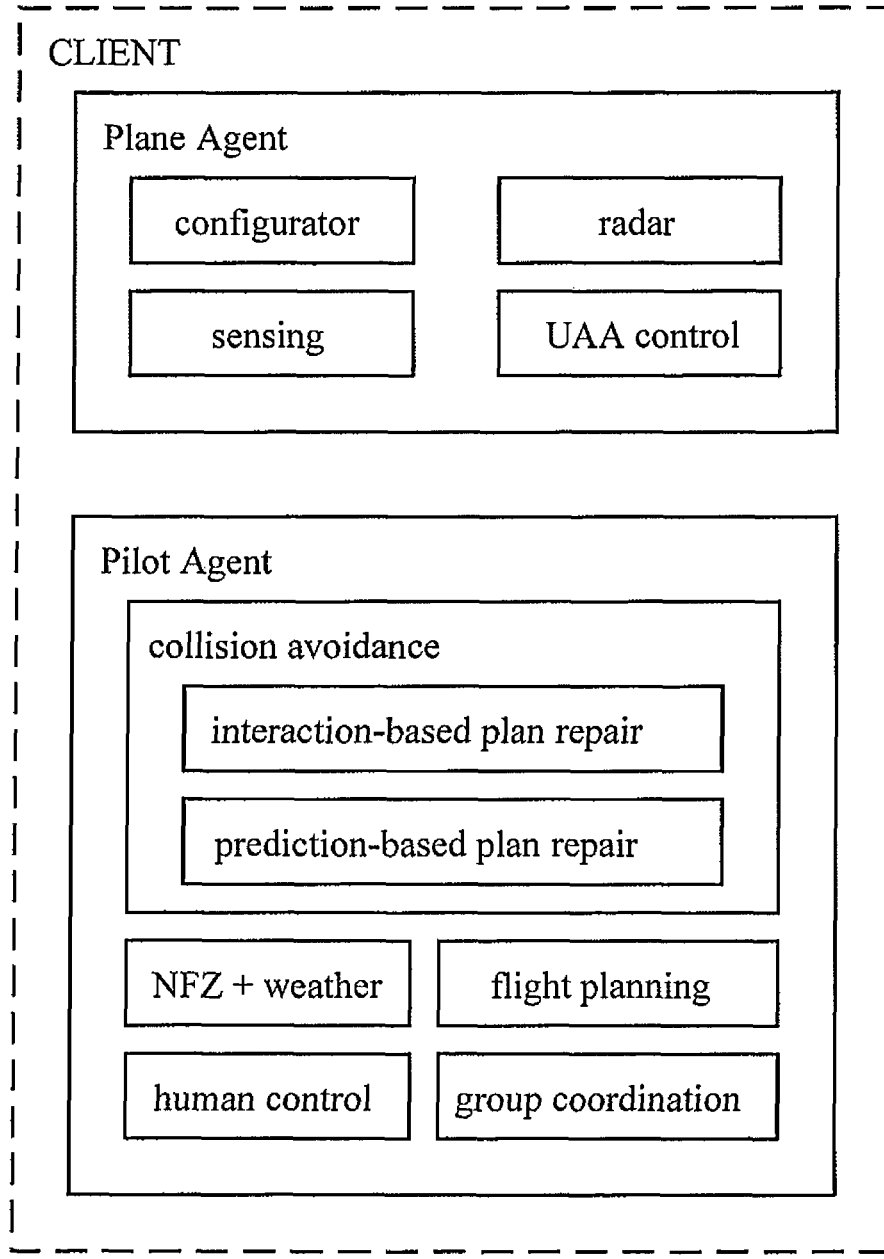
FIG. 20 is a schematic block diagram of client components of the present embodiment.

Referring now to FIG. 20, each UAA can be represented by a client-side container hosting, for example, two agents. The flying asset agent can provide sensory data and is responsible for communication with the server. The pilot agent can perform high-level control of the flying asset, for example, planning and maintaining a collision-free trajectory with respect to its current mission. The UAA containers can interact with the server components responsible for the environment simulation using topic messaging. Interaction among UAA containers can be used for cooperative collision avoidance negotiation using access controlled messages among agents. One container on each JVM can be dedicated to communication with the server. If there are more JVMs connected to the system, new UAA containers can be automatically balanced among them. Therefore the scenario setup configuration can be independent of the numbers of computers executing in the embodiment.

The flying asset agent can provide services to the pilot agent which can represent a high-level control module of the flying asset. The flying asset agent can provide configuration, radar, time, UAA control, and an operator bridge to the pilot agent. The configuration can include, but is not limited to including, UAA type descriptor and initial mission specification with its way-point plan, with or without time constrains. The type descriptor for the flying asset can hold information about the flying asset's capabilities, such as minimal and maximal flight velocity, acceleration, declaration, minimal turning radius, maximal climbing angle, weight, etc. The radar can send information gathered from the UAA's onboard radar in the form of the actual position of observed objects. The information can be repeatedly updated with each radar scan. The time can broadcast timestamps. The UAA control can provide flight plan execution and can provide UAA position and state. The executed flight plan can be changed at any time by, for example, a sending differential update for the current flight plan. The operator bridge can send information to the graphics layers in the operator agent and can provide bi-directional communication interface between a human-computer interface module executing in the pilot agent and another user interface. The flying asset agent can provide an interface to the simulated environment which can be implemented by, for example, an exchange topic messages between the server and the flying asset agent. For operational purposes, the flying asset agent can be modified to provide an interface to the operational UAA sensors and actuators for controlling UAA motion.

The pilot agent is a high-level control unit of the UAA. It can generate an initial flight plan which can be collision-free throughout its execution using the collision avoidance mechanism. The pilot agent can include, but is not limited to including, flight planning and collision avoidance modules. The flight planning module is responsible for planning and replanning of a 3D spatial and temporal trajectory associated with requests received by other modules. The flight planning module can interact with a no-flight zones manager. The collision avoidance module can have, for example, a multi-layer collision avoidance architecture which can allow the use of several types of collision avoidance methods simultaneously. Both cooperative, for example, interaction-based, and non-cooperative, for example, prediction-based, collision avoidance algorithms can be incorporated in the present embodiment. The cooperative algorithms can solve collisions using negotiation with other involved cooperative flying assets. The non-cooperative algorithms can monitor and predict future possible positions of visible objects and replan the flight plan to avoid detected collisions. No-flight zones and weather manager are optional modules that can manage the flying asset's airspace definition. These modules can be used for, for example, modeling of the world's surface for purposes of flight planning, static no-flight zones (i.e. pre-defined stationary zones surrounding significant objects such as nuclear power plants etc.), weather conditions (no-flight zones whose shape and associated attributes can change over time), and dynamic no-flight zones (which can be used during non-cooperative collision avoidance to wrap other flying assets with). The human computer interface module is an optional module that can allow a human operator to change, for example, the UAA's mission (way-points' definition), its no-flight zones definitions, or its collision avoidance module. The human computer interface module can interact with the operator agent located on the server. The group coordination module can be used for collective flight by performing inner group synchronization. The group coordination module can decide if and where to take a holding orbit to wait for delayed flying assets, can perform composition and decomposition of the flight formation package, and can guarantee collision-free paths. The group coordination module can provide outer group-to-group synchronization by identifying which rendezvous points should be used in case of concurrency.

The operator agent can be configured to provide interface for human operator commands such as, for example, managing a way-point mission for each flying asset, changing the current settings for the collision avoidance submodule, which can implement multi-layer deconfliction mechanisms, and managing static forbidden no-flight zones for a group of UAAs. These functions can be implemented, for example, as layer providers. The operator layer can utilize, for example, a mouse event listener that can be provided by, for example, the entity layer. Functions can be activated when the user right-clicks on a specific flying asset in the visualization. This can be the interface in visualization modes, such as, for example, two and three dimensional. Operation states for UAAs can be parking, taking off, full operation mode, and landing. In the parking operation state, the UAA is not operating, and is staying on the ground and waiting for the future operation. In the taking off operation state, the UAA executes a flight plan sequence used for taking off from the airport to the full operation mode in the airspace. In the full operation mode operation state, the UAA is able to fulfill its mission which is defined as a sequence of way-points with specified position. Each way-point can have a time constraint. In the landing operation state, the UAA executes a flight plan sequence used for landing at the airport. The collision avoidance module of the pilot agent is active in the full operation mode in the airspace. Collision avoidance during take off and landing may be solved, for example, by local airport management.

The mission management functions can enable the human operator to alter the current way-point mission for each UAA. Mission way-points specifying points to be fulfilled by the UAA can be edited only if the pilot agent is in the parking or full operation mode. When the human operator requests an edit mission function from a context pop-up menu of the UAA, the layer can, for example, send a request for the current mission way-point plan to the pilot agent. Depending on the state of the UAA, the pilot agent can respond with, for example, a way-point or a failure message. The pilot agent can send a failure when it is in, for example, the take off or landing mode. If the human operator receives a failure message, a warning can be displayed that the mission cannot be altered. Otherwise the mission way-point plan can be parsed, and frames for the mission editing process can be initiated. At this point the human operator can remove way-points or insert way-points. The operator agent can provide an interface to manage the mission. When a way-point is selected from the list, the way-point position can be automatically highlighted in the world map. A way-point, can be inserted, for example, either directly by its coordinates and altitude or its position can be selected interactively from the map. The user can select a way-point from the list of predefined points-of-interest. The last way-point can be the return landing airport. If there is no destination airport specified, the UAA can automatically add a way-point to its way-point list. The user can cancel editing without applying changes. When the user applies the changes, the way-point list can be constructed from the user input and a way-point plan change request can be sent to the pilot agent. The pilot agent can attempt to build a detailed flight plan from its current position fulfilling the requested way-point sequence. The flight plan re-planning process can respect the UAA parameters, the world geography, and the defined static forbidden no-flight zones. If there is an unreachable way-point, the pilot agent can report an error to the operator agent. If the re-planning process finishes successfully with no exception thrown, a message can be reported to the operator agent. If there are no errors, the mission of the UAA is changed and the mission edit is finalized. If there is a re-planning problem with an unreachable way-point, the problem is reported to the human operator who can continue to edit the mission and solve possible problems.

The operator agent can provide for changing the current collision avoidance methods used by the UAA. The human operator can, for example, select the desired collision avoidance configuration which can define which collision avoidance solvers will be used and how. When the user requests to change a collision avoidance setting, the operator agent can send a request message with the desired new multi-layer collision avoidance configuration to the pilot agent. The pilot agent can check if the configuration can be changed. If so, the pilot agent restarts the collision avoidance module of the pilot agent with a different configuration and reports the activity to the operator agent. Otherwise, if the configuration cannot be changed, a failure message is reported. In the present embodiment, the configuration can be changed, for example, when the UAA is in the full operation mode.

Figure 21:
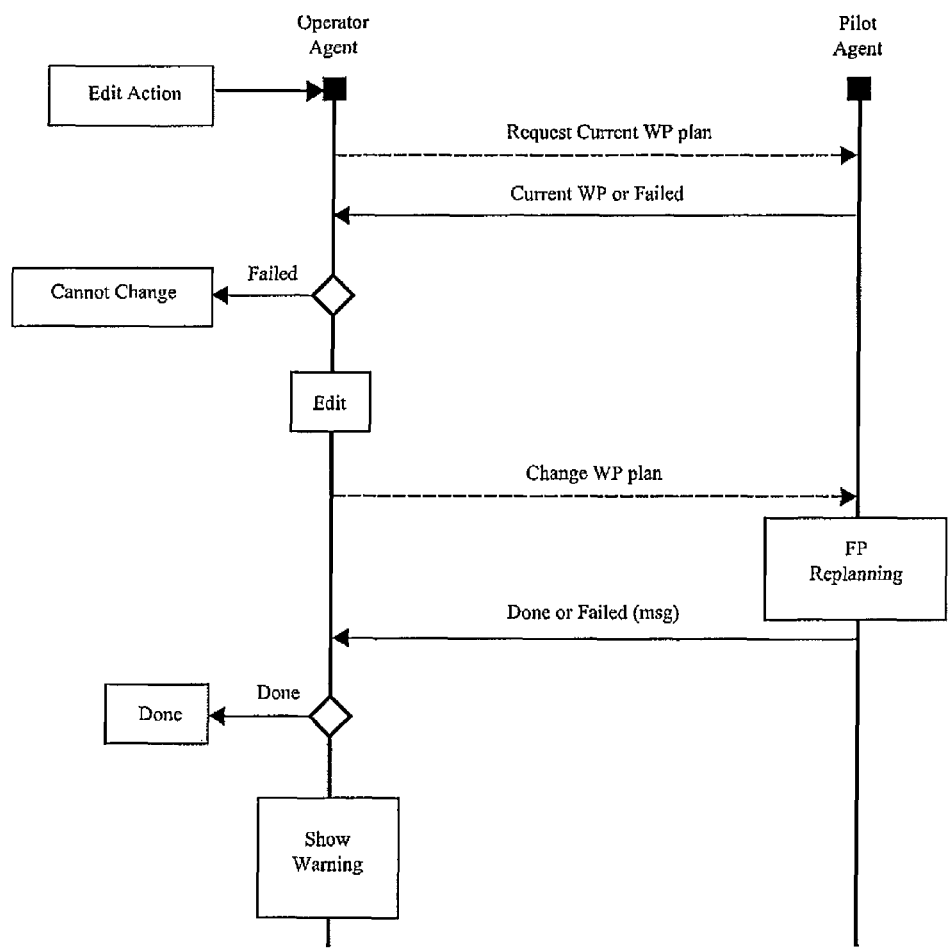
FIG. 21 is a schematic block diagram of negotiation between the operator agent and a UAA within the mission edit function for the present embodiment.
Figure 22:
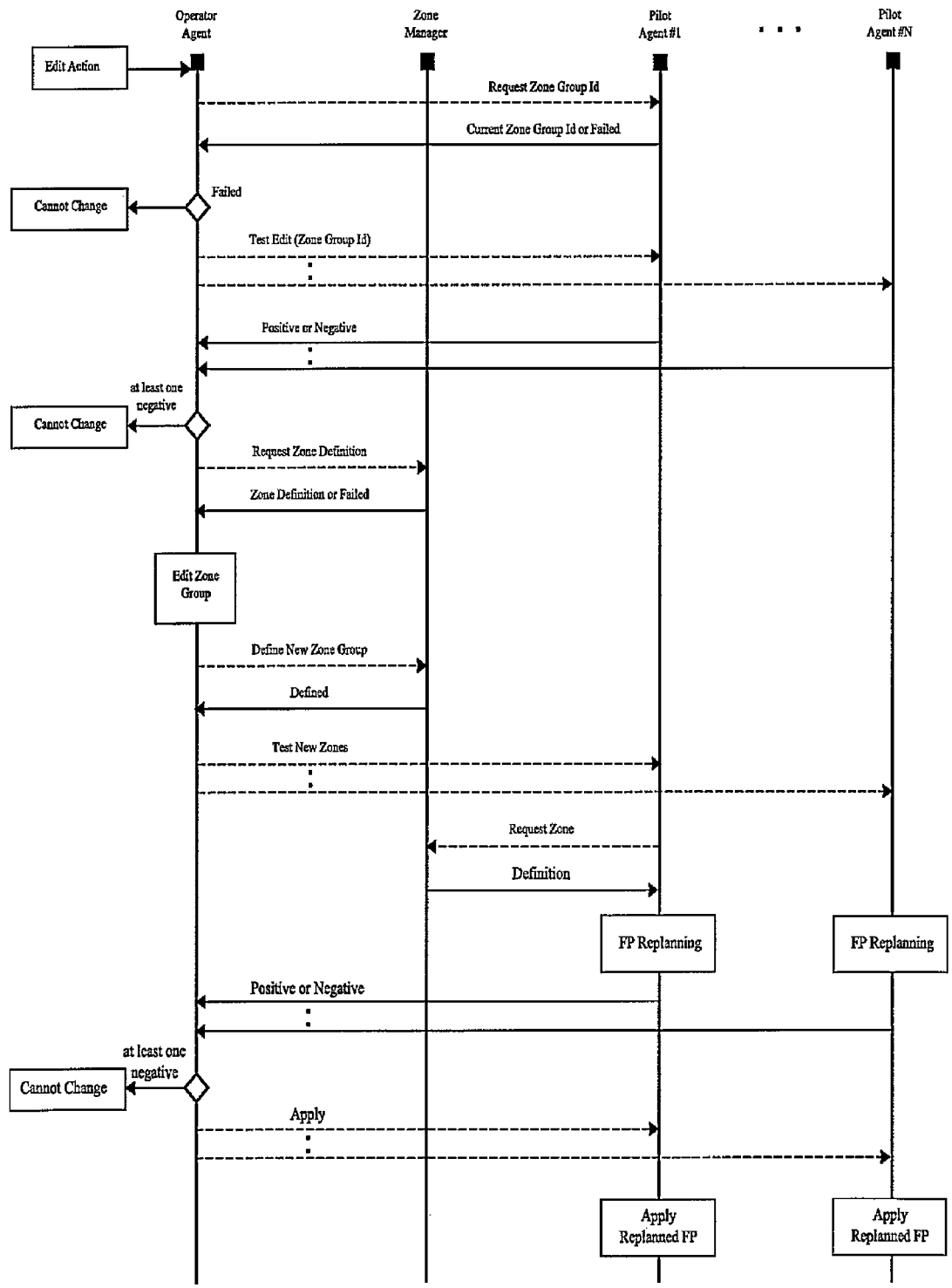
FIG. 22 schematic block diagram of a negotiation protocol used for changing static zones for a group of UAAs for the present embodiment.

Referring now to FIGS. 21 and 22, each UAA can have types of forbidden no-flight zones such as, for example, world zones, static zones and dynamic zones. Static zones can encapsulate world areas where the UAA cannot operate, e.g. enemy forces area, etc. These zones can be altered, for example, by the operator agent. Static zones can be shared by a group of UAAs. In such case the static zones can be edited for all respective UAAs at the same time. The static zones for the UAA can be edited for example when the flying asset is in the parking or full operation mode. The zone manager entity can be responsible for no-flight zones management in which octant trees can be shared with defined no-flight zones among all entities within a single JVM. When the human operator requests the zone edit function, a request for the current zone group identification is sent to the respective pilot agent. The operator module of the pilot agent checks if the static zones for the UAA can be altered. A static zone identification can be returned if the static zones can be altered. A failure message can be returned if the static zones cannot be altered. If the operator agent receives a failure response, it can display a warning message to the human operator and can cancel the operation. Otherwise, the operator agent can send a query to other members of the UAA group using the same zone group definition. The query can be used to determine if other members can also change the zones, for example, if they are in appropriate modes. The query may not be sent to the pilot agent, for example, if the pilot agent has been queried for the zone group identification. If there is no other member of the group using the same static zones group, no queries are sent. Pilot agents receiving the query can send positive or negative response. The operator agent can wait for responses, and if there is at least one negative response, the operator agent can display a warning message to the human operator and cancel the operation. If the zone group can be altered for UAAs using the same group, a request for a zone definition is sent to the zone manager. The zone manager can send the zone definition response if the zone group is defined. Otherwise, the zone manager can send a failure message. The frames for the static forbidden no-flight zones editing process can be shown to the human operator who is able to alter and/or remove the definition. The operator agent can provide an interface to manage a group of zones. When a zone is selected in the list, it can, for example, automatically highlight the zone area in the world map. A zone can be inserted, for example, by specifying the coordinates of its center and radius. Its parameters can also be easily inserted from the map interactively. The user can, for example, select the zone from a list of predefined zones. The user can cancel the editing process without applying the changes. When the user applies the changes, the request for definition of a zone group is sent to the zone manager which responds when the zone group is successfully defined. A test query can be sent to all related pilot agents with this changing operation. The query asks each pilot agent if it can accept the changed static zones. The zones can be accepted if there is no current way-point in its mission that is not satisfiable after the update, but before it was. To perform such a check, the pilot agent tests if the changed zone definition is available in its JVM first. If it is not known yet, it simply sends a request for zone group definition to its known zone manager entity and waits for the definition. Then it makes the definition available to all other entities within the same JVM. At this point, the pilot agent has all necessary information to perform the query test. It simply starts its flight plan re-planning process from the current position of the UAA. If a new detailed flight plan cannot be found due to any reason respecting the new static no-flight zone definition, the pilot agent sends a negative response to the operator agent's test query. Otherwise, it sends a positive response. The operator agent waits till it receives all responses from all UAAs using the same edited static no-flight zone group. And then, it tests if there is at least one negative response. If such response exists, the agent displays a warning message to the human operator saying that the changed zones cannot be applied now due to the specific reason. Then the editing process in the operator goes back to the edit zone group point where the user can adjust its modification again. Otherwise, if there is no negative response to the test query, the operator agent sends a notification saying that the zone definition is applied to all UAA members using the same group. And the edit zone group operation is finished from the operator agent side. When the pilot agent receives such notification, it simply takes the already re-planned version of its flight plan which it has from the test after queering. It applies this new flight plan as the current one for execution.

In the dynamic environments that require frequent mission replanning and in environments with high number of non-cooperative objects, multiple collision avoidance methods can be used simultaneously. The multi-layer collision avoidance module of the pilot agent can solve the future collisions using the combination of different collision avoidance methods. The collision avoidance module can operate, for example, in a fully distributed manner and may not utilize a central planner for the collision avoidance of physical entities. The module architecture can be domain independent and can be deployed on autonomous vehicles, for example, but not limited to, flying assets, robots, cars, and submarines. Collision solver manager (CSM) can solve future collisions between autonomous entities. It can be implemented, for example, as a plug-in module that can be enabled in the agents. The CSM can be domain independent and can be used by agents having an interface that defines, for example, but not limited to, functions such as creation/finishing, changing an agent's current plan, notifying the CSM about an agent's plan change, registering and deregistering using an agent's radar, registering and deregistering using an agent's idle task, receiving messages through pre-selected protocols, registering and deregistering using an agent's time, determining the addresses of other agents from, for example, radar data, obtaining an agent's position, and obtaining a knowledge base. Parameters used in these interfaces can include, but are not limited to including an agent's plan interface that can enable the use of CSM with various entities to provide, for example, a planning interface for, for example, robots, cars, ships, and submarines. The CSM can decide which collision will be solved as well as which solver solves the collision selected from the collisions registered by collision solvers. Collision solver (CS) can detect and solve future collisions. There can be one or more collision solvers registered to the CSM. The CS can notify the CSM about a collision when the collision is detected. Multiple CSs can notify the CSM about the same collision, and one CS can notify the CSM about one or more collisions. The CSM can collect the notifications, prioritize them, and select a CS to solve a collision from the notifications. The selected CS can be allotted an amount of processing time to solve the selected collision. Other collisions can be processed, for example, sequentially. In the present embodiment, each collision is solved in a computational thread in the CSM, enabling the CSM to control the length of the time assigned to the CS, known for example as a solving timeout, and to process the communication and sensors necessary for the flight during the computation. When the solving timeout is exceeded for the selected CS, the computational thread can be interrupted and a new collision to be solved is selected. The CSM can be notified when a CS detects a future collision. This notification can contain, for example, but not limited to, the identifier of the flying asset or other collision object, the reference to the solver, the time of the collision, and other CS data. The earliest time can be used to time-stamp the collision. The notification received from a cooperative CS about a collision with a non-cooperative flying asset can be, for example, ignored. The CSM can select a collision to be solved using rules such as, for example:

(1) find first valid collisions.

First collisions are collisions that happen earlier in time with respect to other collisions. Collisions can be understood to happen simultaneously if the difference between their times is less than, for example, a pre-selected amount. Valid collisions are collisions that are registered by the CS and that can be selected for solving. The collision with the highest priority can be selected from the set of first valid collisions. If the time of the earliest valid collision is earlier than the time of the collision which is currently being solved, solving of the current one is interrupted and the collision with the highest priority is selected from the set of first valid collisions. If the time of the earliest valid collision is the same as the time of the collision that is being solved, the priority is compared to the highest priority from the set of first valid collisions. If the current collision has higher priority, nothing happens.

Otherwise solving of the current collision is interrupted and the collision with the highest priority is selected from the set of first valid collisions. If the time of the earliest valid collision is later than the time of the current collision, nothing happens. The CSM selects appropriate collision solver to solve the selected collision (given by the rules above) using cooperative or noncooperative ordered list of solvers. The difference is counted between the time of the future collision and the current time. The difference determines which collision solver will be used (corresponding time interval in the list is selected). If the selected CS is a blank solver, it is selected the next CS to the blank solver (closer to future collision). The CSM counts the maximal time that can be used by selected collision solver to solve the earliest collision. This time is the minimum of, for example, the MaxSolvingTime parameter of the CS and the rest of the time interval assigned to the selected CS on the defining time axis. If the time for selected solver is shorter than, for example, MinSolvingTime parameter of the CS, the next not a blank collision solver is selected. The counted time is used as an execution timeout. When timeout elapses, the solving of the collision is terminated. Current flight plan is set as the fixed (unchangeable) to a change point that is equal to the timeout assigned to the collision solver.

Figure 23:
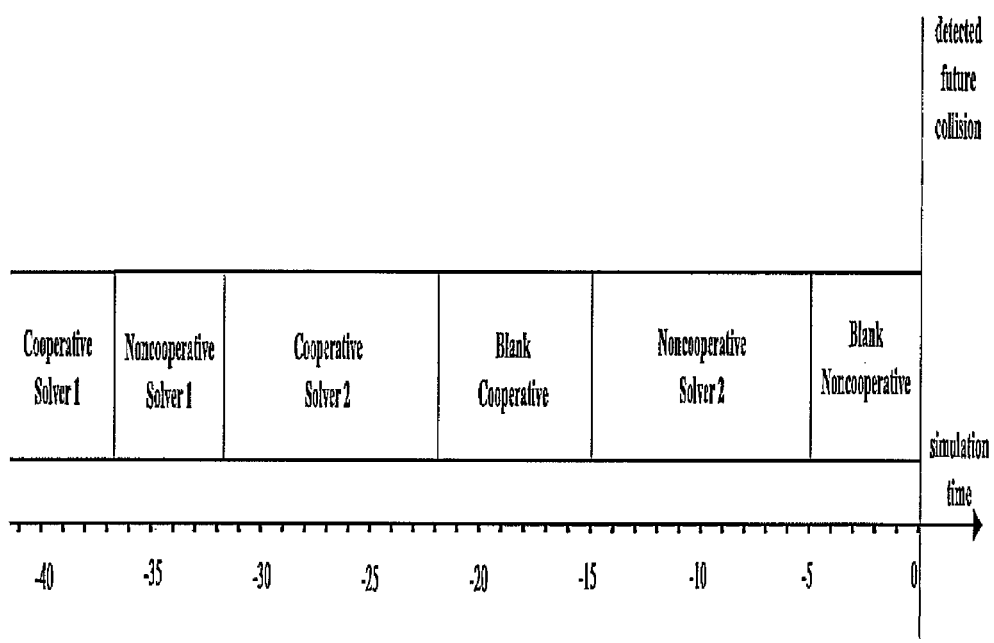
FIG. 23 is a graphical description of a simulation time line illustrating a cooperative pattern of a configuration.
Figure 24:
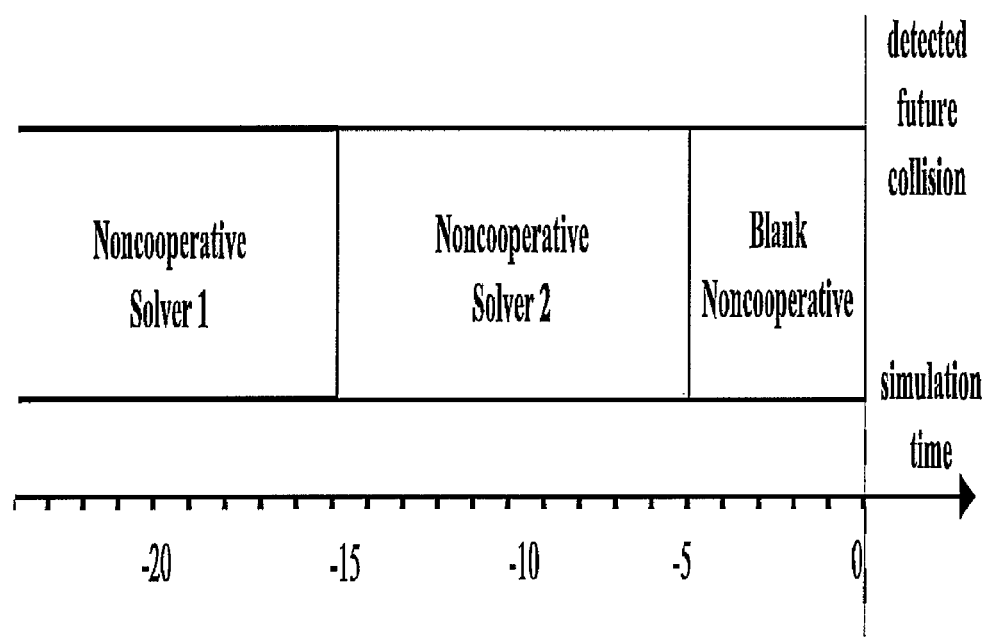
FIG. 24 is a graphical description of a simulation time line illustrating a non-cooperative pattern of the configuration.

Referring now to FIGS. 23 and 24, the CSM can be configured by an XML file that contains a list of CSs. CSs that are managed by the CSM can have, but are not limited to having, parameters such as, for example, but not limited to, name (of the solver), class name, cooperative, use interval, maximum solving time, minimum solving time, and solver configuration object name. The class name can be the name of a class that is, for example, dynamically loaded using, for example, JAVA class reflection. If the name of the solver is blank, no collision solver is used and an empty time interval can be inserted. The cooperative parameter can determine if the solver can be used for cooperative collision avoidance. The use interval can define the length of the time frame when the collision solver (CS) can be used for solving a collision. A zero use interval can represent an unbounded time length and such a setting can be used, for example, for the first CS in the list. The maximum solving time parameter is the maximum processing time that can be assigned to the CS. The minimum solving time parameter is the minimum time that the CS needs to solve a collision. The solver configuration object name can optionally define the configuration for the collision solver. The CSM can preprocess its configuration during the initialization. There can be, for example, two ordered solver lists created, a cooperative list and a noncooperative list. The cooperative list can contain collision solvers defined in the configuration file, for example, in the same order as in the list. The non-cooperative solver list can contain solvers where the cooperative parameter is set to false. The solver list can represent a time axis, where each collision solver can occupy a part of the axis. The time axis can begin, for example, at the current time and can go to the time of the future collision. The collision solvers can be ordered, for example, in the same sequence as the configuration list. The solve list can be filled from the time of the future collision backwards using the use interval parameter as a length of the interval. The rest of the time axis can be filled by the first collision number. The priority can be set to each collision solver according to its position in the ordered solver list. All collision solvers are started during the initialization and its collision detection parts run continually.

Referring now to FIGS. 25-29, an example configuration of the CSM and its application to the selected cases follows. The example is only illustrative to show how the CSM handles different situations. A typical configuration can contain cooperative solvers at the beginning, noncooperative solvers in the middle, and a blank solver at the end.

```
<Solver Name="Solver1"
    Cooperative="true"
    ClassName="BestandSlowCooperativeSolver"
    UseInterval="0"
    MaxSolvingTime="10000"
    MinSolvingTime="5000"
    SolverConfigurationConfObjectName="BASCOOP_CONF"/>
<Solver Name="Solver2"
    Cooperative="false"
    ClassName="NoncooperativeSolver"
    UseInterval="5000"
    MaxSolvingTime="3000"
    MinSolvingTime="1000"
    SolverConfigurationConfObjectName="NONCOOP1_CONF"/>
<Solver Name="Solver3"
    Cooperative="true"
    ClassName="BasicCooperativeSolver"
    UseInterval="10000"
    MaxSolvingTime="4000"
    MinSolvingTime="2000"/>
<Solver Name="Blank"
    Cooperative="true"
    ClassName="blank"
    UseInterval="7000"
    MaxSolvingTime="0"
    MinSolvingTime="0"/>
<Solver Name="Solver4"
    Cooperative="false"
    ClassName="NoncooperativeSolver"
    UseInterval="10000"
    MaxSolvingTime="2000"
    MinSolvingTime="2000"
    SolverConfigurationConfObjectName="NONCOOP2_CONF"/>
<Solver Name="Blank"
    Cooperative="false"
    ClassName="blank"
    UseInterval="5000"
    MaxSolvingTime="0"
    MinSolvingTime="0"/>
```

Figure 25:
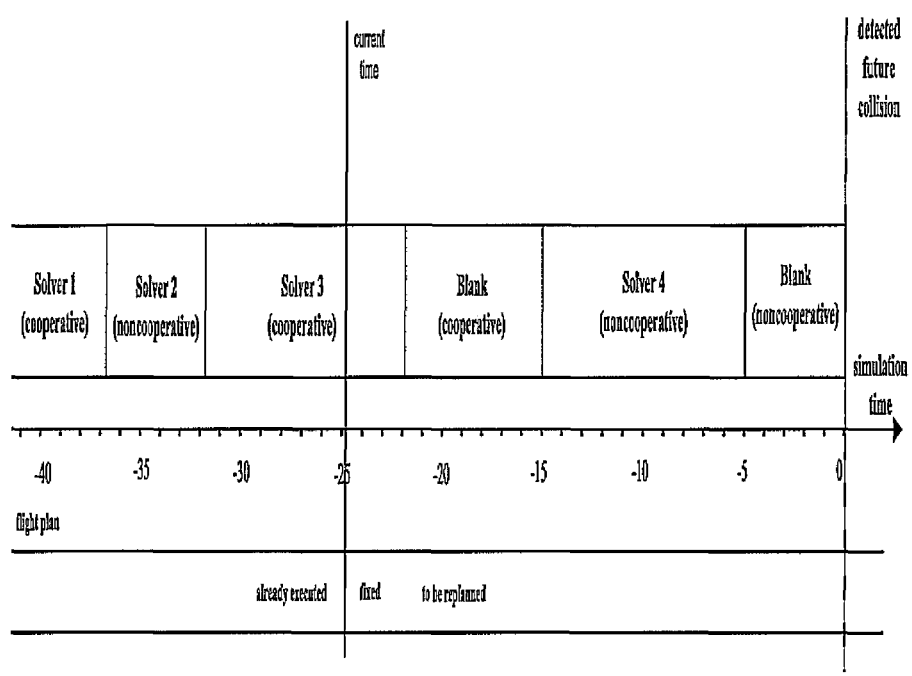
FIG. 25 is a graphical description of a simulation time line illustrating twenty-five seconds until a collision.
Figure 26:
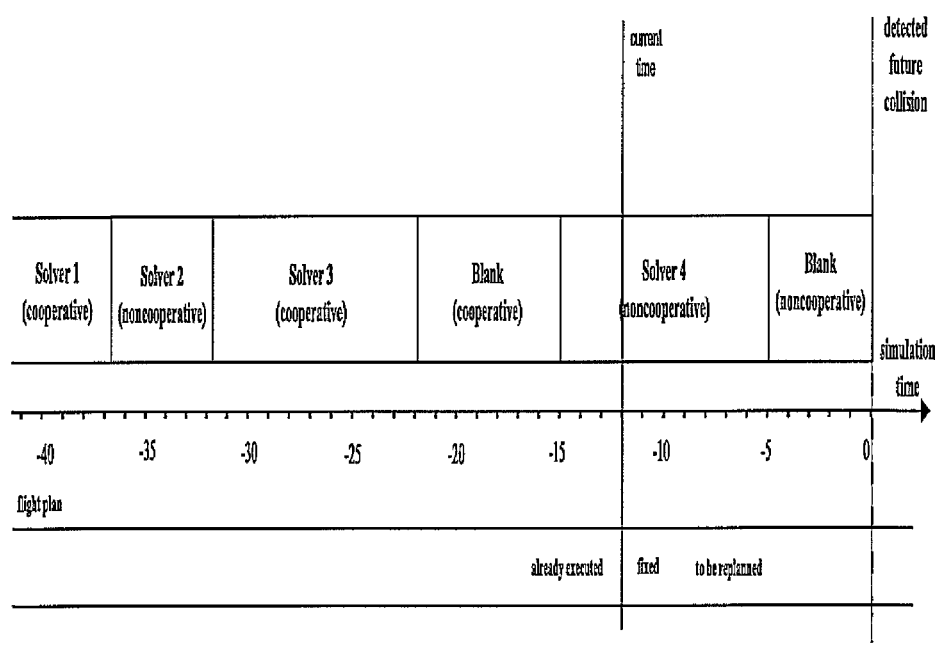
FIG. 26 is a graphical description of a simulation time line illustrating twelve seconds until a collision.
Figure 27:
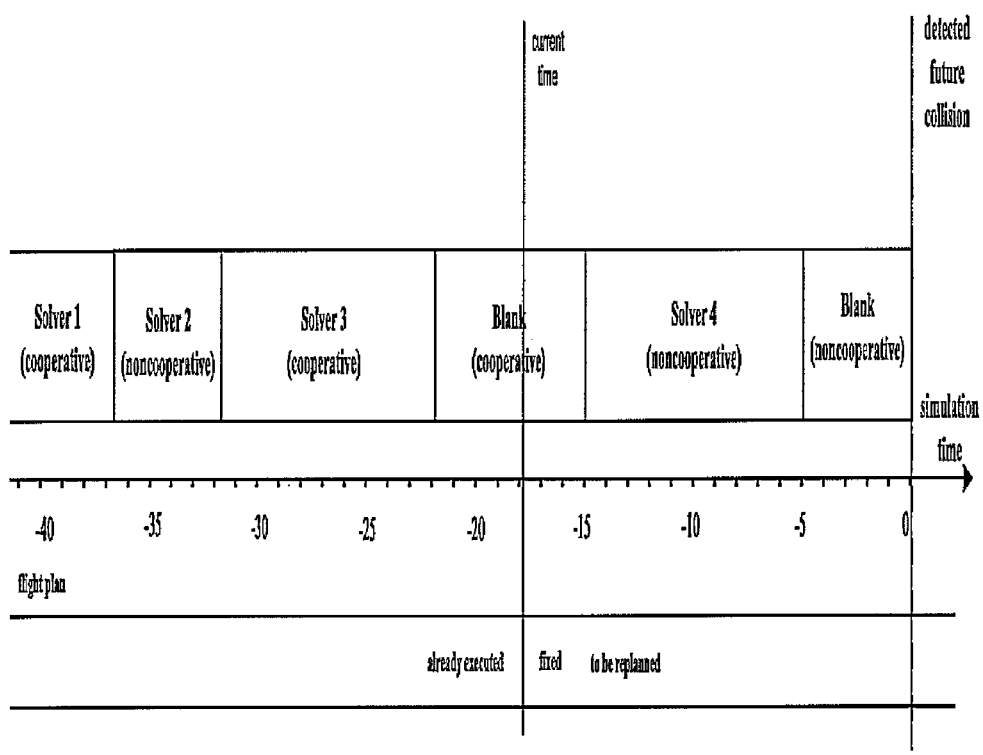
FIG. 27 is a graphical description of a simulation time line illustrating eighteen seconds until a collision.
Figure 28:
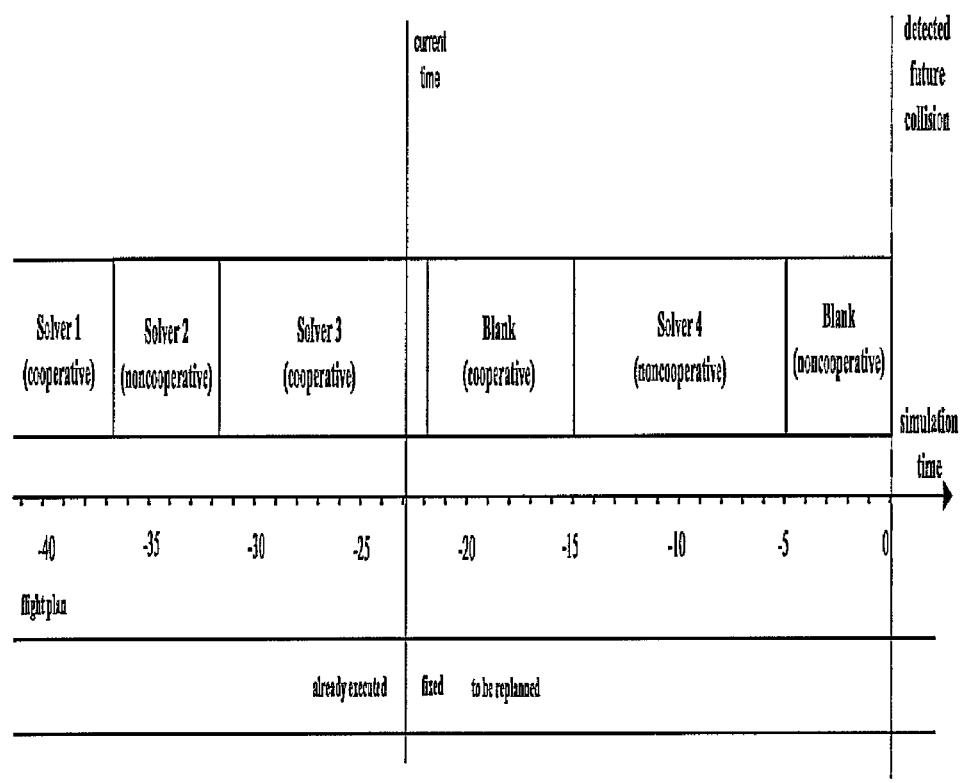
FIG. 28 is a graphical description of a simulation time line illustrating twenty-three seconds until a collision.
Figure 29:
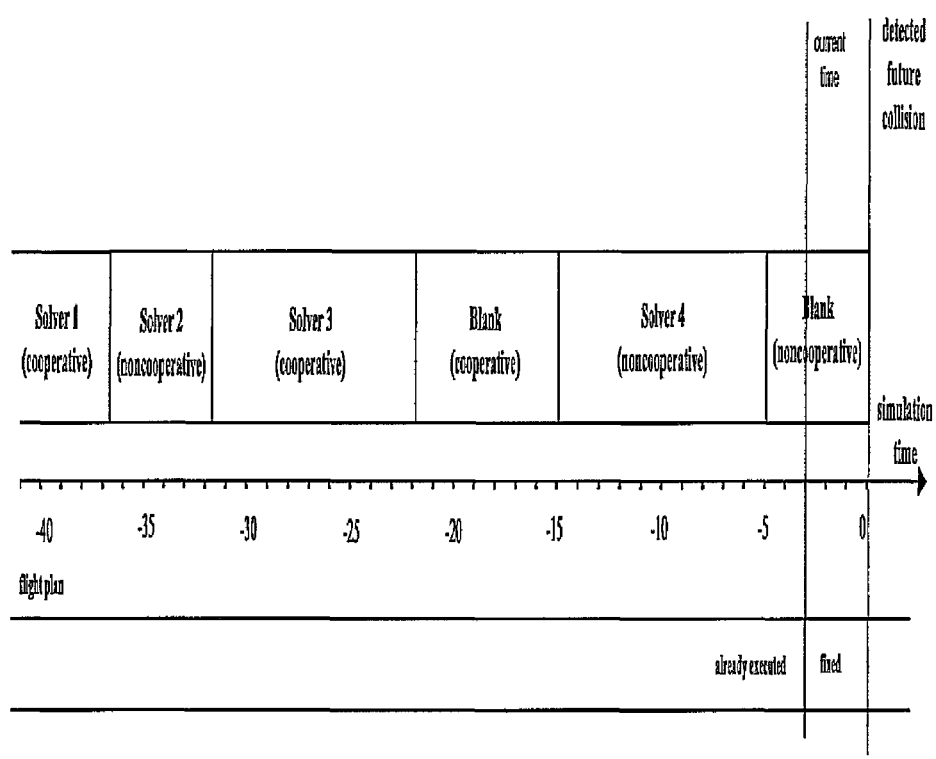
FIG. 29 is a graphical description of a simulation time line illustrating three seconds until a collision.

Solver1 has the use interval parameter set to zero because there is no need for a user interval for the first CS in the list. Solver4 has the minimum solving time and the maximum solving time parameters set to the same value meaning that the minimum solving time is the time used in this example to solve the collision. The names of the solvers can, for example, be unique, with the exception of the blank solvers. Different solvers can use the same class names, for example, Solver1 and Solver4 use the same class name. Different configurations may be used for each solver. FIG. 23 illustrates the cooperative pattern generated from the configuration above. It contains all solvers in the same order. Solver1 has the highest priority. FIG. 24 illustrates a noncooperative pattern. It contains non-cooperative solvers in the same order as in the configuration excluding cooperative solvers. FIG. 25 illustrates the situation in which there are twenty-five seconds left to the collision. Solver3 is selected according to the list of the solvers. The selected timeout for solving is the rest of the time until the end of the solver's time interval on the axis. This means that solver3 can use computational thread of the CSM for next three seconds. If no solution is found, the CSM can interrupt its execution and start another CSM. FIG. 26 illustrates the situation in which there were twelve seconds left to the collision. Solver4 is selected. The selected timeout is the minimum from the rest of the time until the end of the solver's time interval and MaxSolvingTime parameter. Solver4 has set this parameter to two seconds. Thus selected timeout will be two seconds. Therefore the solver has short fixed part of the plan and can react very fast. If no solution is found, the same solver can be selected (started) again after two seconds until its time interval in the list of solvers exceeds. FIG. 27 illustrates the situation when there is eighteen seconds left to the collision and the blank solver is used. The next solver will be selected—solver4. The timeout is the minimum from MaxSolvingTime (two seconds) and the rest of solver4's interval (thirteen seconds). FIG. 28 illustrates the situation in which there are twenty-three seconds left to the collision and solver3 is used. The timeout assigned to solver3 can be one second. This is less than the MinSolvingTime parameter of the solver3 (two seconds). The next non-blank solver is selected—solver4 with the two seconds timeout. In one embodiment, a CS cannot be selected for execution after the end of its interval minus MinSolvingTime parameter. FIG. 29 illustrates the situation when there are three seconds remaining to the collision and the blank solver is used. There is no solver behind this blank solver, so the CSM will not select any solver. The same situation can arise up to seven seconds before the collision (five seconds for the blank solver and two seconds is the MinSolvingTime parameter for the last solver).

Cooperative collision algorithms can provide local collision avoidance. The algorithms are based on the communication and the negotiation among flying assets. Such algorithms can be used also in the domain where flying assets can communicate only with flying assets located nearby (there is limited communication range). Well known techniques for collision avoidance based on the potential fields may not be suitable for the specified domain (3D, no-flight zones, the need of smooth flight plan also in its first derivation, allowed speed changes and the fact that the flying asset cannot stop) due to their complexity and because of the complicated dynamic mission flying asset specification. Described herein are three cooperative methods: rule-based, iterative peer-to-peer, and multi-party collision avoidance, but the present embodiment is not limited to these cooperative methods. The algorithms are implemented as collision solvers in the multi-layer architecture.

A 'see' capability can be implemented by negotiation and flight plan comparison. Due to the limited communication range each flying asset $A_i$ is aware only of flying assets located within this range $A_j \in \tilde{A}_i$. $\tilde{A}_i$ denotes the set of flying assets $A_j \in A$ of which $A_i$ is aware of. The described algorithms solve encounters locally where they can be detected. It is not necessary to identify collision $A \otimes A_j$ for whole $fp_i$ and $fp_j$. The flying asset can share only part of its current flight plan $\hat{fp}_i$ from current time $t_c$ for interval $t_{share}$ where $p(\hat{fp}_i,t)=p(fp_i,t)$ for $\forall t: t_c \leq t \leq t_c + \delta_i$. $\delta_i$ is selected by the flying asset not to expose all its future plan including its mission objectives, but to give enough part to identify the possible collision. Such local sharing of the flight plans also reduces the necessary communication flow. The flight plan sharing is implemented by the subscribe-advertise protocol. When flying asset is aware of new other flying asset $A_j$ it subscribes for its $\hat{fp}_j$. The flying asset $A_j$, by accepting subscription request from $A_i$, will provide regular updates of its $\hat{fp}_j$ such there will be enough part of future part of the flight plan from current time. If $A_j$ changes its $fp_j$ for any reason—change of its mission objectives or as a result of other collision avoidance—it provides new fresh $\hat{fp}_j$ to the subscriber as soon as possible.

Figure 30:
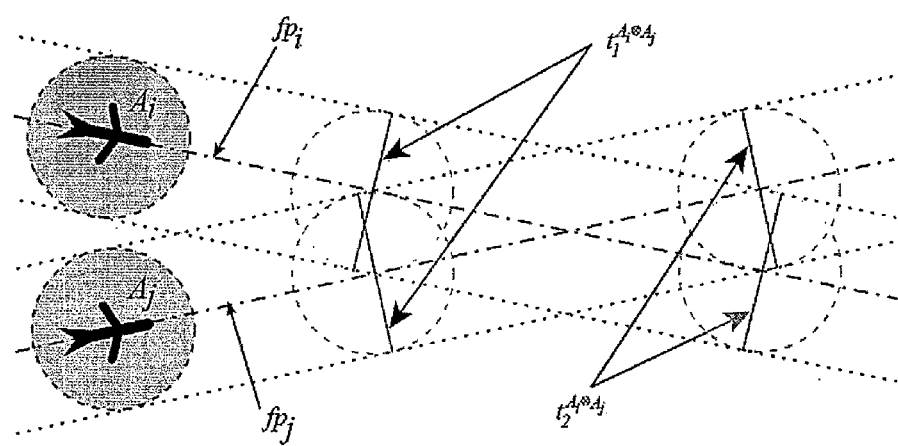
FIG. 30 is a graphical description illustrating first and last collision points between current flight plans of flying assets A and B.

Referring now to FIG. 30, flying asset $A_i$ who received $\hat{fp}_j$ from all its neighbors $\overline{A}_i$ performs check if $\exists t$ where $col(fp_i, \hat{fp}_j, t)=1$ upon every received update. If such t exists $A_i$ tries to identify the first and the last collision point $t_1^{A_i \otimes A_j}$ and $t_2^{A_i \otimes A_j}$. Flying assets are also able to detect multi-collision group $A_C$ by exchanging information about collisions. $A_i$ prepares its local view of an encounter $en_k^{A_i}=<t, \{fp_i\} \cup \{\hat{fp}_j\}_{A_j \in A_C \setminus A_i}>$. Selection of $t_1^C > t > t_c$ depends on the used algorithm or combination of algorithms and is chosen somewhere between current time $t_c$ and time of the earliest collision $t_1^C$ for the given multi-collision C. $t-t_c$ defines the timeout which is then given for invoked collision avoidance algorithm. If the result for C is not provided within the specified timeout, the algorithm is interrupted and next iteration is invoked for the same C. When the local cooperative detection the encounter contains full $fp_i$ and only parts of $\hat{fp}_j$, it is enough to do distributed local collision avoidance. The LCAP algorithm can provide a solution containing full flight plans $fp_j$ for $\forall A_j:A_j \in A_C$ because all flight plans are still provided by its final implementor $A_j$.

Figure 31:
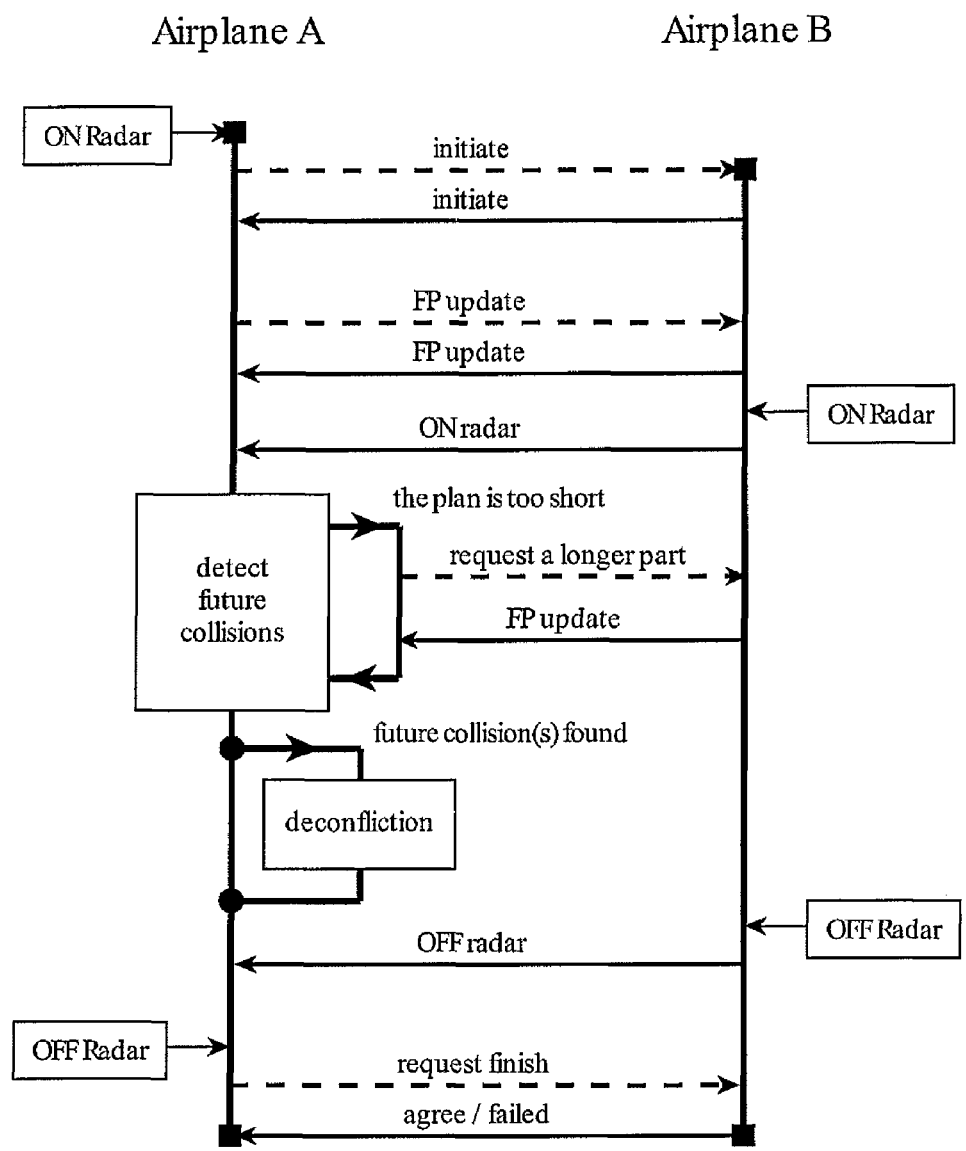
FIG. 31 is a schematic block diagram of a transponder task message flow.
Figure 32:
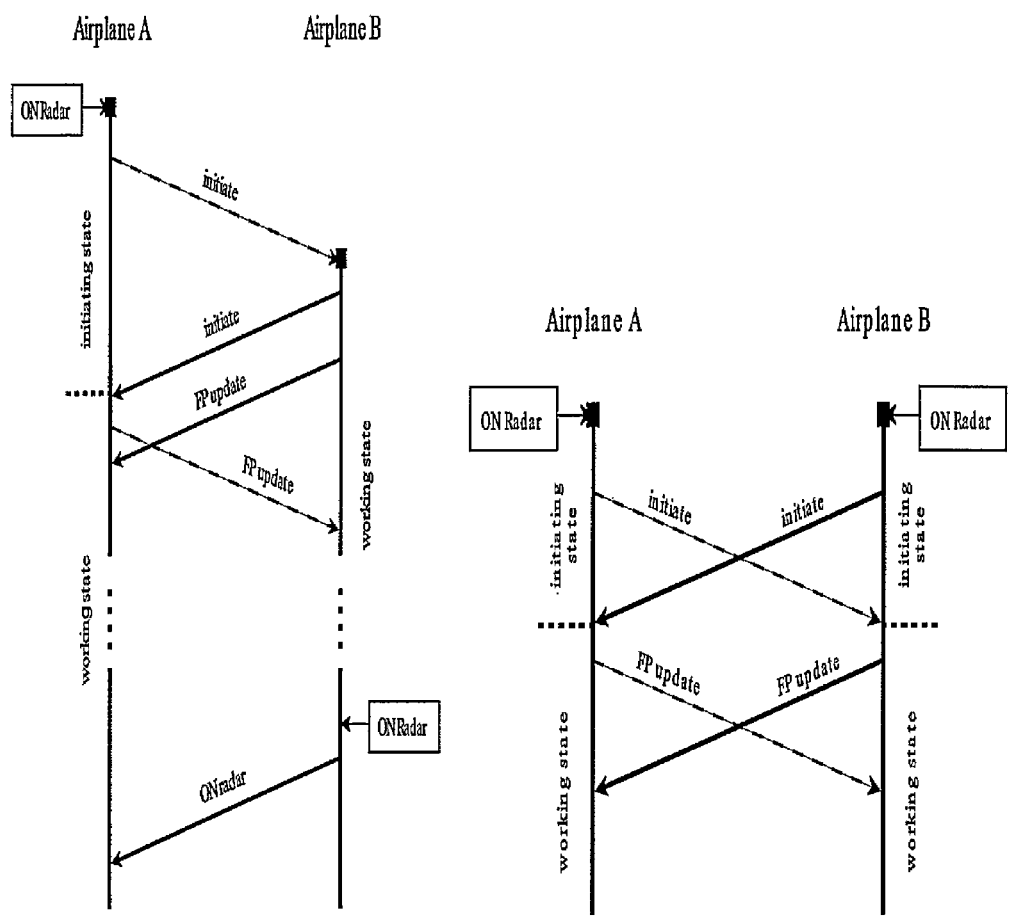
FIG. 32 is a schematic block diagram of two cases of an initiating sequence of the transponder task in which (1) flying asset A detects flying asset B and (2) A and B detect each other simultaneously.

Referring now to FIGS. 31 and 32, the transponder task can be used for general communication between the autonomous agents representing flying assets in the system. In the transponder task, incoming communication from another task can be automatically routed and handled by the transponder task. The implemented cooperative collision avoidance algorithms use peer-to-peer negotiation. The transponder task can be used for each pair of negotiating flying assets in the system. The transponder task is described from the view of the flying asset A, but the second flying asset does the same from its point of view. If flying asset A is flying along its planned optimal flight path fulfilling its mission way-points with their time constrains, and flying asset B enters the alert zone (radar range) of flying asset A, the pilot agent of the flying asset A is notified about its position and the flight code by the on-board radar system. The pilot agent checks if there already exists transponder task with flying asset B. If there is not such a task, it creates the new one and tries to establish negotiation connection with the pilot agent B by sending initiate message. This message contains information about the flying asset type and information if pilot agent A has flying asset B on its own on-board radar system. If the connection cannot be established or the communication is not trusted, the pilot agent should use non-cooperative collision avoidance method against the flying asset notified by the on-board radar. Each transponder task holds information about mutual radar status of involved flying assets. If flying asset B is on the radar of flying asset A, true value in the variable onMyRadar in the appropriate task of flying asset A is stored. If flying asset A is on the radar of flying asset B, true value in the variable onOtherRadar in the same task is stored. The opposite flying asset does the same in its own task from its point of view. The transponder task of pilot agent A is in the initiating state and is waiting for initiate message from pilot agent B. When pilot agent B receives initiate message from pilot agent A (and has no transponder task with pilot agent A), it creates new transponder task to communicate with flying asset A and sends back initiate message. At this moment the transponder task of the pilot agent B is initiated (working state) and sends flight plan future part for the specified amount of time depending on the flight speed. When pilot agent A receives the initiate message from the pilot agent B, it is initiated as well (changes state to working state) and sends its flight plan future part to the pilot agent B. The transponder task communication flow is protected by the system of timeouts. If transponder task A does not receive initiate message in the specified amount of time, it re-sends its initiate message again.

Referring again to FIG. 32, when an initiate message is sent by the pilot agent A, but before it is received by the pilot agent B, on-board radar system of flying asset B detects the flying asset A and so the pilot agent B sends its own initiate message to the pilot agent A. It is possible due to the fact that initiate messages are symmetric and both of them will serve as answers as well. So both transponder tasks will be initiated, when appropriate initiate message will be delivered. At this moment both transponder tasks are initiated and in the working state. Both sides of the transponder task can send these messages in this state: Flight plan message—it is sent every time (i) due to change of its own flight plan, (ii) after the predefined regular time period expires or (iii) as an answer for the special request from the other side of the transponder task. Radar change message—sent when the change occurs in its on-board radar system (other flying asset appear/disappear from the radar). Request for the longer plan message—used when the pilot agent needs more information about the flight plan of other flying asset because of its collision detection method. These messages can be sent in any order due to the needs of each pilot agent. Every time when the task receives the flight plan update from the opposite flying asset it executes the collision detection. The collision detection process needs to identify the first and the last collision point between two flight plans. So, in the case that flying assets exchange only local parts of the flight plans it is possible that the last collision point cannot be identified without having longer part of the other flight plan. For this reason there is implemented the special request with a longer part message with the flight plan update response communication. If a collision between the current flight plan and received one is found the collision avoidance process is started. This is done by inherited collision solvers, where specific algorithms are implemented. Currently one of the following methods is used: (i) rule-based, (ii) utility-based, (iii) multi-party, or (iv) non-cooperative dynamic no-flight zone-based. When some unexpected events occur, it is possible that transponder task receives the not-understood message. As a reaction, it sends the restart message and new initiate message. When other side of the transponder task receives the restart message, the set its state to restarting state and waits for initiate message. The rest of the communication is the same like described above within the standard initiation sequence.

Figure 33:
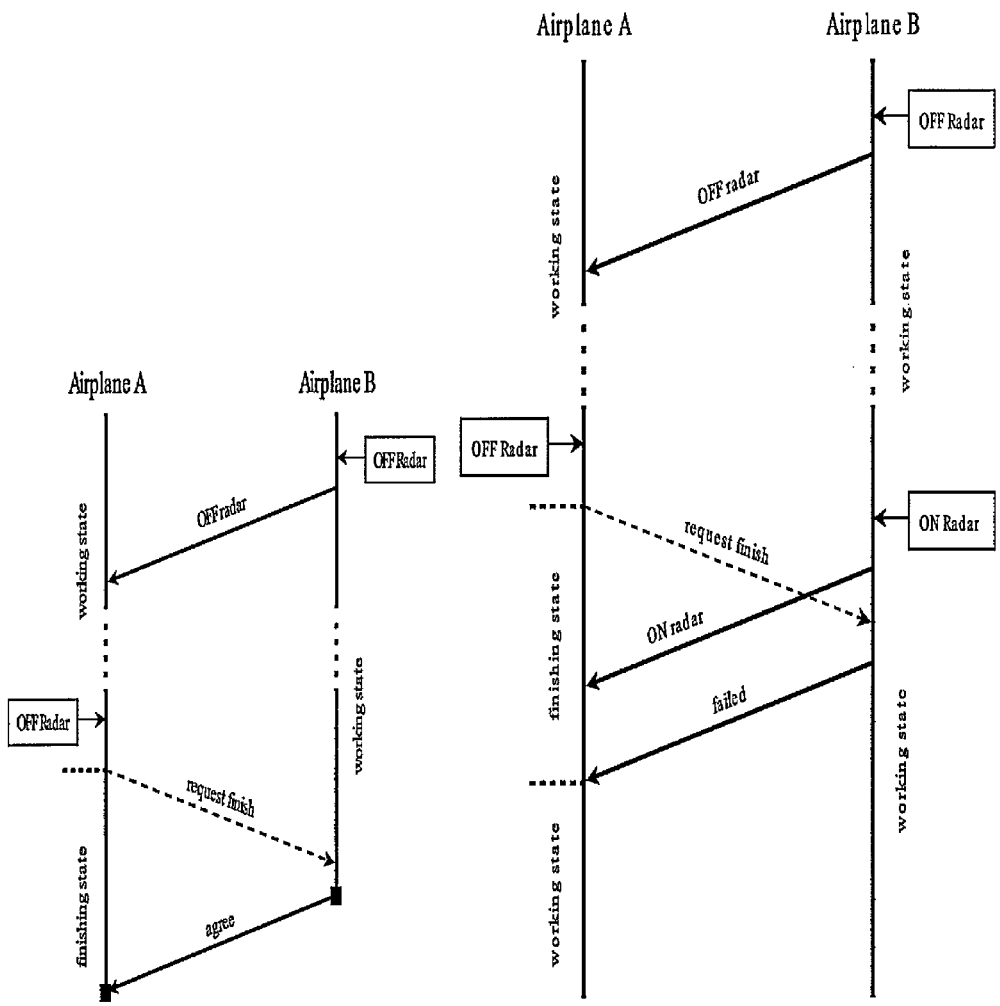
FIG. 33 is a schematic block diagram of (1) a finishing sequence of a transponder and (2) an interruption of the finishing sequence due to a received visible notification from an on-board radar.

Referring now to FIG. 33, when flying asset (for example B) leaves the alert zone (radar range) of the flying asset A, the pilot agent A is notified about this by its on-board radar system. If the pilot agent A has the information in the transponder task that flying asset A is not on its radar, the task starts negotiation sequence to finish the task. Its state is changed to the finishing state and the request finish message is sent. The transponder task does not react to any reaction to any message (except messages related to finish process), but it remembers them to use them later if needed.

Figure 34:
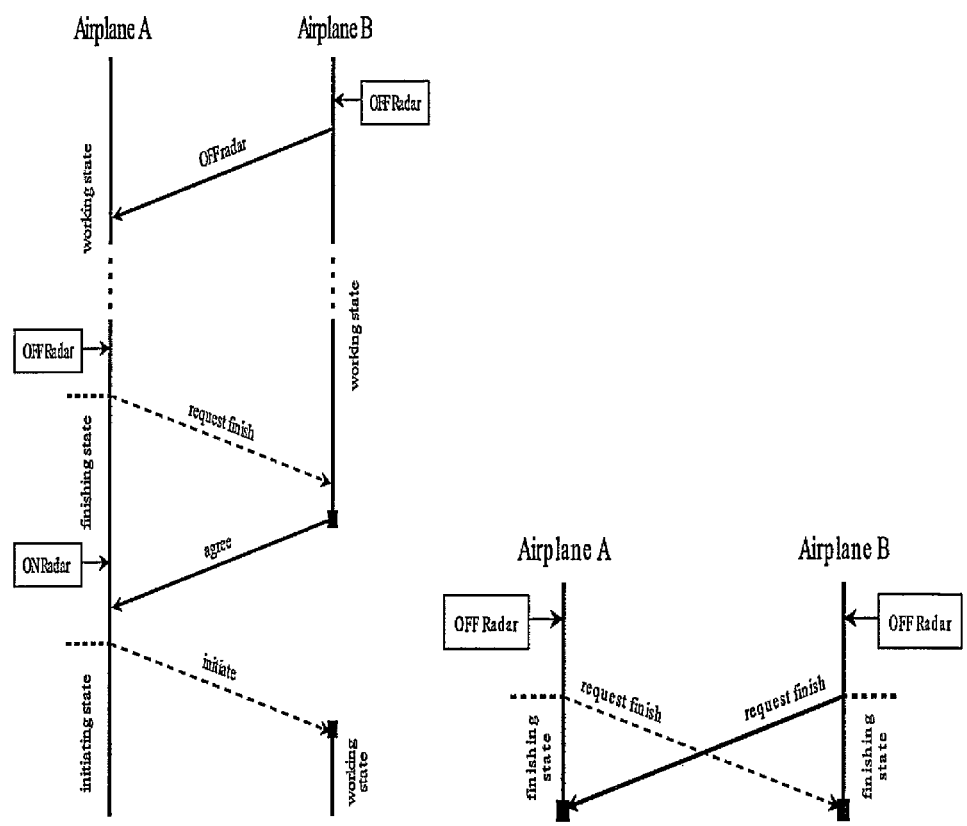
FIG. 34 is a schematic block diagram of (1) communication re-initiation when radar state is changed within a finishing sequence and (2) invocation of the finishing state by both tasks simultaneously.

Referring now to FIGS. 33 and 34, when the transponder task B receives request finish message, it changes the variable onOtherRadar to false. When both variables onMyRadar and onOtherRadar are false, the transponder task B sends back finish agree message and transponder task is removed from pilot agent B. When the variable onMyRadar is true, transponder task B sends back finish fail message and normally continues in work. This situation can be caused by the distributed nature of the negotiation. For example the transponder task A had sent the request finish message before it received the radar change message from transponder task B. Transponder task A can receive three messages as an answer to its request finish message in the specified amount of time (before the timeout exceeds): finish agree message—the A checks again if both variables onMyRadar and onOtherRadar are false. If so, the transponder task A is removed from the pilot agent A and the entire communication between A and B is closed. If the variables are not false, restart of communication is processed using the restart message as described in the previous part. finish fail message—the task A changes its state to working state and processes all messages, that have been received and remembered during finishing state as described above. request finish message—this message can be received in similar situation like in initiating of the transponder task. It can happen that transponder task B starts its finishing at the same time and sends the request finish message before receiving the request finish message from the transponder task A. The reaction to this message is the same like to the finish agree message. When the timeout exceeds and no message is received, transponder task A repeats sending of request finish message. If flying asset A detects the flying asset B on its on-board radar system during the finishing state, the transponder communication has to be initiated again. The transponder task B can be already removed, so the transponder task A has to send initiate messages again and new transponder task B will be created.

Figure 35:
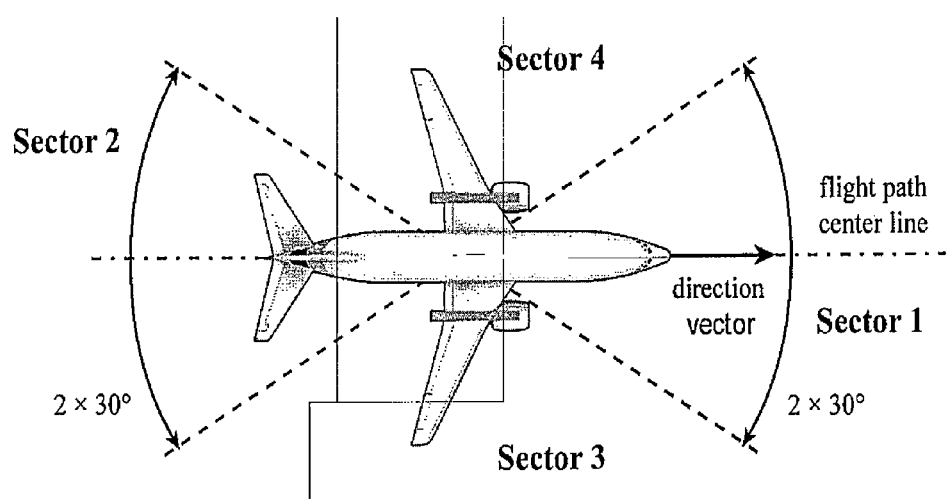
FIG. 35 is a graphical description of collision types in rule-based collision avoidance.

Referring now to FIG. 35, the domain dependent algorithm is inherited from the common collision solver. The collision avoidance mechanism is invoked from the transponder task within the collision avoidance block. First, the type of the collision between the flying assets is identified. The collision type is determined on the basis of the angle between the direction vectors of the concerned flying assets at time 1 (first collision point found by the collision detector) projected to the ground flying asset (defined by X and Y axis). Depending on the computed angle the flying asset B is relatively to the flying asset A it fits into one of the four sectors. Depending on this sector, one of the following rules is applied on the flight plan of flying asset A to avoid the collision: Sector 1—head-on collision, in this case the flying assets avoid each other on the right side of the second one. The flying asset flight plan is changed. The pilot agent shifts the points in the time 1 and time 2 perpendicularly to the old direction vector to the right. Distance between the previous and the new point is equal to the minimum of the safety ranges. After time 2 flight plan will continue shortest way to the next mission way-point. Sector 2—back collision, there are two subcases. (i) The flying asset which is in front of the second one is faster—flying assets do not change current flight plans. (ii) The back and faster flying asset changes its flight plan so it will pass the front flying asset on the right side without endangering the front one. Again the back flying asset shifts the old points in the time 1 and time 2 perpendicularly to the old direction vector to the right at the distance at least 1.1 times of the safety range. Sector 3—the side collision when the other flying asset has traffic priority. The flying asset needs to slow down its speed so that it reaches the first collision point later than the second flying asset. If this is not possible due to the minimal flight speed defined for each flying asset type, the flying asset slows down as much as possible and shifts the flight point from the first collision point to the right so that there is no collision between their flight plans. Sector 4—side collision when this flying asset has traffic priority. The flying asset changes its flight plan by accelerating up to its maximal flight speed so that it passes the collision point before the other flying asset. The flying asset only accelerates as much as needed. The above rule-based changes to the flight plan are done by both flying assets independently because the second flying asset detects the possible collision with the first flying asset from its point of view. After applying the changes to the flying asset's flight plan, it sends an updated local flight plan part to all subscribers (flying assets located in its vicinity). The change is also verified against all other known flight plans of all flying assets monitored by the board radar system. If there is another collision detected, new changes are applied. The pilot agent internally uses the flight plan wrapper interface for the manipulation with its flight plan. The change requests are handled as a special set of solver time-constrained way-points. Special handling algorithm implements the application of a new change that overrides the old one. The algorithm decides whether an older solver way-point should be removed or not. The finding of the stable solution for more than two flying assets with the collision is given by the fact that all flying assets use the rule-based collision avoidance method and also use the same set of collision avoidance rules. In other cases it cannot be guaranteed that the negotiation among more flying assets will be finite.

Iterative peer-to-peer CA can be used as a provider of comparison results for multi-party CA. The algorithm solves an encounter $en_k = \langle t, \{fp_i\}_{A_i \in A_C}\rangle$ by the selection of the most important collision flying asset pairs $I = \{A_1 \otimes A_2, A_3 \otimes A_4 \ldots\}$ where each flying asset from $A_C$ can be included only once in I. Identification of the set I is done in the distributed manner. Each $A_i \in A_C$ selects its opponent $A_j$ from local view of the encounter $en_k^{A_i} = \langle t, \{fp_i\} \cup \{\hat{fp}_j\}_{A_j \in A_C \setminus A_i}\rangle$ using $$\arg\min_{A_j \in A_C t_1} \arg\min col(fp_i, fp_j, t_l) = 1. \qquad (4)$$

Figure 36:
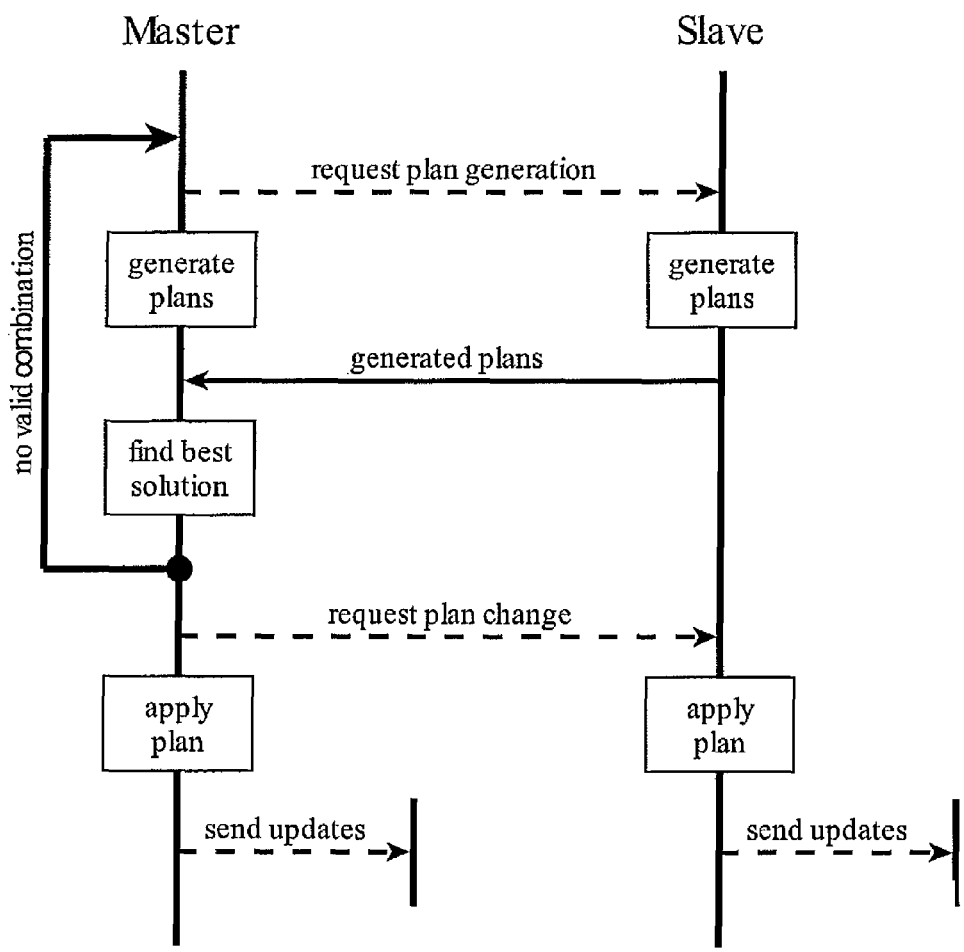
FIG. 36 is a schematic block diagram of pair negotiation about removing collision during an iterative peer-to-peer collision avoidance.

Referring now to FIG. 36, each $A_i \in I$ starts the pair negotiation on removing collision (PNRC) with its colliding opponent $A_j$. If there is a conflict—$A_i$ selects $A_j$ which is already negotiating with other flying asset $A_k$-$A_j$ will finish its current negotiation if and only if $t_1^{A_i \otimes A_j} < t_1^{A_j \otimes A_k}$. Note that for the same times the first selected opponent by $A_j$ will stay. The encounter in which $A_j$ is included can be changed during its PNRC. $A_j$ stops current PNRC if the solved collision no more exists within new encounter or there is identified more important opponent to $A_j$. Within pair negotiation about removing collision (PNRC) these flying asset pairs $A_i \otimes A_j \in I$ prepare a set of possible changed flight plans with their utility value $$F_i = \{\langle fp'_{i1}, u_i(fp'_{i1})\rangle, \langle fp'_{i2}, u_i(fp'_{i2})\rangle \ldots\}. \qquad (5)$$

First, the flight plans $\langle fp'_i, u_i(fp'_i)\rangle \in F_i$ are given by the application of all $em \in EM_i$ to the place of collision $A_i \otimes A_j$ using lowest parametrization p first. Note that the set $EM_i$ can contain different maneuvers for each flying asset and there is always included leave plan as it is maneuver $em_0$ for all flying assets. The changed flight plan $fp'_i$ of em application is included in $F_i$ if and only if $$\forall A_j \in \tilde{A}_i \text{ is } \left(\arg\min_t col(fp'_i, \hat{fp}_j, t) = 1\right) > t_1^{A_i \otimes A_i}. \qquad (6)$$

Then both flying assets $A_i$ and $A_j$ exchange their $\hat{F}$—local future parts of proposed changes with their utility values for next $\delta$ interval. The utilities stored in $\hat{F}$ are counted for the whole flight plan. $A_i$ prepares the negotiation set $$S_i^{A_i \otimes A_j} = \{\langle fp'_{i1}, u_i(fp'_{i1}), \hat{f}p_{j1}, \qquad (7)$$
$$u_j(fp'_{j1})\rangle, \langle fp'_{i1}, u_i(fp'_{i1}), \hat{f}p_{j2}, u_j(fp'_{j2})\rangle \ldots\}$$

as a Cartesian product of $F_i$ and $\hat{F}_j$. Each tuple $\langle fp'_{ik}, u_i(fp'_{ik}), \hat{fp}_{j1}, u_j(fp'_{j1})\rangle \in S_i^{A_i \otimes A_j}$ is included if and only if $$\forall A_j \in \tilde{A}_i \text{ is } \left(\arg\min_t col(fp'_{ik}, \hat{fp}_{jl}, t) = 1\right) > t_1^{A_i \otimes A_j}. \qquad (8)$$

If the negotiation set $S^{A_i \otimes A_i}$ is empty, $A_i$ adds to the $F_i$ flight plans as a result of the application of the evasion maneuvers em∈EM$_i$ using next larger parametrization p. This is done by both A$_i$ and A$_j$ and new $S_i^{A_i \otimes A_j}$ is generated. The whole process is repeated until the negotiation set holds at least one element. A$_j$ does the same from its perspective and its view of negotiation set $S_j^{A_i \otimes A_j}$ holds equivalent elements as $S_i^{A_i \otimes A_j}$, but has full flight plan for f p'$_j$ and local future parts for fp'$_i$. Both flying assets A$_i$ resp. A$_j$ propose the solution $$\arg\max u_i(fp'_{ik}) + u_i(fp'_{jl}) resp. \langle fp'_{ik}, u_i(fp'_{ik}), \hat{fp}'_{jl}, u_j(fp'_{jl}) \rangle \in F_i \quad (9)$$
$$\arg\max u_i(fp'_{ik}) + u_j(fp'_{jl})$$
$$\langle fp'_{jl}, u_j(fp'_{jl}), \hat{fp}'_{ik}, u_i(fp'_{ik}) \rangle \in F_j$$

If there exist more candidates with the same value of selection criterion, the proposed solution is selected randomly from these candidates. To agree with one of the two different randomly proposed solutions they (A$_i$ and A$_j$) can use protocol based on the commitment scheme known from cryptography. After the distributed application of all solutions for A$_i \otimes A_j \in$ I the last encounter is partially modified and new one is detected by the local cooperative detection and described peer-to-peer CA is started again. The restrictions 3 and 5 (equations 6 and 8) can ensure that the possible application of the solution selected from $S^{A_i \otimes A_j}$ cannot cause new earlier collision with any flying asset's current flight plan of which they are aware than the solved one. This assertion with combination of the creation of I guarantees the convergency of algorithm.

The described iterative peer-to-peer algorithm is also suitable for the application of any other solution selection from the negotiation set than described maximal sum of utilities in equation (9). For example there can be used classical monotonic concession protocol (MCP)—simple protocol for automated agent to agent negotiations in the cooperative domain. The use of such protocol guarantees that both participating agents want to maximize their expected utility. In this case both agents leave only Pareto optimal deals in the negotiation set S and then the agents can use Zeuthen strategy for finding the acceptable deal for both agents.

A collision avoidance algorithm can be based on the creation of groups of flying assets which together solve a collision or collisions. The algorithm removes the iterations known from the iterative peer-to-peer algorithm appearing in the multi-collision situations. In a more dense airspace, this approach enables better utilization of the airspace. When two flying assets could have a collision A$_i \otimes$ A$_j$, it could be difficult for them to avoid the collision as other flying assets are in the airspace near to them. The situation can be so difficult that they can have only two options, dramatically deviate from their courses, or deviate only slightly but make their flight plans colliding with another flying assets' flight plans. However, they can create a group with the other flying assets and solve the collision A$_i \otimes$ A$_j$ together with them. Basically, the two colliding flying assets can ask other flying assets to make space for their evasion maneuvers. The basic idea behind the presented multiparty algorithm is to search the state space of possible applications of sequences of evasion maneuvers on the flight plans of flying assets. The goal of the search is to solve a multi-collision with respect to given criterion evaluating the fitness of the solution. In one embodiment, the sum of flight plan utilities for decimalization of the social welfare can be used. There may be no restriction how many evasion maneuvers a flying asset can apply to its flight plan, which can make the state space substantially infinite. The multiparty collision avoidance can be motivated by the A* algorithm. The A* algorithm can find the optimal solution in a finite time if there is a solution. When each flying asset has local information about other flying assets which can change during the search, a pure A* algorithm may not be suitable because searching space may not be able to be specified at the beginning of the search. When the new flying asset appears in the communication range, its flight plan can collide with some flying asset in multiparty group. Then the A* algorithm can be restarted because of state space change. An algorithm of the present embodiment can update states in an open list and continues with the search, which can remove the loss of the progress of the search by restart. There are no cycles in the state space so the list for storing of already expanded states can be omitted from the algorithm. In the present embodiment, open list O can be used for storing of states generated by the expansion of other states and not yet expanded.

For a given encounter $\langle t, \{fp_i\}_{A_i \in A_C} \rangle$ a multiparty group $G \supseteq A_C$ is a set of flying assets whose flight plans are involved in a solution search process. The goal of the group is to find a solution for the encounter. The solution provided by the multi-party algorithm can contain flight plans for flying assets A$_C$, but usually it will contain additional flight plans for flying assets located nearby. A state s is a set $\{s_i\}_{A_i \in G}$, where $s_i = \langle \hat{fp}_i, u_i(fp_i) \rangle$ is a tuple containing the local flight plan $\hat{fp}^s$ of flying asset A$_i$ for state s and its utility value computed by flying asset A$_i$ from the full flight plan fp$_i^s$. C$^s$ is a set of all collisions among flight plans from s and g$^s$ is the cost of application of evasion maneuvers. An initial state s$_0$ contains current local flight plans $\{\hat{fp}_i\}_{A_i \in A_C}$ (plans before applying any evasion maneuver), C$^{s_0}$=C where C is initial multi-collision for the starting encounter and g$^{s_0}$=0. g$^s$ is recursively defined. For the given state s and its child state $s' = \{\hat{fp}_i^{s'}\}_{A_i \in I} \cup \{\hat{fp}_i^s\}_{A_i \in G \setminus I}$ is the set of changed local flight plans by application of evasion united with the set of their predecessors, then $$g(s') = g(s) + \sum_{A_i \in I} u_i(fp_i^s) - \sum_{A_i \in I} u_i(fp_i^{s'}). \quad (10)$$

The set I ⊂ G can hold more than one flying asset which can apply the evasions to remove selected collision as described later. In other words, g(s')-g(s) is the cost of the application of evasion maneuvers with goal to remove one single collision of two flight plans. The final state s$_f$ is a state which is the solution of an encounter, basically a set of non-colliding flight plans. For a given state s, the evaluation function f(s)=g(s)+h(s) consists of the cost of the application of evasion maneuvers g(s) and heuristic function h(s) which estimates how many more changes are needed to remove all collisions from the flight plans in s.

At the beginning the multiparty group contains only the flying assets which create it: G=A$_C$. The searching algorithm of the group proceeds in a cycle until it finds the solution. The state with the lowest value of the evaluation function is selected $$s^* = \arg\min_{s \in O} f(s). \quad (11)$$

All flight plans from s* are checked for collision with local flight plans of flying assets from the set A\G. Any colliding flying asset not yet included in the set G is asked to join the group. If the flying asset A$_y$ joins the group, then its actual local flight plan is added to all states in O and to state s*. Precisely, any state s∈O is replaced by a new state $s \cup \langle \hat{fp}_y, u_y(fp_y) \rangle$ (similarly for s*). Note that the cost of the state g(s) does not change by addition of the new flight plan, there is no application of evasion maneuvers. If the state s is the final state, the algorithm finishes and the flying assets in the multiparty group change their actual flight plans to the flight plans $\{fp_i^{s_f}\}_{A_i \in G}$ which correspond to local flight plans in the chosen final state $s_f$. From the description of the algorithm below, it is clear that each flying asset $A_x$ knows for each generated local flight plan $\hat{fp}_i^{s_f}$ its full version $fp_i^{s_f}$.

In the other case—when s* is not the final state, the pair of flying assets $A_i$, $A_j$ with the earliest collision in the state s* is selected by $$\arg\min_{A_i, A_j \in G, A_i \neq A_j} t_1^{fp_i^{s^*} \otimes fp_j^{s^*}} \quad (12)$$

and these flying assets $A_i$, $A_j$ generate combinations $S^{fp_i^* \otimes fp_j^*}$ of flight plans to remove their (earliest) collision. The flying assets prepare sets $F_i$ resp. $F_j$ of possible changed flight plans with their utility value $$F_i \{<fp'_{i1}, u_i(fp'_{i1})>, <fp'_{i2}, u_i(fp'_{i2})> \ldots\} \quad (13)$$

and their local versions $\hat{F}_i$ resp. $\hat{F}_j$ for next $\delta$ interval, $$\hat{F}_i \{<\hat{fp}_{i1}, u_i(fp'_{i1})>, <\hat{fp}'_{i2}, u_i(fp'_{i2})> \ldots\} \quad (14)$$

The flight plans $<fp'_i, u_i(fp'_i)> \in F_i$ are given by the application of all em∈$EM_i$ to the place of collision $fp_i^s \otimes fp_j^s$ using the lowest parametrization p. Note, that the set $EM_i$ can contain different maneuvers for each flying asset and there is always included the leave plan as it is maneuver $em_0$ for all flying assets. $S^{fp_i^* \otimes fp_j^*}$ is then a subset of combinations of flight plans from $\hat{F}_i$ and $\hat{F}_j$ which have no collision or the first collision point of the collision is not earlier that the old collision point, precisely $$S^{fp_i^{s^*} \otimes fp_j^{s^*}} = \left\{ \{<\hat{fp}_{ik}, u_i(fp'_{ik})> \in \hat{F}_i, <\hat{fp}_{jl}, u_j(fp'_{jl})> \in \hat{F}_j\} : t_1^{\hat{fp}_{ik} \otimes \hat{fp}_{jl}} > t_1^{\hat{fp}_i^{s^*} \otimes \hat{fp}_j^{s^*}} \right\} \quad (15)$$

The set of new states N is created using $$N = \left\{ s' = \text{old} \cup \text{new} \mid \text{old} = s^* / \{s_i^*, s_j^*\}, \\ \text{new} \in S^{fp_i^{s^*} \otimes fp_j^{s^*}} \cdot \forall A_x \in \{A_i, A_j\} \forall A_y \in G/\{A_i, A_j\} : t_1^{\hat{fp}_x^{new} \otimes \hat{fp}_y^{old}} > t_1^{\hat{fp}_i^{s^*} \otimes \hat{fp}_j^{s^*}} \right\}. \quad (16)$$

New states N are added to O and the searching continues with expansion of the state with the smallest value according to the evaluation function. By default the algorithm uses the zero heuristics. With general utility function for the flight plan, it is possible to have evasion maneuvers that do not change the utility of flight plan and can be used for collision avoidance. For example assume we have a scenario where two flying assets have a collision on their perpendicular flight plans and the utility value depends only on the flight plan length. A solution is when one flying asset speeds up and another slows down and in this case the utility value is the same as in the initial state. The algorithm with zero heuristics finds the final state with lowest value of evaluation function which corresponds to the lowest utility loss for the sum of utilities of flight plans. However, in the worst case the expanded state space can grow exponentially with the number of collisions in a multiparty group. A different not admissible heuristic can be used. Such a "collision" heuristic could combine the main utility criterion with giving more preferences to the states with fewer collisions.

When the flying asset is asked to join the multiparty group $G_1$, it can already be participating in another multiparty group $G_2$. In this case, the flying asset checks if $G_1$ is more important than $G_2$ and if so, the flying asset terminates its interaction with group $G_2$ and joins the group $G_1$. When a flying asset terminates the interaction with the group, the group is dissolved. The relation of importance of groups is defined according to the earliest collision in their encounter. When the group G is searching for solution of the encounter $<t, \{fp\}_{A_i \in A_C}>$ then the time $t_G$ of the earliest collision is:

$$t_G = \min_{A_i, A_j \in G, A_i \neq A_j} t_1^{A_i \otimes A_j} \quad (17)$$

The group $G_1$ is more important than $G_2$—$G_1 \succ G_2$ if and only if $t_{G_1} < t_{G_2}$. To make $\succ$ relation total, it must be defined also for situations when $t_{G_1} = t_{G_2}$, also it is not important if $t_{G_1} < t_{G_2}$, or $t_{G_1} > t_{G_2}$. It can be chosen for example randomly, or deterministically—with help of the lexicographic ordering of the string representation of the groups.

Figure 37:
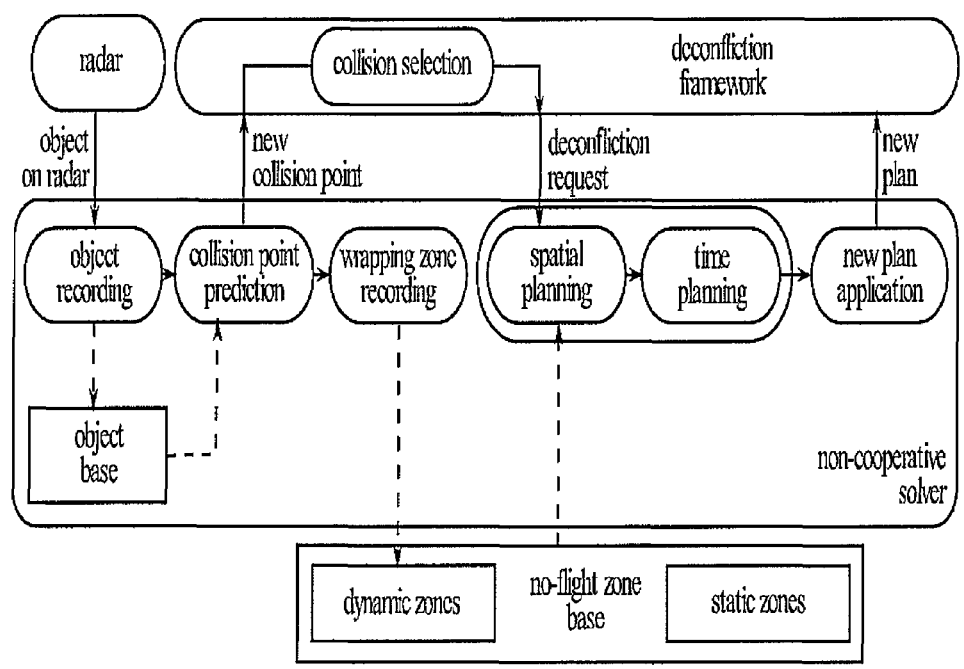
FIG. 37 is a schematic block diagram of a no-flight zone-based non-cooperative avoidance solver scheme.

Referring to FIG. 37, in the case when the communication between flying assets is not possible, it is required to solve the collisions non-cooperatively. This can happen in the situation when, for example, the on-board communication device of the flying asset is broken, the used collision avoidance systems are not compatible or the other flying asset intentionally refuses to communicate (an enemy). In the present embodiment, there are two methods for handling such situations, but the invention is not limited to these two described methods. The first is based on the non-cooperative object future position prediction with encapsulation to the dynamic no-flight zone used for testing and flight plan replanning. The second non-cooperative method is based on the proportional navigation which provides optimal collision avoidance between two UAAs. The dynamic no-flight zone-based non-cooperative collision avoidance is one of the methods for collision solving. In the contrast with other methods, the described solution is based on the path planning algorithm in order to avoid dynamic no-flight zones. These zones surrounding collisions with non-cooperative objects are regularly updated. The non-cooperative objects are detected using an flying asset on-board radar sensing feature. The algorithm is responsible for the coordination of all operations needed for avoiding potential future collision of the flying asset and an object in space the flying asset cannot establish communication with. The algorithm is implemented in the form of a special unit (a solver of the multi-layer collision avoidance framework) that can take part in the process of collision solving within the pilot agent.

The event that triggers the collision avoidance loop is the information obtained from the radar describing the position of an unknown object in the area. This object is recorded in the base of non-cooperative objects, unless it's already present there. If the object is already known, its position is updated. The next step is the prediction of the collision point, an intersection of the flight plan and the non-cooperative object. If no such virtual collision point is found, the loop ends. In the opposite case, the collision point is wrapped by a dynamic no-flight zone and it is passed on to the collision avoidance framework that will decide whether it is necessary to solve the given collision. The solution process may not be executed in case that the collision has already been detected and processed by another solver earlier. If the collision avoidance framework decides that the collision should be solved, the last step of the non-cooperative solver is executed, i.e. a new flight plan from the current position to the destination point is generated using spatial and time planning. Spatial planning takes into account all static no-flight zones as well as dynamic no-flight zones of all non-cooperating objects. The new plan is then passed to the collision avoidance framework to be handled by the pilot agent. The described collision avoidance loop is executed for all objects found in the radar scan. This is done periodically for each radar scan (cycle period $t_r$). In order to detect a potential future collision it is necessary to find a collision point $\bar{c}$ in the space and time. It is a point defined by an intersection of the current flight plan and the flight trajectory of the non-cooperative object. Since the future trajectory of the non-cooperative object in not known exactly, it must be extrapolated from the object's motion history. There are implemented two future trajectory predictors: liner and predictor based on Taylor series. The linear predictor estimates the future trajectory from the following two points: the current position $\bar{s}$ and the position read from the previous radar scan $\bar{s}_p$. The current direction vector $\bar{d}$ of the non-cooperative object is calculated simply as $$\bar{d} = \bar{s} - \bar{s}_p. \quad (18)$$

The current estimated speed v of the object is calculated as $$v = \frac{\|\bar{d}\|}{t_r}, \quad (19)$$

where $t_r$ is the radar cycle period. A three dimensional predictor is realized as three independent Taylor series—one per each coordinate. The following description shows how the prediction works for one coordinate. The position of the monitored object can be viewed as a function of time. The function value in particular time t can be counted from the Taylor series:

$$\tilde{f}(t) = \sum_{n=0}^{N} \frac{f^{(n)}(t_0)}{n!} (t - t_0)^n \quad (20)$$

where $f(n)(t_0)$ denotes the n-th derivative of f at the time $t_0$ and the zeroth derivative of f is defined to be f itself. The N defines the number of the components in the Taylor series. If the $N=\infty$ then $f(t)=\tilde{f}(t)$. For $N<\infty$ the error of prediction is 0 for the time $t_0$ and rise with the higher difference $t-t_0$. The Taylor series can work over the sequence of discrete position samples with time stamps from the radar sensing. The derivative in the equation (17) is replaced by the differences counted from that chain of last position samples. To count $n^{th}$ difference n+1 last points are used. The computation of n-th differences are done in iterative way. The values for the $k^{th}$ iteration are:

$$\Delta^{(0)} f(t_k) = f(t_k), \quad (21)$$

$$\Delta^{(1)} f(t_k) = \frac{f(t_k) - f(t_{k-1})}{t_k - t_{k-1}},$$

$$\Delta^{(2)} f(t_k) = \frac{\Delta^{(1)} f(t_k) - \Delta^{(1)} f(t_{k-1})}{t_k - t_{k-1}},$$

$$\vdots$$

$$\Delta^{(n)} f(t_k) = \frac{\Delta^{(n-1)} f(t_k) - \Delta^{(n-1)} f(t_{k-1})}{t_k - t_{k-1}}$$

where $\Delta^{(n)} f(t_k)$ denotes the $n^{th}$ differences of f at the time $t_k$. If the order of the predictor (and the number of components in the Taylor series) is N=1, then this predictor is the same as the linear one. The prediction of the future position from the limited number of the last observed positions of the object based on the separate prediction of each coordinate component with finite prediction order (finite number of last known points) provides prediction with object movement higher that the maximum flight velocity. The function providing the predicted position contains these velocity restrictions and if the plain Taylor series value is out of the bound, the function uses only the shape of predicted trajectory and discards the velocity of the movement by its bounding.

Figure 38:
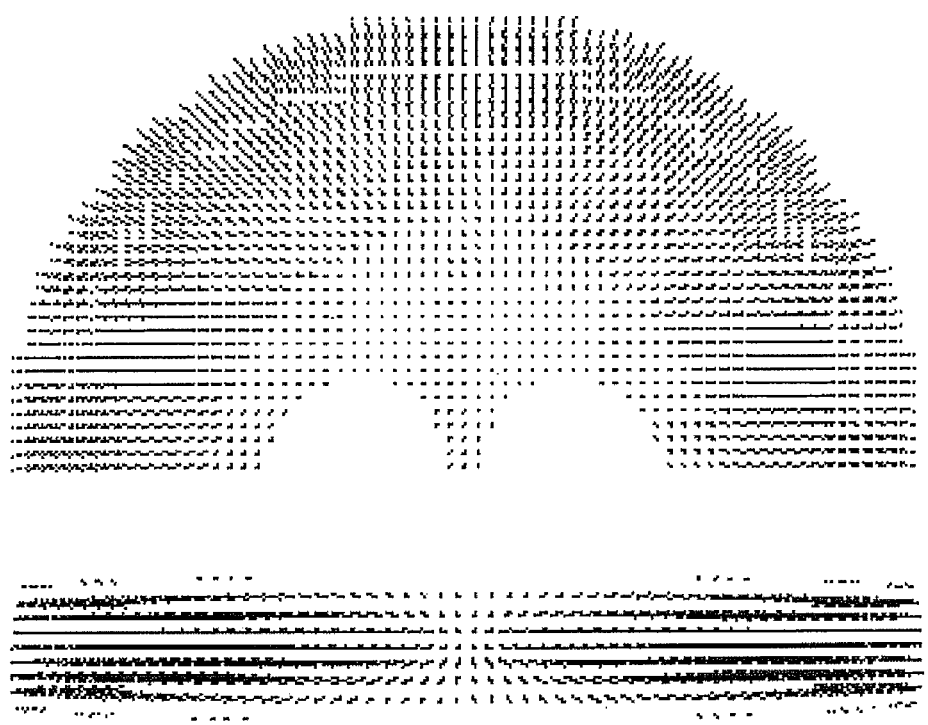
FIG. 38 is a graphical description of the shape of a dynamic no-flight zone.

Referring now to FIG. 38, in order to find the collision point, the flight plan and predicted trajectory are iterated in the future time. In each iteration the distance between the predicted position and the position of the flying asset given by the current flight plan. If this distance is shorter than defined safety zone, the collision point is found. The size of the no-flight zone derived from the possible future flight trajectory of the non-cooperative object is stretched so that it is twice as long as the time from the current position to the collision point. The linear predictor can be coupled either with the ellipsoid zone shape or with the shape given by the future object position for given time interval. The shape of the dynamic no-flight zones for non-cooperative object is derived from the possible future flight trajectory. The trajectory takes into account the minimal turning radius $r_{min}$, maximal climbing and descending angle $\phi_{max}$ and the prediction time $t_p$.

The second zone is internally represented as with the binary octant tree. The advantage of octant trees is the efficient data storage and fast point and line tests. Disadvantages include slow construction of octant trees and rough sampling of cells. For the purposes of NFZ-based non-cooperative collision avoidance it is necessary to solve the problem of fast translation, rotation and deformation of relatively small octant subtrees used as dynamic no-flight zones of non-cooperative objects. Since complete rebuilding of an octant tree for each specific identified collision is too slow, a different solution was designed. It is based on separation of all particular octant trees (for all collision no-flight zones). The shape of the zone depends on the several configuration parameters which are coupled with the type of the object. Thus, in the present embodiment, there are defined such zone for each known object type and the subsequent transformation is applied to the basic octant tree. For such purposes the transformation node in the airspace representation is used. The predictor based on Taylor series is restricted to use only ellipsoid dynamic no-flight zone. This restriction is given by the non-linear shape of the predicted trajectory from the current position of the object to the collision position. Theoretically it is possible to construct such zone also for non-linear trajectory, but it will be suitable only for that trajectory shape and cannot be reused for other collisions. Due to the slow construction of that zone this solution cannot be applied. The ellipsoid dynamic zone is constructed using basic geometrical object representation and its center is inserted just to the place of the detected collision. The size of the ellipsoid axes are then inferred from the velocities (both the flying asset and object) in the collision point and distance of the collision point from the current flying asset position. The error of the prediction rises along for later values. Thus the higher size of the ellipsoid partially compensates this effect. For higher speed and further collision the ellipsoid is larger and vice-versa.

The method of the present embodiment can be, in whole or in part, implemented electronically. Signals representing actions taken by elements of the system can travel over electronic communications media. Control and data information can be electronically executed and stored on computer-readable media. The system can be implemented to execute on a node such as applications server 11 in communications network 14. Common forms of computer-readable media can include, but are not limited to, for example, a floppy disk, a flexible disk, a hard disk, magnetic tape, or any other magnetic medium, a CDROM or any other optical medium, punched cards, paper tape, or any other physical medium with patterns of holes or ink or characters, a RAM, a PROM, and EPROM, a FLASH-EPROM, or any other memory chip or cartridge, a carrier wave, or any other medium from which a computer can read.

Although various embodiments have been described herein, it should be realized that a wide variety of further and other embodiments is possible within the scope of this disclosure.

What is claimed is:

1. A method for planning/replanning collision free flight plans in real-time comprising the steps of:
    (a) planning individual flight plans for each flying asset client based on input data;
    (b) executing the planned individual flight plans;
    (c) detecting violating individual flight plans that violate safety zones of each of the flying assets; and
    (d) repairing the individual flight plans by real-time replanning; said repairing comprising using a number of collision avoidance methods; the number of collision avoidance methods comprising cooperative and noncooperative collision avoidance methods; said real time replanning comprising selecting, according to predetermined rules, from the number of collision avoidance methods comprising cooperative and noncooperative collision avoidance methods, one collision avoidance method to solve a predetermined collision; said predetermined collision being selected according to predetermined collision selection rules; said predetermined collision selection rules comprising selecting a first valid collision with highest priority; said predetermined rules comprising selecting said one collision avoidance method based on a difference between collision time for said predetermined collision and a current time.

2. The method as in claim 1 wherein said step of planning individual flight plans comprises the steps of:
    receiving the input data;
    preparing the individual flight plans based on the input data; and
    detecting, according to changes in the input data, if said real-time replanning must be performed.

3. The method as in claim 2 further comprising the step of:
    selecting the input data from a group consisting of world dimensions, definition of the world surface, no-flight zones, and mission way-points.

4. The method as in claim 1 wherein said real-time replanning also comprises the step of:
    replanning the individual flight plan when the input data changes.

5. The method as in claim 1 wherein said step of executing the planned individual flight plans comprises the step of:
    simulating the planned individual flight plans.

6. The method as in claim 5 wherein said step of simulating the planned individual flight plans comprises the steps of:
    establishing a flying asset configuration;
    initiating a plurality of flying asset clients and a simulation server based on the flying asset configuration;
    determining a pre-selected configuration part of the flying asset configuration for distribution to the flying asset clients;
    distributing a pre-selected configuration part to the flying asset clients;
    simulating an environment based on a simulation time;
    simulating the flying assets by activating the flying asset clients within the environment;
    receiving, in the simulation server, updates from the flying asset clients when the planned individual flight plans change during said step of simulating the flying assets; and
    computing, in the simulation server, based on flying asset positions and flight data, updated flight data.

7. The method as in claim 6 wherein said step of establishing comprises the step of:
    selecting the flying asset configuration parameters from a group consisting of system settings, flying asset positions, and flying assets starting times.

8. The method as in claim 1 wherein said step of repairing comprises the steps of:
    predicting a future safety zone violation point for one of the flying assets based on the flight data associated with the one of the flying assets and sensor data;
    modeling the future safety zone violation point as a modeled dynamic no-flight zone;
    storing the modeled future safety zone violation point with the sensor data; and
    repeating steps (a)-(d) as in claim 1.

9. The method as in claim 1 wherein said step of repairing comprises the steps of:
    enabling the flying asset clients to exchange pre-selected configuration parts of their individual flight plans;
    predicting, in each of the flying asset clients using the exchanged pre-selected configuration parts, possible future zone violations of the safety zones of each of the flying assets;
    providing to the flying asset clients pre-selected evasion maneuvers computed by said step of planning;
    adjusting, by the flying asset clients, the planned individual flight plans based on the pre-selected evasion maneuvers and the future zone violation;

collectively negotiating, by the flying asset clients, collision avoidance maneuvers by maximizing a sum of utility values computed from the adjusted individual flight plans;

receiving, from the flying asset clients, the negotiated individual flight plans based on said step of collectively negotiating; and repeating steps (b)-(d) as in claim 1.

10. The method as in claim 1 wherein said step of detecting comprises the step of:

processing the exchanged updated flight data to determine the violating flight plans.

11. The method as in claim 1 wherein said step of detecting comprises the step of:

receiving updated predicted flight data from sensor data.

12. The method as in claim 1 comprising the step of:

selecting a configuration part from a group consisting of mission way-points, definition of the world, and no-fly zones.

13. The method as in claim 1 comprising the step of:

selecting the flight data from a group consisting of sensor data, violations of the safety zones, and physical collisions.

14. The method of claim 1 wherein the step of repairing comprises the steps of:

(a) selecting a collision avoidance method from the number of collision avoidance methods;

(b) obtaining a solving time for the selected collision avoidance method;

(c) comparing the solving time to a minimum solving time; and (d) using the selected collision avoidance method, if the solving time is less than the minimum solving time; and (e) selecting another collision avoidance method, if the solving time is greater than the minimum solving time.

15. The method of claim 1 wherein one of the number of collision avoidance methods comprises:

(a) notifying a first flying asset client of a position of a second flying asset, if the second flying asset client enters an alert zone of the first flying asset client;

(b) creating, upon notification, a transponder connection between the first flying asset client and the second flying asset client, if a transponder connection was not present;

(c) sending, from the first flying asset client to the second flying asset client, an initiate message;

(d) receiving, from the first flying asset client, after initiation of transponder communication, a flight plan from the second flying asset client;

(e) determining, from a flight plan of the first flying asset client and the flight plan of the second flying asset client, whether a collision is predicted; and (f) initiating a collision avoidance process, if a collision is predicted.

16. The method of claim 1 wherein the step of repairing comprises the steps of:

(a) obtaining, for a number of flying asset clients, possible sequences of evasion maneuvers to avoid collisions between flying asset clients;

(b) determining, for the number of flying asset clients, an evaluation function;

(c) search a set of n-tuples, where each of the n-tuples includes a flight plan for one of the flying asset clients and a utility value for said one flying asset client, in order to optimize the evaluation function; the search repeating steps (a) and (b) until a substantially noncolliding solution is obtained.

17. The method of claim 16 wherein the evaluation function is a cost of application of evasion maneuvers; the cost of application of evasion maneuvers being obtained recursively from the difference in the sum of utility values over the set.

18. The method of claim 16 wherein the evaluation function is a sum of a cost of application of evasion maneuvers and a heuristic function; the cost of application of evasion maneuvers being obtained recursively from the difference in the sum of utility values over the set; the heuristic function being an estimate of the number of changes needed to remove substantially all collisions.

19. A computer code system stored on a computer readable medium, said computer code system for planning/replanning collision free flight plans in real-time, comprising:

input data from flying asset databases;

a plurality of computer code flying asset client processors; and at least one computer code server processor including:

a computer code planner processor planning individual flight plans for each of said flying asset client processors based on said input data;

a computer code executor processor executing the planned individual flight plans;

a computer code detector processor detecting, from flight data received from said computer code flying asset client processors, violating individual flight plans that violate safety zones of flying assets associated with said computer code flying asset client processors; and a computer code repairer processor repairing said individual flight plans by real-time replanning; said repairing comprising using a number of collision avoidance methods; the number of collision avoidance methods comprising cooperative and noncooperative collision avoidance methods; said real time replanning comprising selecting, according to predetermined rules, from the number of collision avoidance methods comprising cooperative and noncooperative collision avoidance methods, one collision avoidance method to solve a predetermined collision; said predetermined collision being selected according to predetermined collision selection rules; said predetermined collision selection rules comprising selecting a first valid collision with highest priority; said predetermined rules comprising selecting said one collision avoidance method based on a difference between collision time for said predetermined collision and a current time.

20. The computer code system as in claim 19 wherein said computer code executor processor comprises:

a computer code configuration creator processor establishing a flying asset configuration and initiating a plurality of said computer code flying asset client processors and a simulation server based on said flying asset configuration;

a computer code configuration selector processor determining a pre-selected configuration part of said flying asset configuration for distribution to said computer code flying asset client processors;

a computer code distributor processor distributing said pre-selected configuration part to said plurality of computer code flying asset client processors;

a computer code environment simulator processor simulating an environment based on a simulation time;

a computer code flying asset simulator processor simulating said flying assets by activating said computer code flying asset client processors within said environment; and a computer code receiver processor receiving updates from said computer code flying asset client processors when said planned individual flight plans change, and computing updated flight data based on flying asset positions and said flight data.

21. The computer code system as in claim 19 wherein said computer code repairer processor comprises:
- a computer code receiver predictor predicting a future safety zone violation point for one of said flying assets based on said flight data and sensor data;
- a computer code modeler processor modeling said future safety zone violation point as a modeled dynamic no-flight zone and storing said modeled dynamic no-flight zone with said input data.

22. The computer code system as in claim 19 wherein said computer code repairer processor comprises:
- a computer code exchange enabler processor enabling said computer code flying asset client processors to exchange pre-selected configuration parts of said individual flight plans;
- a computer code receiver predictor predicting, in each of said computer code flying asset client processors using the exchanged pre-selected configuration parts, possible future zone violations of safety zones of each of said flying assets;
- a flight plan adjuster adjusting, by said computer code flying asset client processors, said planned individual flight plans based on said pre-selected evasion maneuvers and said future zone violation;
- a collective negotiator collectively negotiating, by said computer code flying asset client processors, collision avoidance maneuvers to create negotiated individual flight plans by maximizing a sum of utility values computed from the adjusted individual flight plans; and
- a computer code receiver processor receiving, from said computer code flying asset client processors, said negotiated individual flight plans;
- wherein said computer code planner processor provides to said computer code flying asset client processors said pre-selected evasion maneuvers computed by said planner.

23. The computer code system as in claim 19 wherein said computer code flying asset client processor comprises:
- a computer code client predictor processor predicting, in each of said computer code flying asset client processors using said exchanged pre-selected configuration parts, possible future zone violations of said safety zones of each of said flying assets;
- a computer code flight plan adjuster processor adjusting, by said computer code flying asset client processors, said planned individual flight plans based on said pre-selected evasion maneuvers and said future zone violation; and
- a computer code collective negotiator processor collectively negotiating, by said computer code flying asset client processors, collision avoidance maneuvers by maximizing a sum of utility values computed from said adjusted individual flight plans.

24. The computer code system of claim 19 wherein, in the computer code repairer processor, said repairing comprises:
(a) selecting a collision avoidance method from the number of collision avoidance methods;
(b) obtaining a solving time for the selected collision avoidance method;
(c) comparing the solving time to a minimum solving time; and
(d) using the selected collision avoidance method, if the solving time is less than the minimum solving time; and
(e) selecting another collision avoidance method, if the solving time is greater than the minimum solving time.

25. The computer code system of claim 19 wherein one of the number of collision avoidance methods comprises:
(a) notifying a first flying asset client of a position of a second flying asset client, if the second flying asset client enters an alert zone of the first flying asset client;
(b) creating, upon notification, a transponder connection between the first flying asset client and the second flying asset client, if a transponder connection was not present;
(c) sending, from the first flying asset client to the second flying asset client, an initiate message;
(d) receiving, from the first flying asset client, after initiation of transponder communication, a flight plan from the second flying asset client;
(e) determining, from a flight plan of the first flying asset client and the flight plan of the second flying asset client, whether a collision is predicted; and
(f) initiating a collision avoidance process, if a collision is predicted.

26. The computer code system of claim 19 wherein, in the computer code repairer processor, said repairing comprises:
(a) obtaining, for a number of flying asset clients, possible sequences of evasion maneuvers to avoid collisions between flying asset clients;
(b) determining, for the number of flying asset clients, an evaluation function;
(c) searching a set of n-tuples, where each of the n-tuples includes a flight plan for one of the flying asset clients and a utility value for said one flying asset client, in order to optimize the evaluation function; the search repeating steps (a) and (b) until a substantially noncolliding solution is obtained.

27. A computer readable medium storing computer code, the computer readable code causing a processor to:
(a) plan individual flight plans for each flying asset client based on input data;
(b) execute the planned individual flight plans;
(c) detect violating individual flight plans that violate safety zones of each of the flying assets; and
(d) repair the individual flight plans by real-time replanning; said repairing comprising using a number of collision avoidance methods; the number of collision avoidance methods comprising cooperative and noncooperative collision avoidance methods; said real time replanning comprising selecting, according to predetermined rules, from the number of collision avoidance methods comprising cooperative and not/cooperative collision avoidance methods, one collision avoidance method to solve a predetermined collision; said predetermined collision being selected according to predetermined collision selection rules; said predetermined collision selection rules comprising selecting a first valid collision with highest priority; said predetermined rules comprising selecting said one collision avoidance method based on a difference between collision time for said predetermined collision and a current time.

28. A communications network having a computer server, the computer server comprising the computer readable medium of claim 27.

* * * * *

UNITED STATES PATENT AND TRADEMARK OFFICE
CERTIFICATE OF CORRECTION

PATENT NO.       : 8,538,673 B2
APPLICATION NO.  : 12/347380
DATED            : September 17, 2013
INVENTOR(S)      : David Sislak et al.

It is certified that error appears in the above-identified patent and that said Letters Patent is hereby corrected as shown below:

In the Claims

In Column 42, line 51 (claim 27), "not/cooperative" should read -- noncooperative --

Signed and Sealed this
Twenty-ninth Day of October, 2013

Teresa Stanek Rea
*Deputy Director of the United States Patent and Trademark Office*